(12) United States Patent
Panasyuk et al.

(10) Patent No.: US 7,984,157 B2
(45) Date of Patent: Jul. 19, 2011

(54) PERSISTENT AND RELIABLE SESSION SECURELY TRAVERSING NETWORK COMPONENTS USING AN ENCAPSULATING PROTOCOL

(75) Inventors: Anatoliy Panasyuk, Bellevue, WA (US); Andre Kramer, Cambridge (GB); Bradley Jay Pedersen, Parkland, FL (US); David Sean Stone, Lauderdale-By-The-Sea, FL (US); Terry Treder, Highland Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1393 days.

(21) Appl. No.: 10/711,719

(22) Filed: Sep. 30, 2004

(65) Prior Publication Data

US 2005/0198380 A1    Sep. 8, 2005

Related U.S. Application Data

(63) Continuation-in-part of application No. 10/083,324, filed on Feb. 26, 2002, now Pat. No. 7,661,129, and a continuation-in-part of application No. 10/683,881, filed on Oct. 10, 2003, now Pat. No. 7,562,146.

(51) Int. Cl.
*G06F 15/16* (2006.01)
(52) U.S. Cl. .......................................... 709/227; 726/10
(58) Field of Classification Search .................. 709/227, 709/238, 203, 230, 236; 455/439; 713/160, 713/201; 726/22, 10; 714/752, 4; 370/395.53, 370/352, 225
See application file for complete search history.

(56) References Cited

U.S. PATENT DOCUMENTS

| | | | |
|---|---|---|---|
| 4,438,511 A | 3/1984 | Baran |
| 4,649,510 A | 3/1987 | Schmidt |
| 4,736,369 A | 4/1988 | Barzilai et al. |
| 4,750,171 A | 6/1988 | Kedar et al. |
| 4,768,190 A | 8/1988 | Giancarlo |
| 4,837,800 A | 6/1989 | Freeburg et al. |

(Continued)

FOREIGN PATENT DOCUMENTS

EP    0 384 339 A2    8/1990

(Continued)

OTHER PUBLICATIONS

Alanko, T. et al. "Measured performance of data transmission over cellular telephone networks." Publication C-1994-53, pp. 1-20, University of Helsinki, Department of Computer Science, Helsinki, 1994.

(Continued)

*Primary Examiner* — Jungwon Chang
(74) *Attorney, Agent, or Firm* — Foley and Lardner LLP; John D. Lanza

(57) ABSTRACT

The invention relates to systems and methods for reestablishing client communications by securely traversing network components using an encapsulating communication protocol to provide session persistence and reliability. A first protocol that encapsulates a plurality of secondary protocols is used to communicate over a network to provide session persistence and a reliable connection between a client and a host service via a first protocol service. A ticket authority generates a first ticket and a second ticket associated with the client. The first ticket is provided to the client and the client uses the first ticket to establish a communication session with the first protocol service. The second ticket is provided to the first protocol service and the first protocol service uses the second ticket to establish a communication session with the host service.

35 Claims, 18 Drawing Sheets

U.S. PATENT DOCUMENTS

| | | | |
|---|---|---|---|
| 4,893,307 A | 1/1990 | McKay et al. | |
| 4,912,756 A | 3/1990 | Hop | |
| 4,924,378 A | 5/1990 | Hershey et al. | |
| 4,941,089 A | 7/1990 | Fischer | |
| 4,953,159 A | 8/1990 | Hayden et al. | |
| 5,010,549 A | 4/1991 | Katou et al. | |
| 5,021,949 A | 6/1991 | Morten et al. | |
| 5,159,592 A | 10/1992 | Perkins | |
| 5,181,200 A | 1/1993 | Harrison | |
| 5,204,897 A | 4/1993 | Wyman | |
| 5,210,753 A | 5/1993 | Natarajan | |
| 5,212,806 A | 5/1993 | Natarjan | |
| 5,220,501 A | 6/1993 | Lawlor et al. | |
| 5,224,098 A | 6/1993 | Bird et al. | |
| 5,241,542 A | 8/1993 | Natarajan et al. | |
| 5,276,680 A | 1/1994 | Messenger | |
| 5,307,490 A | 4/1994 | Davidson et al. | |
| 5,325,361 A | 6/1994 | Lederer et al. | |
| 5,349,678 A | 9/1994 | Morris et al. | |
| 5,359,721 A | 10/1994 | Kempf et al. | |
| 5,390,297 A | 2/1995 | Barber et al. | |
| 5,410,543 A | 4/1995 | Seitz et al. | |
| 5,412,654 A | 5/1995 | Perkins | |
| 5,412,717 A | 5/1995 | Fischer | |
| 5,416,842 A | 5/1995 | Aziz | |
| 5,426,637 A | 6/1995 | Derby et al. | |
| 5,442,633 A | 8/1995 | Perkins et al. | |
| 5,442,791 A | 8/1995 | Wrabetz et al. | |
| 5,446,736 A | 8/1995 | Gleeson et al. | |
| 5,446,915 A | 8/1995 | Pierce | |
| 5,448,561 A | 9/1995 | Kaiser et al. | |
| 5,455,953 A | 10/1995 | Russell | |
| 5,475,819 A | 12/1995 | Miller et al. | |
| 5,481,535 A | 1/1996 | Hershey | |
| 5,481,721 A | 1/1996 | Serlet et al. | |
| 5,490,139 A | 2/1996 | Baker et al. | |
| 5,491,750 A | 2/1996 | Bellare et al. | |
| 5,491,800 A | 2/1996 | Goldsmith et al. | |
| 5,499,343 A | 3/1996 | Pettus | |
| 5,504,814 A | 4/1996 | Miyahara | |
| 5,509,070 A | 4/1996 | Schull | |
| 5,515,508 A | 5/1996 | Pettus et al. | |
| 5,524,238 A | 6/1996 | Miller et al. | |
| 5,544,246 A | 8/1996 | Mandelbaum et al. | |
| 5,548,723 A | 8/1996 | Pettus | |
| 5,550,976 A | 8/1996 | Henderson et al. | |
| 5,550,981 A | 8/1996 | Bauer et al. | |
| 5,553,060 A | 9/1996 | Obermanns et al. | |
| 5,553,139 A | 9/1996 | Ross et al. | |
| 5,557,732 A | 9/1996 | Thompson | |
| 5,559,800 A | 9/1996 | Mousseau et al. | |
| 5,564,016 A | 10/1996 | Korenshtein | |
| 5,564,070 A | 10/1996 | Want et al. | |
| 5,566,225 A | 10/1996 | Haas | |
| 5,568,645 A | 10/1996 | Morris et al. | |
| 5,572,528 A | 11/1996 | Shuen | |
| 5,574,774 A | 11/1996 | Ahlberg et al. | |
| 5,586,257 A | 12/1996 | Perlman | |
| 5,592,549 A | 1/1997 | Nagel et al. | |
| 5,594,490 A | 1/1997 | Dawson et al. | |
| 5,602,916 A | 2/1997 | Grube et al. | |
| 5,604,490 A | 2/1997 | Blakley et al. | |
| 5,610,595 A | 3/1997 | Garrabrant et al. | |
| 5,623,600 A | 4/1997 | Ji et al. | |
| 5,623,601 A | 4/1997 | Vu | |
| 5,627,821 A | 5/1997 | Miyagi | |
| 5,627,892 A | 5/1997 | Kauffman | |
| 5,633,868 A | 5/1997 | Baldwin et al. | |
| 5,638,358 A | 6/1997 | Hagi | |
| 5,638,513 A | 6/1997 | Ananda | |
| 5,652,789 A | 7/1997 | Miner et al. | |
| 5,657,390 A | 8/1997 | Elgamal et al. | |
| 5,664,007 A | 9/1997 | Samadi et al. | |
| 5,666,501 A | 9/1997 | Jones et al. | |
| 5,668,999 A | 9/1997 | Gosling | |
| 5,671,354 A | 9/1997 | Ito et al. | |
| 5,673,322 A | 9/1997 | Pepe et al. | |
| 5,682,534 A | 10/1997 | Kapoor et al. | |
| 5,689,708 A | 11/1997 | Regnier et al. | |
| 5,717,737 A | 2/1998 | Doviak | |
| 5,721,818 A | 2/1998 | Hanif et al. | |
| 5,724,346 A | 3/1998 | Kobayashi et al. | |
| 5,729,734 A | 3/1998 | Parker et al. | |
| 5,732,074 A | 3/1998 | Spaur | |
| 5,737,416 A | 4/1998 | Cooper et al. | |
| 5,742,757 A | 4/1998 | Hamadani et al. | |
| 5,748,897 A | 5/1998 | Katiyar | |
| 5,752,185 A | 5/1998 | Ahuja | |
| 5,754,774 A | 5/1998 | Bittinger et al. | |
| 5,758,186 A | 5/1998 | Hamilton et al. | |
| 5,768,525 A | 6/1998 | Kralowetz et al. | |
| 5,771,459 A | 6/1998 | Demery et al. | |
| 5,784,643 A | 7/1998 | Shields | |
| 5,794,207 A | 8/1998 | Walker et al. | |
| 5,796,727 A | 8/1998 | Harrison et al. | |
| 5,812,671 A | 9/1998 | Ross | |
| 5,812,784 A | 9/1998 | Watson et al. | |
| 5,848,064 A | 12/1998 | Cowan | |
| 5,856,974 A | 1/1999 | Gervais et al. | |
| 5,889,816 A | 3/1999 | Agrawal et al. | |
| 5,909,431 A | 6/1999 | Kuthyar et al. | |
| 5,923,756 A | 7/1999 | Shambroom | |
| 5,933,412 A | 8/1999 | Choudhury et al. | |
| 5,935,212 A | 8/1999 | Kalajan et al. | |
| 5,944,791 A | 8/1999 | Scherpbier | |
| 5,956,407 A | 9/1999 | Slavin | |
| 5,968,176 A | 10/1999 | Nessett et al. | |
| 5,987,611 A | 11/1999 | Freund | |
| 6,006,090 A | 12/1999 | Coleman et al. | |
| 6,023,724 A | 2/2000 | Bhatia et al. | |
| 6,055,575 A | 4/2000 | Paulsen et al. | |
| 6,058,250 A | 5/2000 | Harwood et al. | |
| 6,058,480 A | 5/2000 | Brown | |
| 6,085,247 A | 7/2000 | Parsons et al. | |
| 6,088,451 A | 7/2000 | He et al. | |
| 6,091,951 A | 7/2000 | Sturniolo et al. | |
| 6,094,423 A | 7/2000 | Alfano et al. | |
| 6,101,543 A | 8/2000 | Alden et al. | |
| 6,112,085 A | 8/2000 | Garner et al. | |
| 6,131,116 A | 10/2000 | Riggins et al. | |
| 6,145,109 A | 11/2000 | Schuster et al. | |
| 6,147,986 A | 11/2000 | Orsic | |
| 6,154,461 A | 11/2000 | Sturniolo et al. | |
| 6,161,123 A | 12/2000 | Renouard et al. | |
| 6,166,729 A | 12/2000 | Acosta et al. | |
| 6,167,513 A | 12/2000 | Inoue et al. | |
| 6,169,992 B1 | 1/2001 | Beall et al. | |
| 6,170,057 B1 | 1/2001 | Inoue et al. | |
| 6,170,075 B1 | 1/2001 | Schuster et al. | |
| 6,198,920 B1 | 3/2001 | Doviak et al. | |
| 6,199,113 B1 | 3/2001 | Alegre et al. | |
| 6,201,962 B1 | 3/2001 | Sturniolo et al. | |
| 6,226,618 B1 | 5/2001 | Downs et al. | |
| 6,226,750 B1 | 5/2001 | Trieger | |
| 6,226,769 B1 | 5/2001 | Schuster et al. | |
| 6,230,004 B1 | 5/2001 | Hall et al. | |
| 6,233,617 B1 | 5/2001 | Rothwein et al. | |
| 6,233,619 B1 | 5/2001 | Narisi et al. | |
| 6,236,652 B1 | 5/2001 | Preston et al. | |
| 6,240,514 B1 | 5/2001 | Inoue et al. | |
| 6,243,753 B1 | 6/2001 | Machin et al. | |
| 6,249,818 B1 | 6/2001 | Sharma | |
| 6,256,739 B1 | 7/2001 | Skopp et al. | |
| 6,266,418 B1 | 7/2001 | Carter et al. | |
| 6,269,402 B1 | 7/2001 | Lin et al. | |
| 6,289,461 B1 | 9/2001 | Dixon | |
| 6,308,281 B1 | 10/2001 | Hall, Jr. et al. | |
| 6,336,135 B1 | 1/2002 | Niblett et al. | |
| 6,349,337 B1 | 2/2002 | Parsons et al. | |
| 6,360,265 B1 | 3/2002 | Falck et al. | |
| 6,415,329 B1 | 7/2002 | Gelman et al. | |
| 6,418,324 B1 | 7/2002 | Doviak et al. | |
| 6,421,768 B1 | 7/2002 | Purpura | |
| 6,449,651 B1 | 9/2002 | Dorfman et al. | |
| 6,484,206 B2 * | 11/2002 | Crump et al. | 709/227 |
| 6,487,690 B1 | 11/2002 | Schuster et al. | |
| 6,496,520 B1 | 12/2002 | Acosta | |

| | | | |
|---|---|---|---|
| 6,502,144 B1 | 12/2002 | Accarie | |
| 6,505,241 B2 | 1/2003 | Pitts | |
| 6,535,481 B1* | 3/2003 | Andersson et al. | 370/225 |
| 6,546,425 B1 | 4/2003 | Hanson et al. | |
| 6,560,650 B1 | 5/2003 | Imai | |
| 6,564,320 B1 | 5/2003 | de Silva et al. | |
| 6,574,239 B1 | 6/2003 | Dowling et al. | |
| 6,605,241 B2 | 8/2003 | Asakawa et al. | |
| 6,606,708 B1 | 8/2003 | Devine et al. | |
| 6,609,198 B1 | 8/2003 | Wood et al. | |
| 6,611,522 B1 | 8/2003 | Zheng et al. | |
| 6,671,729 B1 | 12/2003 | Gordon et al. | |
| 6,681,017 B1 | 1/2004 | Matias et al. | |
| 6,691,232 B1 | 2/2004 | Wood et al. | |
| 6,697,377 B1 | 2/2004 | Ju et al. | |
| 6,708,218 B1* | 3/2004 | Ellington et al. | 709/236 |
| 6,714,536 B1 | 3/2004 | Dowling | |
| 6,721,899 B1* | 4/2004 | Narvaez-Guarnieri et al. | 714/4 |
| 6,725,376 B1 | 4/2004 | Sasmazel et al. | |
| 6,732,314 B1* | 5/2004 | Borella et al. | 714/752 |
| 6,826,696 B1 | 11/2004 | Chawla et al. | |
| 6,832,260 B2 | 12/2004 | Brabson et al. | |
| 6,845,387 B1 | 1/2005 | Prestas et al. | |
| 6,857,071 B1 | 2/2005 | Nakae | |
| 6,874,086 B1 | 3/2005 | Gu et al. | |
| 6,993,652 B2 | 1/2006 | Medvinsky | |
| 6,996,631 B1 | 2/2006 | Aiken et al. | |
| 7,010,300 B1* | 3/2006 | Jones et al. | 455/439 |
| 7,017,049 B2* | 3/2006 | Hand et al. | 726/22 |
| 7,054,319 B2* | 5/2006 | Akahane et al. | 370/395.53 |
| 7,089,311 B2* | 8/2006 | Devine et al. | 709/227 |
| 7,103,028 B1* | 9/2006 | Yasue et al. | 370/338 |
| 7,401,114 B1* | 7/2008 | Block et al. | 709/203 |
| 2001/0037464 A1 | 11/2001 | Persels | |
| 2001/0056547 A1 | 12/2001 | Dixon | |
| 2002/0010866 A1* | 1/2002 | McCullough et al. | 713/201 |
| 2002/0029340 A1 | 3/2002 | Pensak et al. | |
| 2002/0035699 A1 | 3/2002 | Crosbie | |
| 2002/0056004 A1* | 5/2002 | Smith et al. | 709/227 |
| 2002/0069356 A1* | 6/2002 | Kim | 713/160 |
| 2002/0098840 A1 | 7/2002 | Hanson et al. | |
| 2002/0101857 A1* | 8/2002 | Heller | 370/352 |
| 2002/0115407 A1 | 8/2002 | Thompson et al. | |
| 2002/0116642 A1 | 8/2002 | Joshi et al. | |
| 2002/0142774 A1 | 10/2002 | Saint-Hilaire et al. | |
| 2002/0143955 A1* | 10/2002 | Shimada et al. | 709/227 |
| 2002/0164952 A1 | 11/2002 | Singhal et al. | |
| 2002/0165990 A1 | 11/2002 | Singhal et al. | |
| 2002/0178211 A1 | 11/2002 | Singhal et al. | |
| 2002/0194473 A1 | 12/2002 | Pope et al. | |
| 2003/0009571 A1* | 1/2003 | Bavadekar | 709/230 |
| 2003/0018913 A1* | 1/2003 | Brezak et al. | 713/201 |
| 2003/0043844 A1 | 3/2003 | Heller | |
| 2003/0069803 A1 | 4/2003 | Pollitt | |
| 2003/0078983 A1 | 4/2003 | Sullivan et al. | |
| 2003/0078985 A1 | 4/2003 | Holbrook et al. | |
| 2003/0093691 A1 | 5/2003 | Simon et al. | |
| 2003/0117992 A1 | 6/2003 | Kim et al. | |
| 2003/0120811 A1 | 6/2003 | Hanson et al. | |
| 2003/0163569 A1 | 8/2003 | Panasyuk et al. | |
| 2003/0233554 A1 | 12/2003 | Litai et al. | |
| 2004/0258003 A1 | 12/2004 | Kokot et al. | |
| 2005/0144186 A1 | 6/2005 | Hesselink et al. | |
| 2005/0149481 A1 | 7/2005 | Hesselink et al. | |
| 2005/0220086 A1 | 10/2005 | Dowling | |

FOREIGN PATENT DOCUMENTS

| | | |
|---|---|---|
| EP | 0 483 547 A1 | 5/1992 |
| EP | 0 483 551 A2 | 5/1992 |
| EP | 0 643 514 A2 | 3/1995 |
| EP | 0 679 980 A1 | 11/1995 |
| EP | 0 734 144 A2 | 9/1996 |
| EP | 0 851 628 A1 | 7/1998 |
| EP | 0 575 765 B1 | 10/1999 |
| EP | 1 351 467 | 10/2003 |
| GB | 2 168 831 A | 6/1986 |
| JP | 2000125029 A | 4/2000 |
| WO | WO 92/19059 A1 | 10/1992 |
| WO | WO 94/14114 | 6/1994 |
| WO | WO 94/28670 | 12/1994 |
| WO | WO 97/18635 | 5/1997 |
| WO | WO 98/52344 | 11/1998 |
| WO | WO 99/66675 | 12/1999 |
| WO | WO 99/66762 | 12/1999 |
| WO | WO 00/72506 A1 | 11/2000 |
| WO | WO 02/23362 A1 | 3/2002 |

OTHER PUBLICATIONS

Alexander, S. et al. "DHCP Options and BOOTP Vendor Extensions." retrieved from the internet at http://www.ietf.org/rfc/rfc2132.txt?number=2132, 29 pp., Mar. 1997.

Bakre, A. et al. "I-TCP: Indirect TCP for Mobile Hosts." Document DCS-TR-314, pp. 1-18, Rutgers University, Piscataway, New Jersey, Oct. 1994.

Berners-Lee, T. et al. "Hyptertext transfer protocol—HTTP/1.0" downloaded from the internet at http://www.w3.org/Protocols/rfc1945/rfc1945, pp. 1-60, May 1996.

Datability Software Systems, Inc. "Proposal Presented to Digital Equipment Corporation Large Systems Group, Marlboro, Massachusetts Jul. 7, 1983." 13 pp., 1983.

Droms, R. "Dynamic Host Configuration Protocol" retrieved from the internet at http://www.ietf.org/rfc/rfc2131.txt, 38 pp., 1997.

Information Sciences Institute "Transmission Control Protocol: DARPA Internet Program Protocol Specification." 85 pp., 1981.

International Business Machines Corporation "ARTour." 4 pp., 1995.

International Search Report to PCT/US2004/033334 (Jan. 5, 2005) 7 pages.

International Search Report to PCT/US2004/033794 (Jan. 20, 2005) 8 pages.

International Search Report to PCT/US2004/033333 (Jan. 17, 2005) 7 pages.

Ioannidis, J. et al. "IP-based protocols for mobile internetworking" in Proceedings of the ACM SIGCOMM Symposium on Communications, Architectures and Protocols, pp. 235-245, Sep. 1991.

Ioannidis, J. et al. "Protocols for supporting mobile IP hosts." Internet Draft, retrieval address unknown, 48 pp., Jun. 1992.

Ioannidis, J. et al. "The Design and Implementation of a Mobile Internetworking Architecture." 1993 Winter USENIX, Jan. 1993.

Kiiskinen, J. et al. "Data channel service for wireless telephone links." Publication C-1996-1, pp. 1-17, University of Helsinki, Department of Computer Science, Helsinki, 1996.

Kojo, M. et al. "Connecting mobile workstations to the internet over a digital cellular telephone network." Publication C-1994-39, pp. 1-16, University of Helsinki, Department of Computer Science, Helsinki, 1994.

Kojo, M. et al. "Enhanced communication services for mobile TCP/IP networking." Publication C-1995-15, pp. 1-22, University of Helsinki, Department of Computer Science, Helsinki, 1995.

Laamanen, H. "An experiment of dependability and performance of GSM access to fixed data network." Publication C-1995-41, pp. 1-21, University of Helsinki, Department of Computer Science, Helsinki, 1995.

Liljeberg, M. et al. "Enhanced services for world-wide web in mobile WAN environment." Publication C-1996-28, pp. 1-12, University of Helsinki, Department of Computer Science, Helsinki, 1996.

Liljeberg, M. et al. "Optimizing world-wide web for weakly connected mobile workstations: an indirect approach." 8pp., in Proc. 2nd International Workshop on Services in Distributed and Networked Environments (SDNE), Whistler, Canada, Jun. 1995.

M3I Systems, Inc. "M3i RadioLink (management through instant interactive information): Overview." 7pp., 1995.

Maltz, D. et al. "MSOCKS: an architecture for transport layer mobility.", 9 pp. in Proceedings of the IEEE INFOCOM '98, 1998.

Milligan, T. "iiif, The Integrated Interactive Intermedia Facility Design Report—CAVECAT Revision 1.2.2", 22 pp. Dynamic Graphics Project, University of Toronto, Toronto, 1991.

Montenegro, G. "Reverse Tunneling for Mobile IP," draft-ietf-mobileip-tunnel-reverse-00.txt, 15pp., retrieved from the internet at hegel.ittc.ukans.edu/topics/internet/internet-drafts/draft-i/draft-ietf-mobileip-firewall-trav-00.txt, Jan. 1997.

NetMotion Wireless "Netmotion wireless product documentation." 3 pp., retrieved from the internet at http://www.netmotionwireless.com/support/manuals, 2002.

Nodes Group "MOWGLI: Mobile Office Workstations using GSM Links" 3 pp., retrieved from the internet at http://www.cs.helsinki.fi/research/mowgli/, 2000.

PADCom, Inc. "Connectivity Suite Technical Overview." pp. i-ii, 1-40, Padcom, Inc., Bethlehem, PA, 2001.

Pankoke-Babatz, U. "1984/1988 X.400 recommendations—user requirements." Computer Communications 13(10):595-610, 1990.

Perkins, C.E. "Mobile networking through mobile IP." 15 pp., retrieved from the internet at www.computer.org/internet/v2n1/perkins.htm, Internet Computing Online, 1997.

Perkins, C.E. et al. "DHCP for mobile networking with TCP/IP." IEEE Symposium on Computers and Communications, p. 255-61, +1995.

Piscitello, D. et al. "Mobile Network Computing Protocol (MNCP)", 28 pp., retrieved from the internet at http://www.watersprings.org/pub/id/draft-piscitello-mncp-00.txt, 1997.

Postel, J., et al. "File Transfer Protocol (FTP)" IETF RFC 765, Oct. 1985.

Sun Microsystems, Inc. "RPC: Remote Procedure Call Protocol Specification Version 2" IETF RFC 1050, Jun. 1988.

TEKnique "Optimized TCP/IP over wireless" 5 pp. [publication date unknown].

TEKnique "TransNet II Wireless Gateway Services" 2 pp. [publication date unknown].

TEKnique "Transnet II: Wireless gateway." 3 pp., [publication date unknown].

TEKnique "TransRMail" 2pp. [publication date unknown].

TEKnique "TX1000" 2 pp., 1994.

TEKnique "TX2000" 2 pp. [publication date unknown].

TEKnique "TX5000" 2 pp., 1994.

Teraoka, F. et al. "A Network Architecture Providing Host Migration Transparency." In Proceedings of the ACM SIGCOMM Symposium on Communications, Architectures and Protocols, pp. 209-220, Sep. 1991.

Weiser, M. "Some computer science issues in ubiquitous computing" pp. 75-85 Communications of the ACM, Jul. 1993.

WRQ, Inc. "AtGuard Getting Started Guide." 6 pp. retrieved from the internet at http://www.atguard.com/help/docs/guide.html [publication date unknown].

WRQ, Inc. "Glossary." 8pp. retrieved from the internet at http://www.atguard.com/product_info/features.html [publication date unknown].

WRQ, Inc. "Tour of AtGuard's features." 8pp. retrieved from the internet at http://www.atguard.com/product_info/features.html [publication date unknown].

WRQ, Inc. "WRQ licenses AtGuard to Symantec and ASCII Network Technology." 1 p. retrieved from the internet at http://www.atguard.com/press_area/Welcome.html, 1999.

Written Opinion of the International Searching Authority to PCT/US2004/033334 (Oct. 8, 2004) 5 pages.

Written Opinion of the International Searching Authority to PCT/US2004/0033794 (Oct. 12, 2004) 6 pages.

Written Opinion of the International Searching Authority to PCT/US2004/033333 (Oct. 8, 2004) 7 pages.

"Network Neighborhood" http://www.internet.com, © 1999, internet.com.

Allison, et al. "File System Security: Secure Network Data Sharing for NT and UNIX" Network Appliance, Inc., Tecj Library, Jan. 16, 1998 pp. 1-16 (double-sided).

B. Clifford Neuman, "Proxy-Based Authorization and Accounting for Distributed Systems" © IEEE, May 25, 1993, pp. 283-291.

Charles Seife, "Algorithmic Gladiators Vie for Digital Glory" www.sciencemag.org, Science, vol. 288, May 19, 2000, pp. 1161 & 1163.

Howard Millman, "Give Your Computer the Finger" Computerworld, Mar. 27, 2000.

IBM: "IBM Operating System/2 Version 1.2 Profile Validation Hooks" pp. 1-26, Nov. 22, 1989.

Li Gong, "Using One-Way Functions for Authentication" University of Cambridge Computer Laboratory, Cambridge CB2 3QG, England Jul. 1989, pp. 8-11.

Mark Nicholson, "How to hold mobile users to account" Financial Times, Tuesday, May 2, 2000.

N.F. Maxemchuk, S. Low, "The Use of Communications Networks to Increase Personal Privacy" from IEEE INFOCOM '95, Proceedings, vol. 2, Apr. 2-6, 1995, pp. 504-512.

P.Y.A. Ryan, S.A. Schneider, "An attack on a recursive authentication protocol; A cautionary tale" Information Processing Letters 65, 1998 Elsevier Science, B.V., pp. 7-10.

Russel Kay, "Authentication" Computerworld, Mar. 27, 2000, pp. 77-79.

Tom Yager, "OS Paradise" BYTE, Nov. 1995.

Win95 Tutorial: Index of Topics, http://orion.valencia.cc.fl.us/tutprials/Win95demo.net.html, printed Dec. 27, 1999, 2 pages.

Written Opinion of the International Searching Authority to PCT/US02/018295 (Aug. 23, 2003), 5 pages.

TEKnique "Optimized TCP/IP over Wireless" 5 pages. 1994.

TEKnique "TransNet II Wireless Gateway Services" 2 pages. 1994.

TEKnique "TransNet II: Wireless Gateway" 3 pages. 1994.

TEKnique "TransRMail" 2 pages. 1994.

TEKnique "TX2000" 2 pages. 1994.

WRQ, Inc. "AtGuard Getting Started Guide" 6 pages. Retrieved from the Internet at http://atguard.com/help/docs/guide.html. 1999.

WRQ, Inc. "Glossary" 12 pages. Retrieved from the Internet at http://www.atguard.com/product_info/features.html. 1999.

WRQ, Inc. "Tour of AtGuard's Features" 8 pages. Retrieved from the Internet at http://www.atguard.com/product_info/features.html. 1999.

* cited by examiner

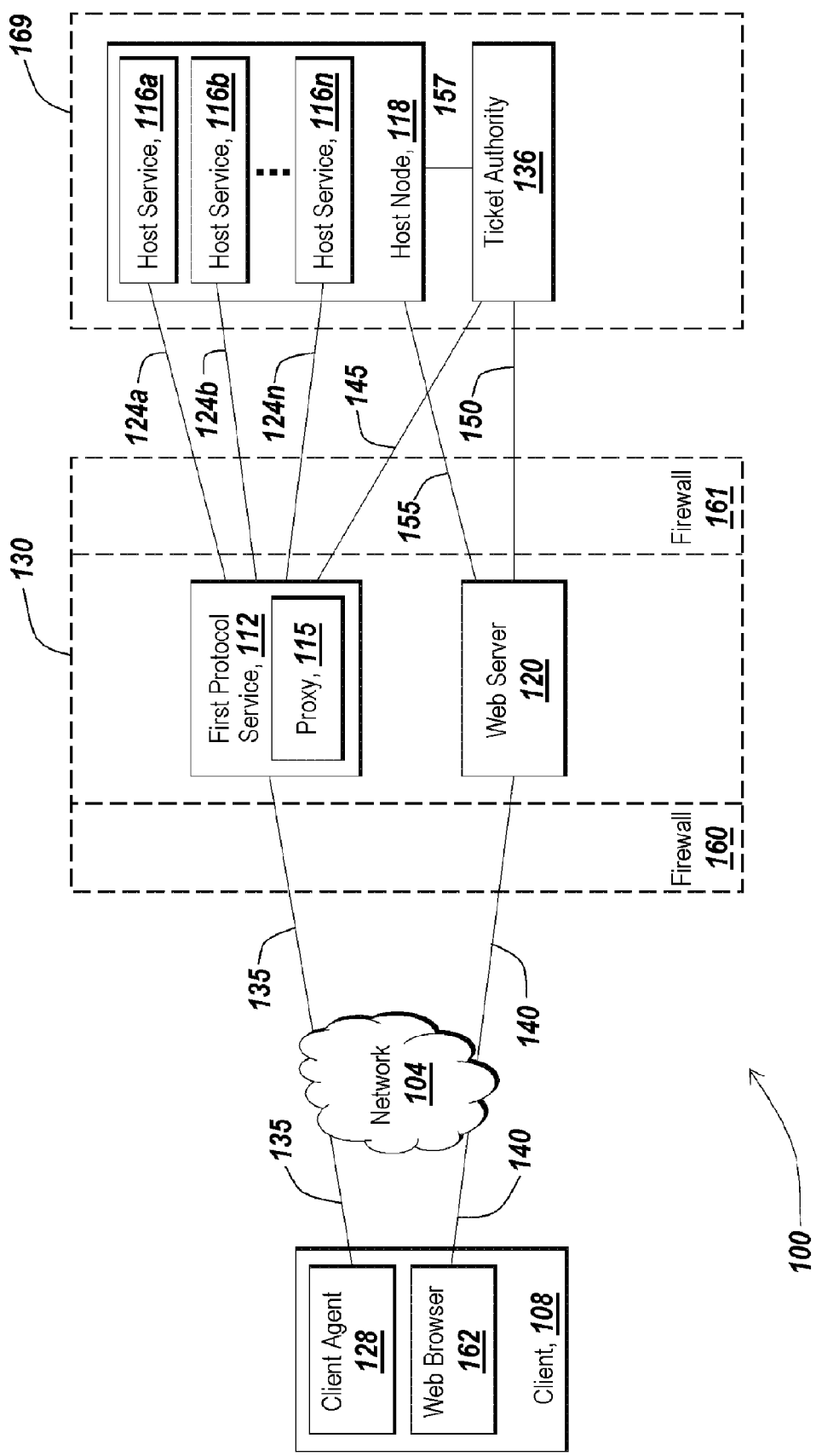

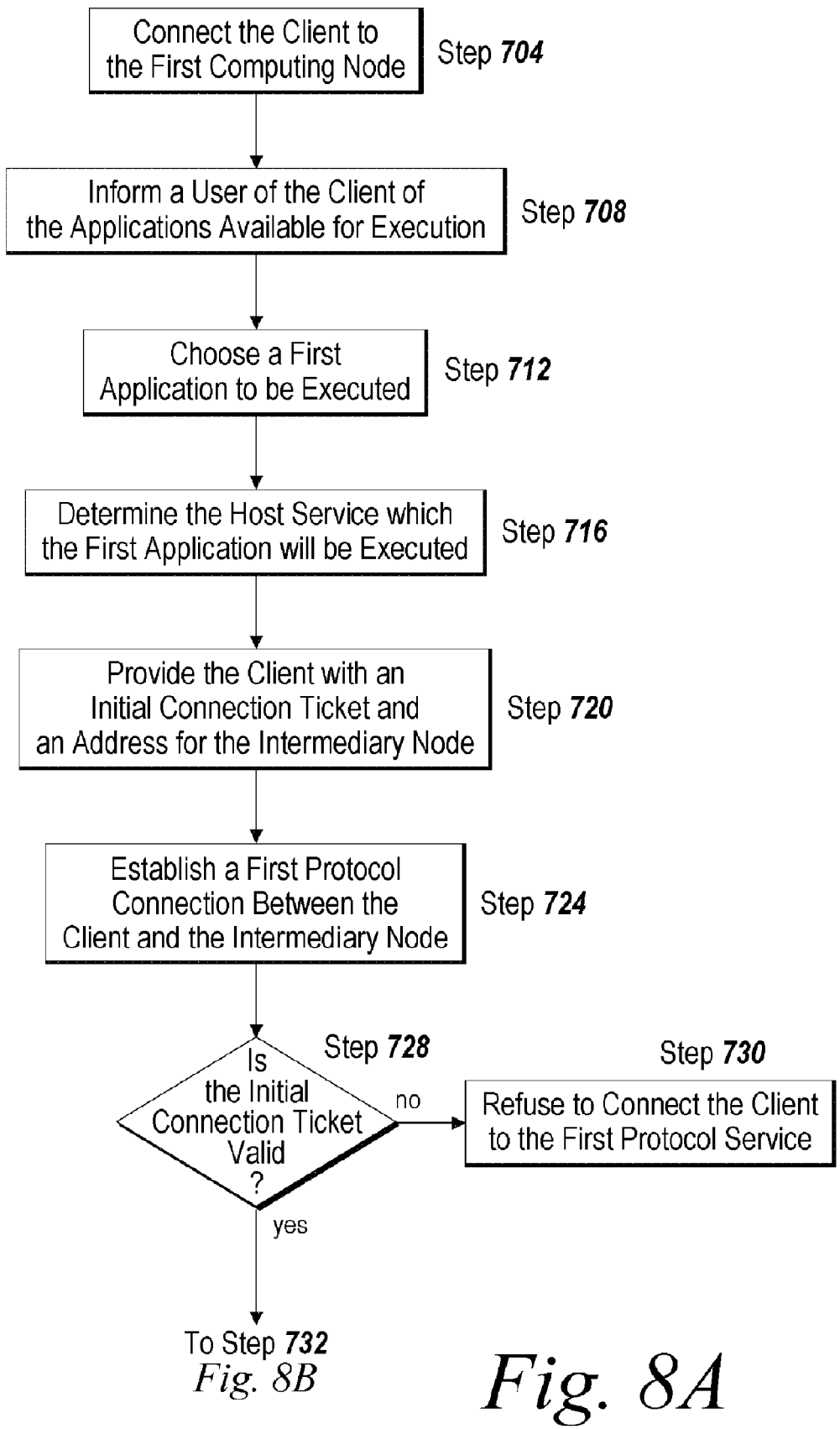

PERSISTENT AND RELIABLE SESSION SECURELY TRAVERSING NETWORK COMPONENTS USING AN ENCAPSULATING PROTOCOL

CROSS REFERENCE TO RELATED APPLICATIONS

The present invention is a continuation-in-part of U.S. patent application Ser. No. 10/083,324 filed Feb. 26, 2002, entitled "SECURE TRAVERSAL OF NETWORK COMPONENTS", and a continuation-in-part of U.S. patent application Ser. No. 10/683,381, filed Oct. 10, 2003 entitled "ENCAPSULATING PROTOCOL FOR SESSION PERSISTENCE AND RELIABILITY", of which the contents are incorporated herein by reference.

TECHNICAL FIELD

The invention generally relates to network communications. More particularly, the invention relates to systems and methods for reestablishing client communications by securely traversing network components using an encapsulating communication protocol to provide session persistence and reliability.

BACKGROUND INFORMATION

Communications over a network between two computers, for example, a client and a server, can be implemented using a variety of known communication protocols. Typically, the client communicates with the server to download content from the server over the network. For example, the server may host one or more applications accessible by the client. Furthermore, the client may communicate with the server via a proxy that is typically a security gateway, such as a router or firewall, through which content from the server passes. Additionally, the server may include a firewall to prohibit unauthorized communications to and from the server. The client gains access to the server and the content of the server through the security of the proxy and the firewall of the server. Often, however, the network connection traversing to the server via a proxy is susceptible to breakdown. For instance, a wireless connection between a client and a proxy is often unreliable. In other cases, the network connection is intermittent. As such, a connection can be lost when one enters an elevator or tunnel and may only be restored following one's exit from the elevator or tunnel.

If an established communication session between the client and the server computer abnormally terminates, the client generally has to re-establish the connection by starting a new communication session. To begin the new communication session, the user typically has to retransmit authentication credentials, such as a login/password pair, to the proxy and the server computer so that the user can be authorized for the new communication session. This retransmission of the authentication credentials of a user across multiple communication sessions repeatedly exposes the authentication credentials of that user to potential attackers, thereby decreasing the level of security of the authentication credentials. Furthermore, if an attacker bypasses the security of the proxy or the firewall of the server, the attacker may gain access to the content of the server without encountering additional security. In addition, having the user re-enter authentication credentials is often a slow process that may result in user frustration and inefficiency.

When communicating over a network connection using many current protocols, data packets are lost when the network connection is disrupted. For example, when communicating via a standard TCP network connection, data buffers are typically flushed upon disruption of the connection. As such, when the network connection is restored, a networked application, such as a user session on a server, is unable to resume where it was prior to disruption. Typically an error message is displayed, adding user frustration to inconvenience. Moreover, communicating over a network with many protocols often requires frequent re-establishment of the transport connection. For example, using HTTP, either on its own or on conjunction with a proxy protocol, to browse a website over a standard TCP connection requires, in addition to a new HTTP connection for each resource, the closure of a previous TCP/proxy protocol connection and the opening of a new TCP/proxy protocol connection for each resource.

Thus, it is desirable to provide a technique for re-establishing a communication session between a client computer and a server computer without requiring repeated transmission of the client's authentication credentials and while increasing the protection of the server from an unauthorized user. Improved systems and methods are needed for re-establishing a communication session between a client computer and a server computer without repeatedly transmitting the authentication credentials to securely traverse multiple network components.

SUMMARY OF THE INVENTION

The present invention relates to systems and methods for reconnecting a client to a persistent and reliable connection with a host service, in which the connection securely traverses network components. Reconnecting the client includes re-establishing the client's connection to the host service and re-authenticating the user of the client to the host service, including re-authenticating one or more of the connections between the client and the host service. A persistent and reliable connection to a host service is maintained by one or more first protocol services on behalf of a client. The first protocol services ensure that data communicated between the client and the host service is buffered and maintained during any disruption in the network connection between the client and the host service. For example, a temporary disruption in a network connection may occur when a client, such as a mobile client, roams between different access points in the same network, or when a client switches between networks (e.g., from a wired network to a wireless network).

In addition to maintaining buffered data during a network disruption, the first protocol service re-authenticates the client to the host service when re-establishing the client's connection to the first protocol service. This prevents the user of the client from re-entering authentication credentials to re-establish its connection with the host service. Moreover, each of the multiple connections between the client and the host service, for example, via a first protocol service acting as a proxy, is re-authenticated to provide additional security protection in accessing the host service. After re-authenticating, the first protocol service re-links the client's connection to the host service. In summary, the present invention provides for re-establishing a network connection between a client and a host service to securely traverse network components to the server and without the user reentering authentication credentials.

In one aspect, the present invention relates to a method for re-connecting a client to a host service. The method comprises the step of providing a communication session between a client and a host service via a first connection between the client and a first protocol service, and a second connection between the first protocol service and the host service. The method further includes detecting a disruption in one of the first connection and the second connection, and maintaining the other of one of the first connection and the second connection. In another step of the method, the first protocol service obtains a first ticket and a second ticket, and validates the first ticket to re-establish the disrupted connection. The first protocol service validates the second ticket to continue use of the maintained connection, and links the re-established connection to the maintained connection.

In one embodiment, the method comprises maintaining the communication session during the disruption in the disrupted connection. In another embodiment, the method further comprises generating one of the first ticket and the second ticket by at least one of the first protocol service and a ticket authority. The method may include validating, by the ticket authority, at least one of the first ticket and the second ticket.

In another embodiment, the method further comprises authenticating the client to a web server and transmitting by the web server the first ticket to the client. The method may further comprise authenticating, by the host service, the client upon establishment of the communication session. In one embodiment, the method includes transmitting, by the client, the first ticket to the first protocol service.

In a further embodiment, the first protocol service comprises a proxy server. In another embodiment, the first protocol service comprises a security gateway. The method may further include the client and the first protocol service communicating using a first protocol encapsulating a second protocol, and the first protocol service and the host service communicating using the second protocol.

In another embodiment, the first ticket is valid for the first connection, and the second ticket is valid for the second connection. Optionally, the second ticket may be disabled until the first ticket is validated. In one embodiment, the re-established connection is linked to the maintained connection after the first ticket and the second ticket are validated.

In a further embodiment, either or both of the first connection and the second connection may comprise a plurality of connections connected via one of an intermediary node and one or more first protocol services. The method may further include generating a third ticket for at least one of the plurality of connections. The third ticket may be valid for the least one of the plurality of connections.

In another aspect, the present invention relates to a system for re-connecting a client to a host service. The system comprises a client and a first protocol service. The client establishes a communication session with a host service via a first connection. The first protocol service establishes the first connection with the client and a second connection with the host service. The first protocol service maintains a connection comprising at least one of the first connection and the second connection. Furthermore, the first protocol service validates a first ticket to re-establish a disrupted connection in one of the first connection and the second connection, and validates a second ticket to use the other of the one of the first connection and the second connection. The system further includes the first protocol service linking the re-established connection to the maintained connection.

In one embodiment, the system further comprises a ticket authority generating at least one of the first ticket and the second ticket. In another embodiment, the first protocol service maintains the communication session during a disruption in the disrupted connection. In a further embodiment, the first protocol service generates at least one of the first ticket and the second ticket. The system may include the ticket authority validating at least one of the first ticket and the second ticket.

In another embodiment, the system further comprises a web server. The web server authenticates the client, and, in one embodiment, transmits the first ticket to the client. In a further embodiment, the client transmits the first ticket to the first protocol service. In yet another embodiment, the host service authenticates the client upon establishment of the communication session.

In one embodiment, the first protocol service comprises a proxy server, and, in another embodiment, the first protocol service may comprise a security gateway. The system may include the client and the first protocol service communicating using a first protocol encapsulating a second protocol, and the first protocol service and the host service communicating using the second protocol.

In a further embodiment, the first ticket is valid for the first connection, and the second ticket is valid for the second connection. Additionally, the second ticket may be disabled until the first ticket is validated. In one embodiment, the first protocol service links the re-established connection to the maintained connection after the first ticket and the second ticket are validated.

In yet a further embodiment, one of the first connection and the second connection comprises a plurality of connections connected via one of an intermediary node and one or more first protocol services. The system further includes generating a third ticket for at least one of the plurality of connections, and in one embodiment, the third ticket is valid for the least one of the plurality of connections.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 1A is a block diagram of a system for providing a client with a reliable connection to a host service according to an illustrative embodiment of the invention;

FIGS. 8A-8C are flow diagrams of a method for connecting a client to a plurality of host services according to an illustrative embodiment of the invention;

DESCRIPTION

Figure 1B:
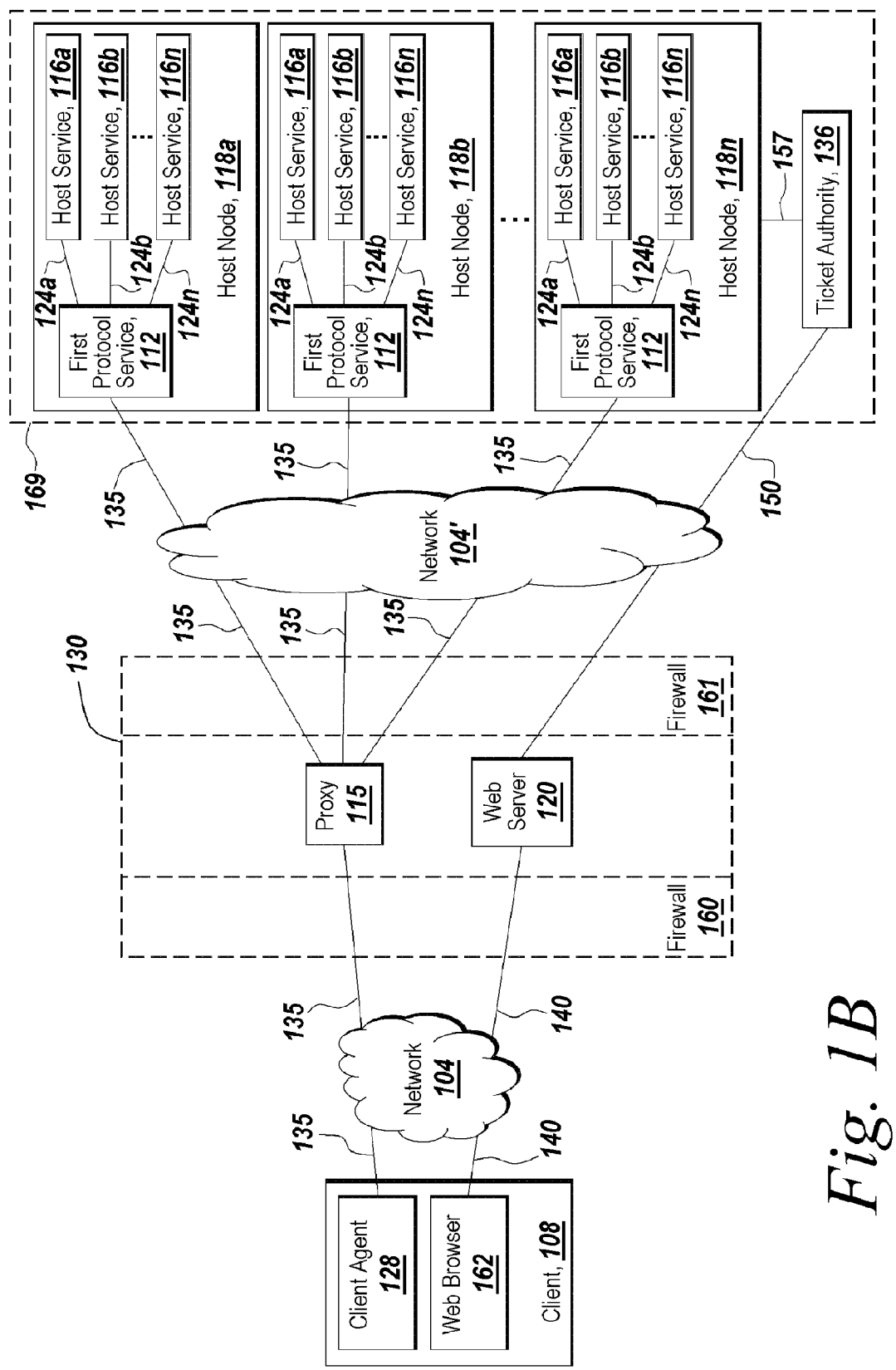
FIG. 1B is a block diagram of a system for providing a client with a reliable connection to a host service according to another illustrative embodiment of the invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the present invention provides systems and methods for establishing a reliable and persistent connection between a client and a host service, and reconnecting the connection when there is a disruption in the connection. A client establishes a communication session with a host service via a first connection between a client and a first protocol service and a second connection between the first protocol service and the host service. The client communicates with the first protocol service using a first protocol and the first protocol service communicates with the host service using a second protocol. The second protocol is communicated from the client to the first protocol service encapsulated within the first protocol communications. When a disruption in the either the first connection or second connection is detected, the first protocol service re-establishes the disrupted connection while maintaining the connection that is not disrupted. The disrupted connection is linked with the maintained connection to re-connect the client to the host service.

Furthermore, the illustrative embodiment of the present invention provides systems and methods for securely traversing network components in establishing and reconnecting a client to a host service. The first protocol service may act as a proxy between the client and the host service and as such, may comprise a security gateway. The first protocol service obtains a first ticket and a second ticket from a ticket authority. The first ticket is used for validating the connection between the client and the first protocol service, and the second ticket is used for validating the connection between the first protocol service and the host service. The second ticket may be disabled until the first ticket is validated. The first protocol service validates the first ticket in re-establishing or maintaining the use of the first connection, and the second ticket in re-establishing or maintaining the use of the second connection. When the first and second tickets are validated and the connections re-established, the first protocol service links the first connection with the second connection to maintain the client's communication session with the host service. Additional tickets can be generated and validated for re-establishing or maintaining the user additional connections, or "hops", between the client and the host service. In this manner, each connection, or "hop", between the client and the host service is validated.

Referring to FIG. 1A, in general, the invention pertains to network communications and can be particularly useful for providing a client with a reliable connection to a host service. In a broad overview, a system 100 for network communications includes a client 108 (e.g., a first computing device) in communication with a first protocol service 112 (e.g., a second computing device) over a network 104. Also included in the system 100 are a plurality of host services 116a-116n residing on a host node 188 (e.g., third computing device) that are in communication with the first protocol service 112 and, through the first protocol service 112 and over the network 104, with the client 108. Alternatively, in another illustrative embodiment of the invention, and with reference now to FIG. 1B, the first protocol service 112 and the host services 116a-116n are not implemented on separate computing devices, as shown in FIG. 1A, but, rather, they are incorporated into the same computing device, such as, for example, host node 118a. In FIG. 1B, the host services 116a-116n communicate with the first protocol service 112 over the network 104'. The system 100 can include one, two, or any number of host nodes 118a-118n.

In one embodiment, the networks 104 and 104' are separate networks, as in FIG. 1B. The networks 104 and 104' can be the same network 104, as shown in FIG. 1A. In one embodiment, the network 104 and/or the network 104' is, for example, a local-area network (LAN), such as a company Intranet, or a wide area network (WAN), such as the Internet or the World Wide Web. The client 108, the first protocol service 112, the host services 116a-116n, and/or the host nodes 118a-118n can be connected to the networks 104 and/or 104' through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above.

The client 108 is in communication with the first protocol service 112 over the client-first protocol service communication channel 135 and also in communication with the web server 120 over the client-web server communication channel 140. The first protocol service 112 is in communication with the ticket authority 136 over a first protocol service-authority communication channel 145 and the web server 120 is in communication with the ticket authority 136 over a web server-authority communication channel 150. The first protocol service 112 is also in communication with the host node 118 over first protocol service-server communication channels 124a-124n. In another embodiment, the web server 120 can communicate with the host node 118 over an agent-server communication channel 155. Similarly, the host node 118 can communicate with the ticket authority 136 over a ticket-server communication channel 157. In one embodiment, the respective communication channels 124a-124n, 135, 140, 145, 150, 155, 157 are established over the network 104.

Example embodiments of the communication channels 124a-124n, 135, 140, 144, 150, 155, 157 include standard telephone lines, LAN or WAN links (e.g., T1, T3, 56 kb, X.25), broadband connections (ISDN, Frame Relay, ATM), and wireless connections. The connections over the communication channels 124a-124n, 135, 140, 144, 150, 155, 157 can be established using a variety of communication protocols (e.g., HTTP, HTTPS, TCP/IP, IPX, SPX, NetBIOS, Ethernet, RS232, messaging application programming interface (MAPI) protocol, real-time streaming protocol (RTSP), real-time streaming protocol used for user datagram protocol scheme (RTSPU), the Progressive Networks Multimedia (PNM) protocol developed by RealNetworks, Inc. of Seattle, Wash., manufacturing message specification (MMS) protocol, and direct asynchronous connections).

In another aspect, FIG. 1A shows a block diagram of an embodiment of a communications system 100 for secure delivery of content. In one embodiment, the first protocol service 112 comprises a proxy 115 and the system 100 includes a web server 120, and a ticket authority 136. The system 100 also includes two firewalls 160, 161 which prohibit unauthorized communications to/from the host node 118. The network between the firewalls 160, 161 is often referred to as a "demilitarized zone," (DMZ) 130. In one embodiment, the DMZ 130 includes the ticket protocol service 112, comprising a proxy 115, and the web server 120.

The DMZ 130 separates the host services 116a-116n from the components (e.g., first protocol service 112) of the system 100 that are accessible by unauthorized individuals. As described above, the DMZ 130 is delineated with two firewalls 160, 161 that prohibit unauthorized communication. The first firewall 160 and the second firewall 161 each apply a set of policy rules to determine which messages can traverse the DMZ 130. In one embodiment, the first firewall 160 and the second firewall 161 apply the same set of policy rules. Alternatively, the first firewall 160 and the second firewall 161 may apply different sets of policy rules. Each firewall 160, 161 can be a router, computer, or any other network access control device. In another embodiment, the system 100 includes one of the firewalls 160, 161 or no firewall 160, 160. In another embodiment, one of the firewalls 160, 161 is deployed on the host node 118. In another embodiment (not shown), one or more of the firewalls 160, 161 are deployed on an intermediary node.

In one embodiment, the first protocol service 112 includes a proxy 115 which comprises a security gateway through which messages over the client-first protocol service communication channel 135 must pass. In one embodiment, the network firewall 160 repudiates any incoming message from the client-first protocol service communication channel 135 that does not have the first protocol service 112 as its destination. Likewise, the network firewall 160 repudiates any outgoing message for the client-first protocol service communication channel 135 unless its source is the first protocol service 112. Although illustrated as a proxy 115 of the first protocol service 112, the security gateway can alternatively be a router, firewall, relay, or any network component that can provide the necessary security. In another embodiment, the proxy 115 is a network component separate from the first protocol service 112 that may run on the same computing device of the first protocol service 112 or on a different computing device. For example, in FIG. 1B, the proxy 115 is separated from the first protocol service 112. The proxy 115 is in the DMZ 130 with the web server 120. Multiple instances of the first protocol service 112 are running on each of the host nodes 118a-118n. Each first protocol service 112 communicates with the proxy 115 over the communication channel 135, which is the client-first protocol service communication channel 135. In this case, the proxy 115 component is an intermediary for securely passing communications between the client 108 and the first protocol service 112.

The network 104 can be a local-area network (LAN), a wide area network (WAN), or a network of networks such as the Internet or the World Wide Web (i.e., web). The respective communication channels 124a-124n, 135, 140, 145, 150, 155, 157 may each be part of different networks. For example, the client-first protocol service communication channel 135 can belong to a first network (e.g., the World Wide Web) and the client-web server communication channel 140 can belong to a second network (e.g., a secured extranet or Virtual Private Network (VPN)). In other embodiments, the network 104 spans the DMZ 230 as well as the server farm 169 and the same communication protocol is used throughout. In some embodiments, no firewall 160 separates the first protocol service 112 and web server 120 from the host node 118 and ticket authority 136.

Example embodiments of the communication channels 124a-124n, 135, 140, 144, 150, 155, 157 include standard telephone lines, LAN or WAN links (e.g., T1, T3, 56 kb, X.25), broadband connections (ISDN, Frame Relay, ATM), and wireless connections. The connections over the communication channels 124a-124n, 135, 140, 144, 150, 155, 157 can be established using a variety of communication protocols (e.g., HTTP, HTTPS, TCP/IP, IPX, SPX, NetBIOS, Ethernet, RS232, messaging application programming interface (MAPI) protocol, real-time streaming protocol (RTSP), real-time streaming protocol used for user datagram protocol scheme (RTSPU), the Progressive Networks Multimedia (PNM) protocol developed by RealNetworks, Inc. of Seattle, Wash., manufacturing message specification (MMS) protocol, and direct asynchronous connections).

The client 108 can be any workstation, desktop computer, laptop, handheld computer, mobile telephone, smart or dumb terminal, network computer, wireless device, information appliance, minicomputer, mainframe computer or other form of computing or telecommunications device that is capable of communication and that has sufficient processor power and memory capacity to perform the operations described herein. Additionally, the client 108 can be a local desktop client on a local network 104 or can be a remote display client of a separate network 104'. The client 108 can include, for example, a visual display device (e.g., a computer monitor), a data entry device (e.g., a keyboard), persistent and/or volatile storage (e.g., computer memory), a processor, and a mouse. Operating systems supported by the client 108 can include any member of the WINDOWS family of operating systems from Microsoft Corporation of Redmond, Wash., Macintosh operating system, JavaOS, and various varieties of Unix (e.g., Solaris, SunOS, Linux, HP-UX, A/IX, and BSD-based distributions), or any other operating system capable of supporting the client 108 in performing the operations described herein.

In one embodiment, the client 108 includes a web browser 162, such as INTERNET EXPLORER developed by Microsoft Corporation in Redmond, Wash., to connect to the web. In a further embodiment, the web browser 162 uses the existing Secure Socket Layer (SSL) support to establish the secure client-web server communication channel 140 to the web server 120. SSL is a secure protocol developed by Netscape Communication Corporation of Mountain View, Calif., and is now a standard promulgated by the Internet Engineering Task Force (IETF).

In some embodiments, as shown in FIGS. 1A and 1B, a client agent 128 is included within the client 108. The client agent 128 may be used for establishing and exchanging communications with the host service 116a-116n over the client-first protocol service communication channel 135. The client agent 128 can be, for example, implemented as a software program and/or as a hardware device, such as, for example, an ASIC or an FPGA. The client agent 128 can use any type of protocol and it can be, for example, an HTTP client agent, an FTP client agent, an Oscar client agent, or a Telnet client agent. In one embodiment, the client agent 128 is an ICA client, developed by Citrix Systems, Inc. of Fort Lauderdale, Fla., and is hereafter referred to as ICA client 128. Other embodiments of the client agent 128 include an RDP client, developed by Microsoft Corporation of Redmond, Wash., a data entry client in a traditional client/server application, an ActiveX control, or a java applet. In some embodiments, the client agent 128 is itself configured to communicate using the first protocol. In some embodiments (not shown), the client 108 includes a plurality of client agents 128a-128n, each of which communicates with a host service 116a-116n, respectively. Moreover, the output of an application executing on the host service 116a-116n can be displayed at the client 108 via, for example, the client agent 128 or the web browser 162.

In another embodiment, a standalone client agent is configured to enable the client 108 to communicate using the first protocol. The standalone client agent can be incorporated within the client 108 or, alternatively, the standalone client agent can be separate from the client 108. The standalone client agent is, for example, a local host proxy. In general, the standalone client agent can implement any of the functions described herein with respect to the client agent 128.

Similarly, with reference to FIG. 1A, each of the first protocol service 112 and the host services 116a-116n can be provided on any computing device that is capable of communication and that has sufficient processor power and memory capacity to perform the operations described herein. Alternatively, where the functionality of the first protocol service 112 and the host services 116a-116n are incorporated into the same computing device, such as, for example, one of the host nodes 118a-118n, as in FIG. 1B, the first protocol service 112 and/or the host services 116a-116n can be implemented as a software program running on a general purpose computer and/or as a special purpose hardware device, such as, for example, an ASIC or an FPGA.

Similar to the client 108, each of the host nodes 118a-118n can be any computing device described above (e.g. a personal computer) that is capable of communication and that has sufficient processor power and memory capacity to perform the operations described herein. Each of the host nodes 118a-118n can establish communication over the communication channels 124a-124n using a variety of communication protocols (e.g., ICA, HTTP, TCP/IP, and IPX). SPX, NetBIOS, Ethernet, RS232, and direct asynchronous connections).

In one embodiment, each of the host services 116a-116n hosts one or more application programs that are remotely available to the client 108. Applications made available to the client 108 for use may be referred to as published applications. The same application program can be hosted by one or any number of the host services 116a-116n. Examples of such applications include word processing programs, such as MICROSOFT WORD, and spreadsheet programs, such as MICROSOFT EXCEL, both of which are available from Microsoft Corporation of Redmond, Wash. Other examples of application programs that may be hosted by any or all of the host services 116a-116n include financial reporting programs, customer registration programs, programs providing technical support information, customer database applications, and application set managers. Moreover, in one embodiment, one or more of the host services 116a-116n is an audio/video streaming server that provides streaming audio and/or streaming video to the client 108. In another embodiment, the host services 116a-116n include file servers that provide any/all file types to the client 108. In one embodiment, the host services 116a-116n can communicate with the client 108 using a presentation protocol such as ICA, from Citrix Systems, Inc. of Ft. Lauderdale, Fla. or RDP, from Microsoft Corporation of Redmond, Wash.

In a further embodiment, the host node 118 is a member of a server farm 169, or server network, which is a logical group of one or more servers that are administered as a single entity. In one embodiment, a server farm 169 includes multiple host nodes 118a-118n (generally 118). Although the embodiment shown in FIG. 1B has three host nodes 118a-118n, the server farm 169 can have any number of host nodes 118, or servers. In other embodiments, the server farm 169 is a protected network that is inaccessible by unauthorized individuals, such as corporate Intranet, Virtual Private Network (VPN), or secure extranet. Additionally, the servers making up the server farm 169 may communicate over any of the networks described above (e.g., WAN, LAN) using any of the protocols discussed.

The ticket authority 136, which in the embodiment shown in FIG. 1A is part of the server farm 169, issues one or more tickets to authenticate the client 108. In particular, the ticket authority 136 enables authentication of the client 108 over one communication channel (i.e., the client-web server communication channel 140) based on authentication credentials. The ticket authority 136 further enables the client 108 to be authenticated to another communication channel (i.e., client-first protocol service communication channel 135) without having the client 108 repeatedly provide authentication credentials on the other communication channel.

In one embodiment, the ticket authority 136 is a standalone network component. In other embodiments, a modular ticket authority 136 is a software module residing on one or more host nodes 118. For example, there may be a ticket authority 136 for each of the host nodes 118a-118n as shown in FIG. 1B. In this embodiment, the web server 120 may communicate with the ticket authority 136 and/or the host node 118 over the agent-server communication channel 155. In another embodiment, the ticket authority 136 may reside on an intermediary node separate from any of the host nodes 118a-118n.

In one embodiment, the ticket authority 136 generates a first ticket and a second ticket. In some embodiments, the tickets are both nonces. In further embodiments, the tickets are generated using a cryptographic random number generator that has been suitably seeded with randomness. The first ticket is transmitted to the client 108 and is used to establish a first communication session between the client 108 and the first protocol service 112. The second ticket is transmitted to the first protocol service 112 and is used to establish a second communication session between the first protocol service 112 and the host node 118.

In one embodiment, the web server 120 delivers web pages to the client 108. The web server 120 can be any personal computer (e.g., Macintosh computer, a personal computer having an Intel microprocessor, developed by Intel Corporation of Santa Clara, Calif., a personal computer having an AMD microprocessor, developed by Advanced Micro Devices, Inc. of Sunnyvale, Calif., etc.), Windows-based terminal, Network Computer, wireless device (e.g., cellular phone), information appliance, RISC Power PC, X-device, workstation, mini computer, main frame computer, personal digital assistant, or other communications device that is capable of establishing the secure client-web server communication channel 140 with the client 108.

In another embodiment, the web server 120 provides a corporate portal, also referred to as an Enterprise Information Portal, to the client 108. Enterprise portals are company web sites that aggregate, personalize and serve applications, data and content to users, while offering management tools for organizing and using information more efficiently. In other embodiments, the web server 120 provides a web portal, or Internet portal, to the client 108. A web portal is similar to a corporate portal but typically does not include business-specific information.

In one embodiment, a user of the client 108 employs the web browser 162 to authenticate the user to the web server 120. In one embodiment, the client 108 transmits user credentials, such as login and password information, to the web server 120. The web server 120 verifies that the user has access to the server network 169.

In a further embodiment, the web browser 162 uses SSL to establish the secure client-web server communication channel 140. The web browser 162 can alternatively connect to the web server 120 over the client-web server communication channel 140 using other security protocols, such as, but not limited to, Secure Hypertext Transfer Protocol (SHTTP) developed by Terisa Systems of Los Altos, Calif., HTTP over SSL (HTTPS), Private Communication Technology (PCT) developed by Microsoft Corporation of Redmond, Wash., and the Transport Level Security (TLS) standard promulgated by the Internet Engineering Task Force (IETF). In one embodiment, the web server 120 transmits a web portal or enterprise portal, as described above, to the client 108 upon validation of the user to enable the client 108 to request an application or a server desktop, for example, to be remotely displayed on the client 108.

The client-web server communication channel 140 is any secure communication channel. In some embodiments, communications over channel 140 are encrypted. In certain of these embodiments, the client 108 and the web server 120 may communicate using the Secure Socket Layer (SSL) of the HyperText Transfer Protocol (HTTPS). Alternatively, the client 108 and the web server 120 may use other encryption techniques, such as symmetric encryption techniques, to protect communications.

Further, in one embodiment the client-first protocol service communication channel 135 can be established by using, for example, a presentation services protocol such as Independent Computing Architecture (ICA) protocol, manufactured by Citrix Systems, Inc. of Fort Lauderdale, Fla. ICA is a general-purpose presentation services protocol designed to run over industry standard network protocols, such as TCP/IP, IPX/SPX, NetBEUI, using industry-standard transport protocols, such as ISDN, frame relay, and asynchronous transfer mode (ATM). The ICA protocol provides for virtual channels, which are session-oriented transmission connections that can be used by application-layer code to issue commands for exchanging data. In other embodiments, the client-first protocol service communication channel 135 can be established using the thin X protocol or the Remote Display Protocol (RDP), developed by Microsoft Corporation of Redmond, Wash.

Although described as establishing a first communication session between the client 108 and the first protocol service 112 and a second communication session between the first protocol service 112 and the host node 118, the communication session can be viewed as a single, logical communication session between the client 108 and the host service 116.

Referring still to the illustrative embodiments of FIGS. 1A and 1B, the client 108 is configured to establish a connection 135 between the client 108 and a first protocol service 112 over the network 104 using a first protocol. For its part, the first protocol service 112 is configured to accept the connection 135. The client 108 and the first protocol service 112 can, therefore, communicate with one another using the first protocol as described below in reference to FIGS. 2A-2B and FIG. 3.

As also described further below, the first protocol service 112 is, in one embodiment, itself configured to communicate using the first protocol. The first protocol service 112 is configured to establish a connection 124a-124n between the first protocol service 112 and the host service 116a-116n, respectively. For example, the first protocol service 112 can establish a connection 124a between the first protocol service 112 and one host service 116a and a connection 124b between the first protocol service 112 and another host service 116b. In one embodiment, the first protocol service 108 separately establishes such connections 124a-124n (i.e., the first protocol service 112 establishes one connection at a time). In another embodiment, the first protocol service 112 simultaneously establishes two or more of such connections 124a-124n.

In yet another embodiment, the first protocol service 112 can concurrently establish and maintain multiple connections 124a-124n. The first protocol service 112 is configured to provide two or more connections 124a-124n without interrupting the connection 135 with the client 108. For example, the first protocol service 112 can be configured to establish the connection 124a between the first protocol service 112 and the host service 116a when a user of the client 108 requests execution of a first application program residing on the host service 116a. When the user ends execution of the first application program and initiates execution of a second application program residing, for example, on the host service 116b, the first protocol service 112 is, in one embodiment, configured to interrupt the connection 124a and establish the connection 124b between the first protocol service 112 and the host service 116b, without disrupting the connection 135 between the first protocol service 112 and the client 108.

The first protocol service 112 and the host services 116a-116n can communicate over the connections 124a-124n, respectively, using any one of a variety of secondary protocols, including, but not limited to, HTTP, FTP, Oscar, Telnet, the ICA remote display protocol from Citrix Systems, Inc. of Fort Lauderdale, Fla., and/or the RDP remote display protocol from Microsoft Corporation of Redmond, Wash. For example, the first protocol service 112 and the host service 116a can communicate over the connection 124a using the ICA remote display protocol, while the first protocol service 112 and the host service 116b can communicate over the connection 124b using the RDP remote display protocol.

In one embodiment, the secondary protocol used for communicating between the first protocol service 112 and a host service 116, such as, for example, the ICA remote display protocol, includes a plurality of virtual channels. A virtual channel is a session-oriented transmission connection that is used by application-layer code to issue commands for exchanging data. For example, each of the plurality of virtual channels can include a plurality of protocol packets that enable functionality at the remote client 108. In one embodiment, one of the plurality of virtual channels includes protocol packets for transmitting graphical screen commands from a host service 116, through the first protocol service 112, to the client 108, for causing the client 108 to display a graphical user interface. In another embodiment, one of the plurality of virtual channels includes protocol packets for transmitting printer commands from a host service 116, through the first protocol service 112, to the client 108, for causing a document to be printed at the client 108.

In another embodiment, the first protocol is a tunneling protocol. The first protocol service 112 encapsulates a plurality of secondary protocols, each used for communication between one of the host services 116a-116n and the first protocol service 112, within the first protocol. As such, the host services 116a-116n and the first protocol service 112 communicate with the client 108 via the plurality of secondary protocols. In one embodiment, the first protocol is, for example, an application-level transport protocol, capable of tunneling the multiple secondary protocols over a TCP/IP connection.

Figure 2A:
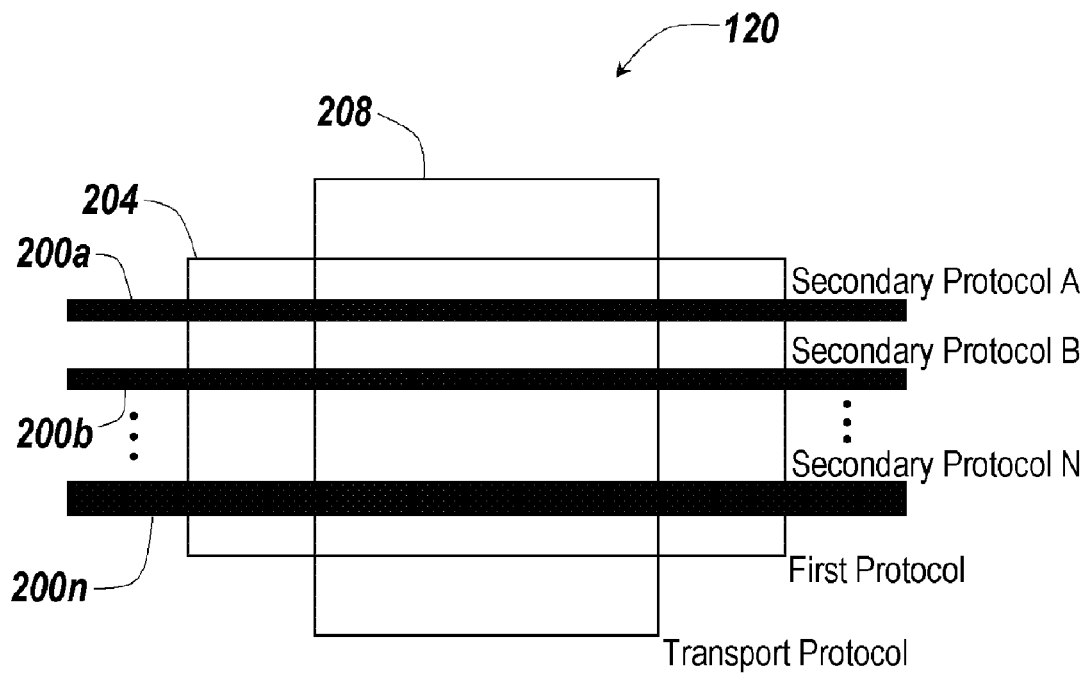
FIG. 2A depicts communications occurring over a network according to an illustrative embodiment of the invention.

Referring to FIG. 2A, communications between the client 108 and the first protocol service 112 via the connection 135 take the form of a plurality of secondary protocols 200a-200n (e.g., HTTP, FTP, Oscar, Telnet, ICA, and/or RDP) encapsulated within a first protocol 204. This is indicated by the location of secondary protocols 200a-200n inside the first protocol 204. Where secure communication is not called for, the first protocol 204 can be, as illustrated in FIG. 2A, communicated over an unsecured TCP/IP connection 208.

Figure 2B:
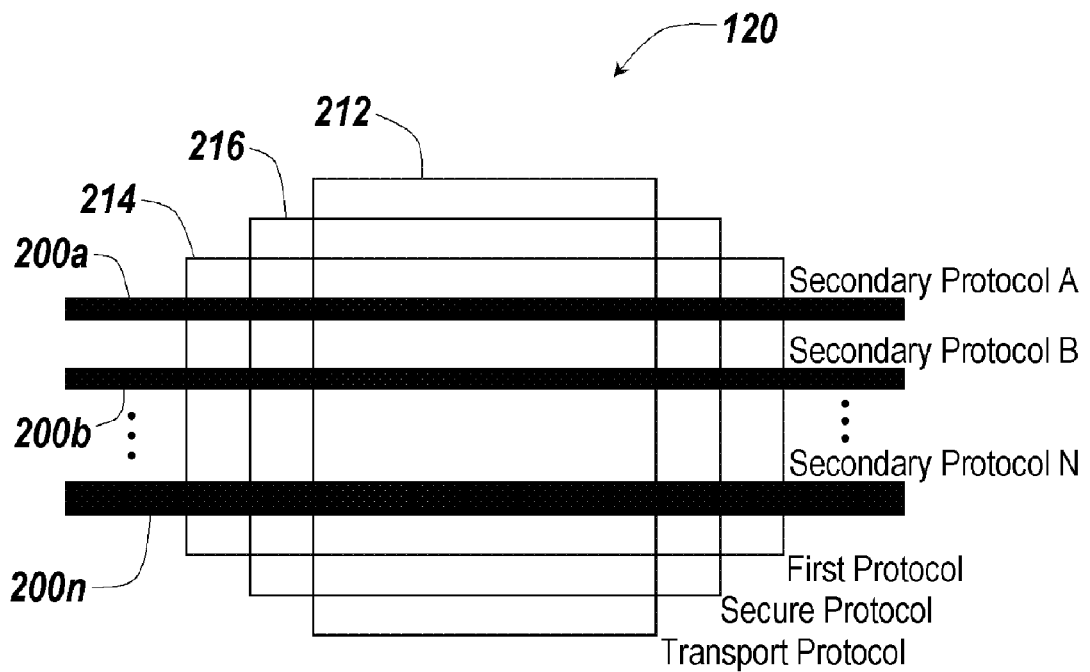
FIG. 2B depicts communications occurring over a network according to another illustrative embodiment of the invention.

Referring now to FIG. 2B, if secure communication is used, the first protocol 204 is communicated over an encrypted connection, such as, for example, a TCP/IP connection 212 secured by using a secure protocol 216 such as the Secure Socket Layer (SSL). SSL is a secure protocol first developed by Netscape Communication Corporation of Mountain View, Calif., and is now a standard promulgated by the Internet Engineering Task Force (IETF) as the Transport Layer Security (TLS) protocol and described in IETF RFC-2246.

Thus, the plurality of secondary protocols 200a-200n are communicated within the first protocol 204 with (FIG. 2B) or without (FIG. 2A) a secure protocol 216 over the connection 135. The secondary protocols that can be used to communicate over the connections 124a-124n include, but are not limited to, HTTP, FTP, Oscar, Telnet, ICA, and RDP. Moreover, in one embodiment, at least one of the secondary protocols, as described above, includes a plurality of virtual channels, each of which can include a plurality of protocol packets enabling functionality at the remote client 108. For example, in one embodiment, one host service 116a is a web server, communicating with the first protocol service 112 over the connection 124a using the HTTP protocol, and another host service 116b is an application server, communicating with the first protocol service 112 over the connection 124b using the ICA protocol. The host service 116b generates both protocol packets for transmitting graphical screen commands to the client 108, for causing the client 108 to display a graphical user interface, and protocol packets for transmitting printer commands to the client 108, for causing a document to be printed at the client 108.

Another aspect of the present invention is the method and systems described herein reduce the number of times network connections are opened and closed. In one embodiment, the first protocol 204 allows the secondary protocol connections 200a-200n tunneled therein, such as, for example, an HTTP connection 200n, to be opened and/or closed, repetitively, without also requiring the transport connection over which the first protocol 204 is communicated (e.g., TCP connection 208 and/or 212), the secure protocol connection 216, or the first protocol connection 204 itself to similarly be repetitively opened and/or closed. Without the encapsulation of the first protocol 204, the secondary protocol 200a-200n may frequently open and close network connections, such as TCP connections. This would add significant delays and overhead to the system. These delays and overhead would be further increased by the use of a secure encapsulation protocol 214, such as SSL, which have significant overhead in establishing network connections. By encapsulating the secondary protocol 200a-200n within the first protocol 204 and maintaining the connection of the transport connection (208, 212), the secondary protocols 200a-200n, as part of the payload of the first protocol 204, do not need to perform frequent and costly open and closes of the network connection 135. Furthermore, since the secondary protocols 200a-200n can be communicated within the first protocol 204 with a secure protocol 216, the secondary protocols 200a-200n also do not need to open and close secured connections such as with SSL. The transport connection (208, 212) establishes and maintains the network connection 135 so that the encapsulated second protocols 200a-200n can be communicated without repetitively opening and closing the secured or unsecured network connection 135. This significantly increases the speed of operation in communicating the secondary protocols 200a-200n.

As described above, the secondary protocols 200a-200n carry protocol packets related to applications using such protocols as HTTP, FTP, Oscar, Telnet, RDA or ICA. The secondary protocol packets 304a-304n transport data related to the application functionality transacted between the client 108 and the host service 116a-116n. For example, a user on the client 108 may interact with a web page provided by a host service 116a-116n. In transactions between the client 108 and the host service 116a-116n, the secondary protocol 200a-200n encapsulated in the first protocol 204 may have http protocol packets related to displaying the web page and receiving any user interaction to communicate to the host service 116a-116n. Since the transport connection (208, 212) is not maintained by the secondary protocols 200a-200n, the secondary protocols 200a-200n do not need to handle any network-level connection interruptions. As such, the secondary protocols 200a-200n may not provide any network-level connection interruption information in their payloads. In the above example, the http related secondary protocol packets 304a-304n of the secondary protocol 200a-200n transmitted to the client 108 would not provide a notification that a network interruption occurred, e.g., an error message on a web page. Therefore, the user on the client 108 will not be notified of any network-level connection interrupts through the secondary protocol 200a-200n. This effectively hides the network connection interruptions from the user during the use of the applications related to the secondary protocols 200a-200n.

Figure 3:
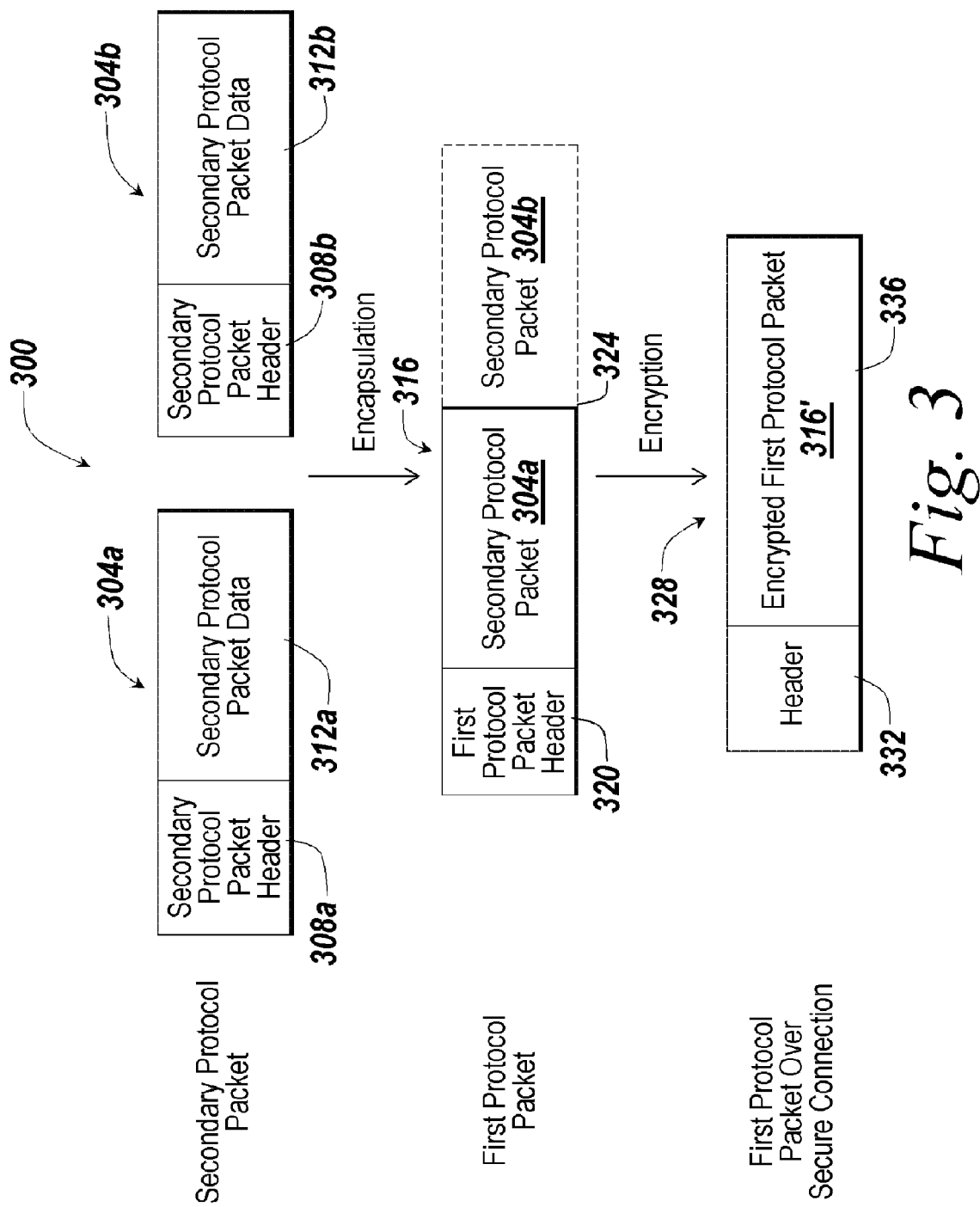
FIG. 3 depicts a process for encapsulating a plurality of secondary protocols within a first protocol for communication over a network according to an illustrative embodiment of the invention.

Referring to FIG. 3, an example process 300 used by the first protocol service 112 and the client agent 128 of the client 108 encapsulates the plurality of secondary protocols 200 (e.g., HTTP, FTP, Oscar, Telnet, ICA, and/or RDP) within the first protocol 204 for communication via the connection 135. Optionally, as described below, the example process 300 used by the first protocol service 112 and the client agent 128 of the client 108 also compresses and/or encrypts the communications at the level of the first protocol prior to communications via the connection 135. From the point of view of the first protocol service 112, secondary protocol packets 304a-304n are received via the connections 124a-124n at the first protocol service 112. For example, two secondary protocol packets 304a and 304b are received by the first protocol service 112. One, two, or any number of secondary protocol packets 304a-

304*n* can be received. In one embodiment, the secondary protocol packets 304*a*-304*n* are transmitted by the host services 116 to the first protocol service 112 over the connection 124. The secondary protocol packets 304*a*-304*n* include a header 308 and a data packet 312, also referred to as a data payload.

Following receipt of the secondary protocol packets 304*a*-304*n*, the first protocol service 112 encapsulates one or more of the secondary protocol packets 304 within a first protocol packet 316. In one embodiment, the first protocol service 112 generates a first protocol packet header 320 and encapsulates within the data payload 324 of the first protocol packet 316 one or more secondary protocol packets 304*a*-304*n*, such as, for example, two secondary protocol packets 304*a* and 304*b*. In another embodiment, only one secondary protocol packet 304*a* is encapsulated in each first protocol packet 316.

In one embodiment, the first protocol packets 316 are then transmitted over the connection 135, for example over the connection 208 described with reference to FIG. 2A, to the client agent 128 of the client 108. Alternatively, in another embodiment, the first protocol service 112 is further configured to encrypt, prior to the transmission of any first protocol packets 316, communications at the level of the first protocol 204. In one such embodiment, the first protocol packets 316 are encrypted by using, for example, the SSL protocol described with reference to FIG. 2B. As a result, a secure packet 328, including a header 332 and an encrypted first protocol packet 316' as a data payload 336, is generated. The secure packet 328 can then be transmitted over the connection 135, for example over the secure TCP/IP connection 212 illustrated in FIG. 2B, to the client agent 128 of the client 108.

In another embodiment, the first protocol service 112 is further configured to compress, prior to the transmission of any first protocol packets 316, communications at the level of the first protocol 204. In one embodiment, prior to encrypting the first protocol packet 316, the first protocol service 112 compresses, using a standard compression technique, the first protocol packet 316. As such, the efficiency of the system 100 is improved.

Referring again to FIGS. 1A-1B, the system 100 of the present invention, in one embodiment, provides the remote client 108 with a persistent connection to a host service 116, such as, for example, the host service 116*a*. For example, if the client 108 establishes a connection 135 between the client 108 and the first protocol service 112 and the first protocol service 112 establishes a connection 124*a* between the first protocol service 112 and the host service 116*a*, then either the client agent 128, the first protocol service 112, or both are configured to maintain a queue of the first protocol data packets most recently transmitted via the connection 135. For example, the queued data packets can be maintained by the client agent 128 and/or the first protocol service 112 both before and upon a failure of the connection 135. Moreover, upon a failure of the connection 135, the first protocol service 112 and, likewise, the host service 116*a* are configured to maintain the connection 124*a*.

Following a failure of the connection 135, the client 108 establishes a new connection 135 with the first protocol service 112, without losing any data. More specifically, because the connection 124*a* is maintained upon a failure of the connection 135, a newly established connection 135 can be linked to the maintained connection 124*a*. Further, because the most recently transmitted first protocol data packets are queued, they can again be transmitted by the client 108 to the first protocol service 112 and/or by the first protocol service 112 to the client 108 over the newly established connection 135. As such, the communication session between the host service 116*a* and the client 108, through the first protocol service 112, is persistent and proceeds without any loss of data.

In one embodiment, the client agent 128 of the client 108 and/or the first protocol service 112 number the data packets that they transmit over the connection 135. For example, each of the client agent 128 and the first protocol service 112 separately numbers its own transmitted data packets, without regard to how the other is numbering its data packets. Moreover, the numbering of the data packets can be absolute, without any re-numbering of the data packets, i.e., the first data packet transmitted by the client agent 128 and/or the first protocol service 112 can be numbered as No. 1, with each data packet transmitted over the connection 135 by the client agent 128 and/or the first protocol service 112, respectively, consecutively numbered thereafter.

In one such embodiment, following a disrupted and re-established connection 135, the client agent 128 and/or the first protocol service 112 informs the other of the next data packet that it requires. For example, where the client agent 128 had received data packets Nos. 1-10 prior to the disruption of connection 135, the client agent 128, upon re-establishment of the connection 135, informs the first protocol service 112 that it now requires data packet No. 11. Similarly, the first protocol service 112 can also operate as such. Alternatively, in another such embodiment, the client agent 128 and/or the first protocol service 112 informs the other of the last data packet received. For example, where the client agent 128 had received data packets Nos. 1-10 prior to the disruption of connection 135, the client agent 128, upon re-establishment of the connection 135, informs the first protocol service 112 that it last received data packet No. 10. Again, the first protocol service 112 can also operate as such. In yet another embodiment, the client agent 128 and/or the first protocol service 112 informs the other, upon re-establishment of the connection 135, of both the last data packet received and the next data packet it requires.

In such embodiments, upon re-establishment of the connection 135, the client agent 128 and/or the first protocol service 112 can retransmit the buffered data packets not received by the other, allowing the communication session between a host service 116 and the client 108, through the first protocol service 112, to proceed without any loss of data. Moreover, upon re-establishment of the connection 135, the client agent 128 and/or the first protocol service 112 can flush from each of their respective buffers the buffered data packets now known to be received by the other.

Although buffering data for a persistent connection is generally discussed in terms of a single first protocol service 112, the data buffering and re-connection techniques discussed above also apply in a similar manner to a client's communication session with a host service 116 that traverse multiple first protocol services 112. One or more of the additional first protocol service 112 may buffer a portion or all of the data traffic between the client 108 and the host service 116. In another embodiment, a first protocol service 112 managing one of the "hops" between a client and the host service 116 may buffer the data sent to and received from that "hop." As such, one or more of the first protocol services 112 may be used for re-transmitting data packets upon re-establishment of a disrupted connection between the client 108 and the host service 116.

By providing the client 108 with a reliable and persistent connection to a host service 116*a*-116*n*, the present invention avoids the process of opening a new user session with the host service 116*a*-116*n* by maintaining the user session through network connection interruptions. For each user session with a host service 116a-116n, the client 108 and the host service 116a-116n may maintain session specific context and caches, and other application specific mechanisms related to that instance of the user session. For each new user session established, these session specific context and caches need to be re-populated or re-established to reflect the new user session. For example, a user on the client 108 may have an http session with a host service 116a-116n. The host service 116a-116n may keep context specific to providing this instance of the http session with the client 108. The context may be stored in the memory of the server, in files of the server, a database or other component related to providing the functionality of the host service 116a-116n. Also, the client 108 may have local context specific to the instance of the http session, such as a mechanism for keeping track of an outstanding request to the host service 116a-116n. This context may be stored in memory of the client 108, in files on the client 108, or other software component interfaced with the client 108. If the connection between the client 108 and the host service 116a-116n is not persistent, then a new user session needs to be established with new session specific context on the host service 116a-116n and the client 108. The present invention maintains the session so that a new session, and therefore new specific session context, does not need to be re-established.

The present invention maintains the user session through network level connection interruptions and without notification to the user of the client that the session was interrupted. In operation of this aspect of the invention, the first protocol service 112 establishes and maintains a first connection with a client 108 and a second connection with a host service 116a-116n. Via the first connection and the second connection, a session between the client 108 and the host service 116a-116n is established. The first protocol service 112 can store and maintain any session related information such as authentication credentials, and client 108 and host service 116a-116n context for the established session. A user on the client 108 will exercise the functionality provided by the host service 116a-116n through the established session. As such, related secondary protocol packets 304a-304n will contain data related to the transaction of such functionality. These secondary protocol packets 304a-304n as part of the secondary protocol 200a-200n are encapsulated and communicated in a first protocol 204. Upon detection of a disruption in either the first connection or the second connection, the first protocol service 112 can re-establish the disrupted connection while maintaining the other connection that may have not been disrupted. The network connection disruption may cause an interruption to the session between the client 108 and the host service 116a-116n. However, since the transport mechanism is not maintained by the secondary protocols 200a-200n, the session can be re-established after the network connection is re-established without the user on the client 108 having notification that the session was interrupted. The secondary protocol 200a-200n does not need to contain any interruption related information to transmit to the client 108. Thus, the interruption of the session caused by the network connection disruption is effectively hidden from the user because of the encapsulation of the first protocol 204.

The first protocol service 112 maintaining session related information can re-establish the session between the client 108 and the host service 116a-116n. For example, if the first connection between the client 108 and the first protocol service 116 is disrupted, the first protocol service 112 can keep the client's 108 session active or open between the first protocol service 112 and the host service 116a-116n. After the first connection is re-established, the first protocol service 112 can link the session of the client 108 to the maintained session between the first protocol service 112 and the host service 116. The first protocol service 112 can send to the client 108 any data that was queued prior to the disruption in the first connection. As such, the client 108 will be using the same session prior to the disruption, and the host service 116a-116n and client 108 can continue to use any session specific context that may have in memory or stored elsewhere. Furthermore, because of the intermediary of the first protocol service 112, the host service 116a-116n may not be aware of the network disruption between the first protocol service 112 and the client 108.

In another example, if the second connection between the first protocol service 112 and the host service 116a-116n is disrupted, the first protocol service can maintain the first connection with the client 108 while re-establishing the second connection with the host service 116a-116n. After re-establishing the second connection, the first protocol service 112 can re-establish the client's session, on behalf of the client, with the host service 116a-116n. Since the first protocol service 112 was maintaining any session relation information, the first protocol service may re-establish the same session or a similar session so that the client 108 is not aware of the disruption in the second network connection and the resulting disruption to the session between the first protocol service 112 and the host service 116a-116n. During re-establishing the second network connection and the session, the first protocol service 112 can queue any session transactions sent by the client 108 during the disruption. Then, after re-establishing the session with the host service 116a-116n, the first protocol service 112 can transmit the queued transactions to the host service 116a-116n and the session can continue normally. In this manner, the client 108 continues to operate as if there was not an interruption to the session.

Additionally, by providing a reliable and persistent connection, the present invention also avoids interruptions to transactions, commands or operations as part of the functionality exercised between the client 108 and a host node 118, or a host service 116a-116n. For example, a file copy operation using Windows Explorer has not been designed to continue working after there is a disruption in a network connection. A user on the client 108 may use the file copy feature of Windows Explorer to copy a file from the client 108 to a host node 118. Because of the size of the file or files, this operation may take a relatively extended period of time to complete. If during the middle of the operation of the copy of the file to the host node 118, there is an interruption in the network connection between the client 108 and the host node 118, the file copy will fail. Once the network connection is re-established, the user will need to start another file copy operation from Windows Explorer to copy the file from the client 108 to the host node 118. Under the present invention, the user would not need to start another file copy operation. The network connection would be re-established as part of the first protocol 204 connection. The file copy operations would be encapsulated in the payload of the secondary protocols 200a-200n. As such, the file copy of Windows Explorer would not get notified of the interruption in the network connection and therefore, would not fail. The first protocol service 112 would re-establish any connections and transmits any queued data so that operation can continue without failure. The first protocol service 112 would maintain a queue of the data related to the file copy operations that has not been transferred to the host node 118 because of the interruption in the network connection. Once the network connection is re-established, the first protocol service 112 can transmit the queued data and then continue on with transferring the data related to the file copy operation in due course.

Although this aspect of the invention is described in terms of a file copy operation example, one ordinarily skilled in the art will recognize that any operation, transaction, command, function call, etc. transacted between the client 108 and the host node 118, or host service 116a-116n, can be maintained and continued without failure from the network connection disruption, and, furthermore, without the client 108 recognizing there was a disruption or having notice of the disruption.

Furthermore, by providing a reliable and persistent connection, the present invention also enables a client 108 to traverse through different network topologies without re-starting a session or an application on the client 108. For example, the client 108 may be a computer notebook with a wireless network connection. As the client 108 moves from a first wireless network to a second wireless network, the client's network connection 135 may be temporarily disrupted from the first wireless network as a network connection is established with the second wireless network. The second wireless network may assign a new network identifier, such as a host name or internet protocol address, to the client 108. This new network identifier may be different than the network identifier assigned to the client 108 by the first wireless network. In another example, the client 108 may be physically connected through an Ethernet cable to a port on the network. The physical connection may be unplugged and the client 108 moved to another location to plug into a different port on the network. This would cause a disruption into the network connection 135 and possible a change in the assigned network identifier. Without the present invention, any sessions with a host service 116a-116n on the client 108 or application on the client 108 accessing the network may need to be restarted due to the change in the network topology, the disruption to the network connection 135, and/or the change in the assigned network identifier. By the method and systems described herein, the present invention maintains the network connection for the client and automatically re-established the client's 108 network connection including handling changes in the network topology and network identifier. The client 108, and any applications or sessions on the client 108, can continue to operate as if there was not a network connection disruption or a change in the network identifier. Furthermore, the user on the client 108 may not recognize there were any interruptions or changes, and the client 108 may not receive any notice of such interruptions.

In another aspect, the present invention relates to securely establishing a communication session between the client 108 and the host service 116 via multiple connections or "hops" that traverse multiple network components, such as a proxy, security gateway, firewall or router. The establishment of the multiple hop secure communication session may further be initiated via a secure client-web server communication channel 140, for example, between the web browser 162 and the web server 120 using SSL. The ticket authority 136 can provide tickets for each of the hops such as the client-first protocol service connection 135 and the first protocol service to host service connections 124a-124n. In this manner, the client 108 is authenticated through all the connections between the client 108 and the host service 116a-116n.

Figure 4:
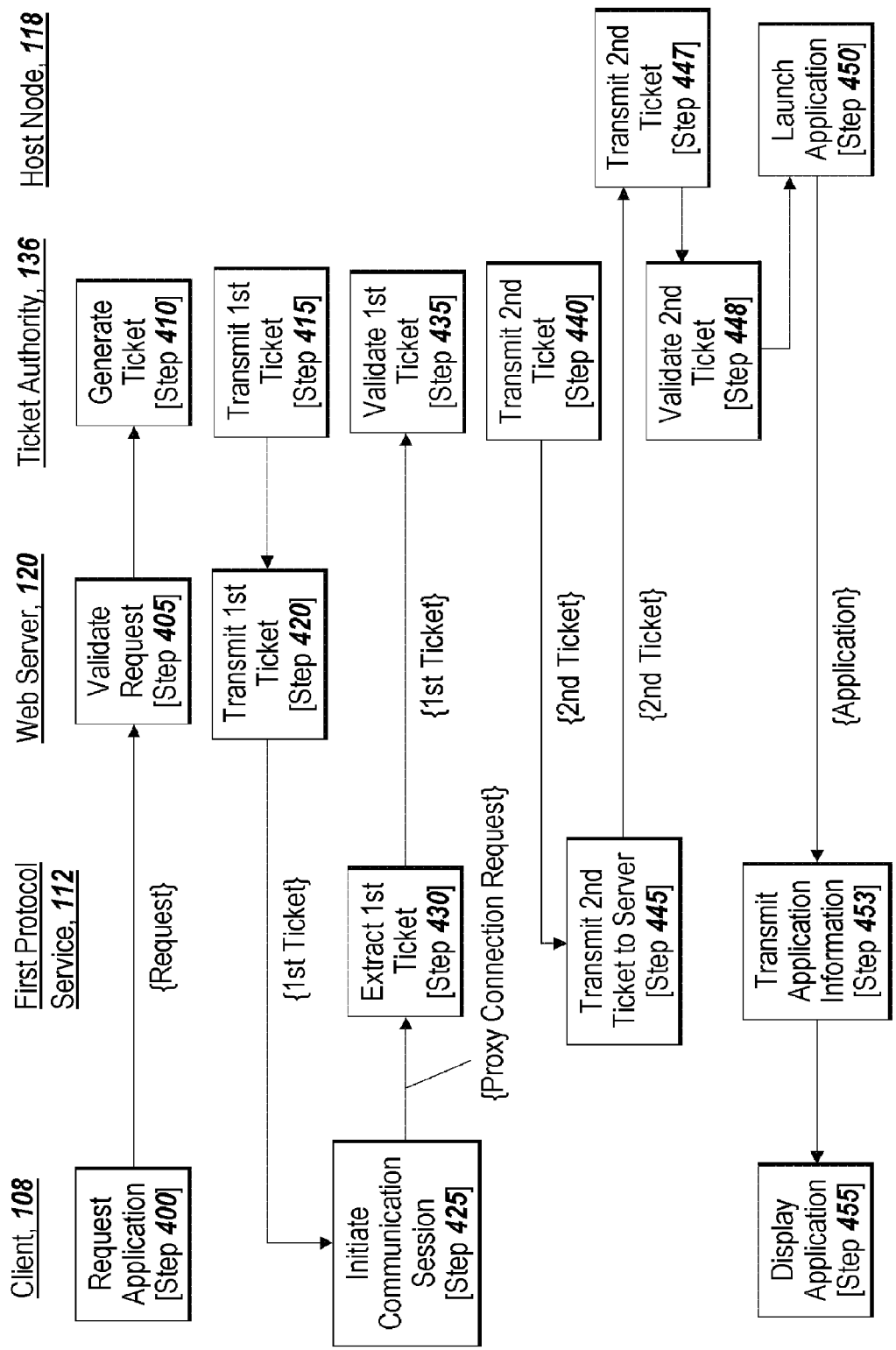
FIG. 4 is a flow diagram illustrating an embodiment of the operation of the communications system of FIGS. 1A-1B in accordance with the invention.

In operation, and also referring to FIG. 4, the client user requests (step 400) content (e.g., an application, a server desktop) to be remotely displayed on the client 108 (i.e., the ICA client 128). In another embodiment, the client 108 uses the web browser 162 to request an application and the web server 120 then authenticates the user. After receiving the request, the web server 120 validates (step 405) the request with the ticket authority 136. The ticket authority 136 then generates (step 410) a ticket, which includes a first ticket, or client ticket, and a second ticket, or first protocol service ticket. The first and second tickets are "one-time use" tickets having no further value after their first use. In a further embodiment, the first and second tickets must be used within a predetermined time period.

In one embodiment, the ticket authority 136 stores the first and second tickets in memory (e.g., RAM) until the ticket is used. Alternatively, the ticket authority 136 stores the first and second tickets in a storage device (not shown) until the ticket is used. The storage device may include, for example, a database or a persistent memory (e.g., on a floppy disk, hard disk drive). The ticket authority 136 subsequently transmits (step 415) the client ticket to the web server 120 and the web server 120 then forwards (step 420) the client ticket to the client 108.

The client 108 then initiates (step 425) a communication session with the first protocol service 112 by transmitting a proxy connection request over the client-first protocol service communication channel 135. The proxy connection request includes the client ticket. In one embodiment, the proxy connection request also includes a dummy password that can be replaced by the first protocol service 112 when establishing a communication session with the host node 118. In a further embodiment, the web server 120 transmits the dummy password to the client 108 for future generation of a proxy connection request having a format acceptable to the first protocol service 112. The first protocol service 112 then extricates (step 430) the client ticket from the proxy connection request and forwards the client ticket to the ticket authority 136 for validation. The ticket authority 136 then validates (step 435) the first ticket. In one embodiment, the ticket authority 136 verifies the first ticket by searching its storage device (e.g., database) for the first expected ticket.

If the ticket authority 136 does not find the first ticket in the storage device (such as if the first ticket has been used already), the ticket authority 136 ends the communication session. If the received ticket matches the client ticket that the ticket authority 136 expects, the client ticket is validated. The ticket authority 136 then transmits (step 440) the second or first protocol service ticket to the first protocol service 112. Additionally, the ticket authority 136 deletes the client ticket from the storage device, as the client ticket has now been used once. In another embodiment, the ticket authority 136 also transmits the Internet protocol (IP) address of the host node 118 to the first protocol service 112. In yet another embodiment, the ticket authority 136 transmits the domain name of the host node 118 to the first protocol service 112 for future conversion into the IP address.

The first protocol service 112 receives the second ticket, or the first protocol service ticket, and subsequently opens communications across the proxy-server communication channel 145 by transmitting (step 445) the second ticket to the host node 118. The host node 118 receives the first protocol service ticket and then transmits the ticket over the ticket-server communication channel 157 to the ticket authority 136 for validation (step 447). In one embodiment, if the ticket authority 136 determines that the first protocol service ticket received from the host node 118 has been used previously or does not have the correct value (i.e., the same value as the value stored in the associated storage device), the ticket authority 136 transmits an error message to the first protocol service 112 (or the web server 120) to terminate the established communication session with the client 108. If the ticket authority 136 validates the first protocol service ticket (step 448), the host node 118 then launches (step 450) the ICA published application. The host node 118 then transmits application information to the first protocol service 112 (step 453) for remote displaying of the application on the client 108 (step 455) using the ICA client 128.

In a further embodiment, the client 108 launches the ICA client 128 when initiating communications with the first protocol service 112 in step 425. In other embodiments, the client 108 launches the ICA client 128 when the client 108 receives the application information from the first protocol service 112 in step 453.

Thus, the client 108 is not aware of the first protocol service ticket but only the client ticket. Moreover, the ICA client 128 cannot access the host node 118 without communicating with the first protocol service 112 and presenting the client ticket.

The ticket authority 136 could also transmit the first protocol service ticket to the first protocol service 112 in step 440 as the user password for the user of the client 108. This allows the first protocol service 112 to use the first protocol service ticket as the login password to gain access to the host node 118 without exposing the user's login password over the untrusted part of the web (i.e., the non-secure client-first protocol service communication channel 135 during step 425). Thus, in one embodiment, the communications system 100 could include a centralized password mapping database managed by the ticket authority 136 and co-located with the host node 118 to map the first protocol service ticket with a user's password.

Therefore, the password can accompany both tickets (i.e., the first protocol service ticket and the client ticket) or the password can accompany one of the two tickets. As described above, if the password accompanies one of the two tickets, such as the client ticket, then the first protocol service ticket is the password. In one embodiment, the password can be a system password that does not change in value or may be a one-time use password, such as those generated by SecurID tokens developed by RSA Security Inc. of Bedford, Mass.

Additionally, the invention can be expanded to a communications system having any number of first protocol services 112, or "hops", that the client 108 has to communicate with before establishing a communication session with the host node 118. Although described in relation to a first protocol service 112, a hop can comprise any network component, such as a proxy 115, firewall, router, and relay.

Figure 5A:
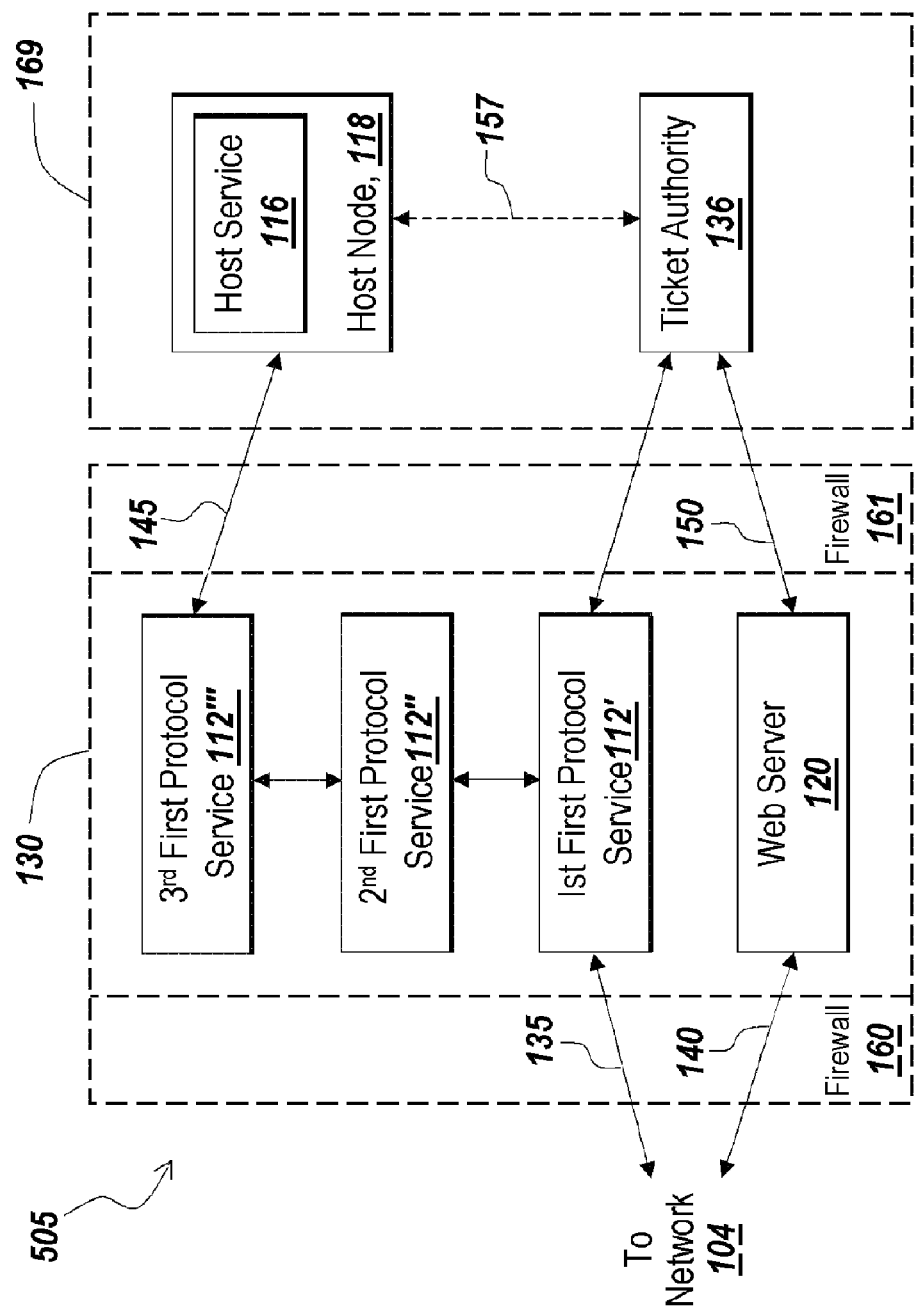
FIG. 5A is a block diagram of another embodiment of a communications system constructed in accordance with the invention.

For instance and referring to FIG. 5A, a four-hop example is a communication system 505 having a first protocol service 112' with a proxy 115', a second first protocol service 112" with a proxy 115", and a third first protocol service 112'" with a proxy 115'" (generally 115). The first protocol services 112 with proxies 115 communicate over a proxy-proxy communication channel, such as a first proxy-proxy communication channel 510' and a second proxy-proxy communication channel 510" (generally proxy-proxy communication channel 510). The client 108 communicates with the first protocol service 112' which communicates with the second first protocol service 112". In turn, the second first protocol service 112" communicates with the third first protocol service 112'" and then the third first protocol service 112'" communicates with the host node 118 over the proxy-server communication channel 145 to establish the communication session with the host node 118. Furthermore, although the embodiment described above includes a ticket having a client ticket and a first protocol service ticket, another embodiment includes the ticket comprising numerous tickets.

Figure 5B:
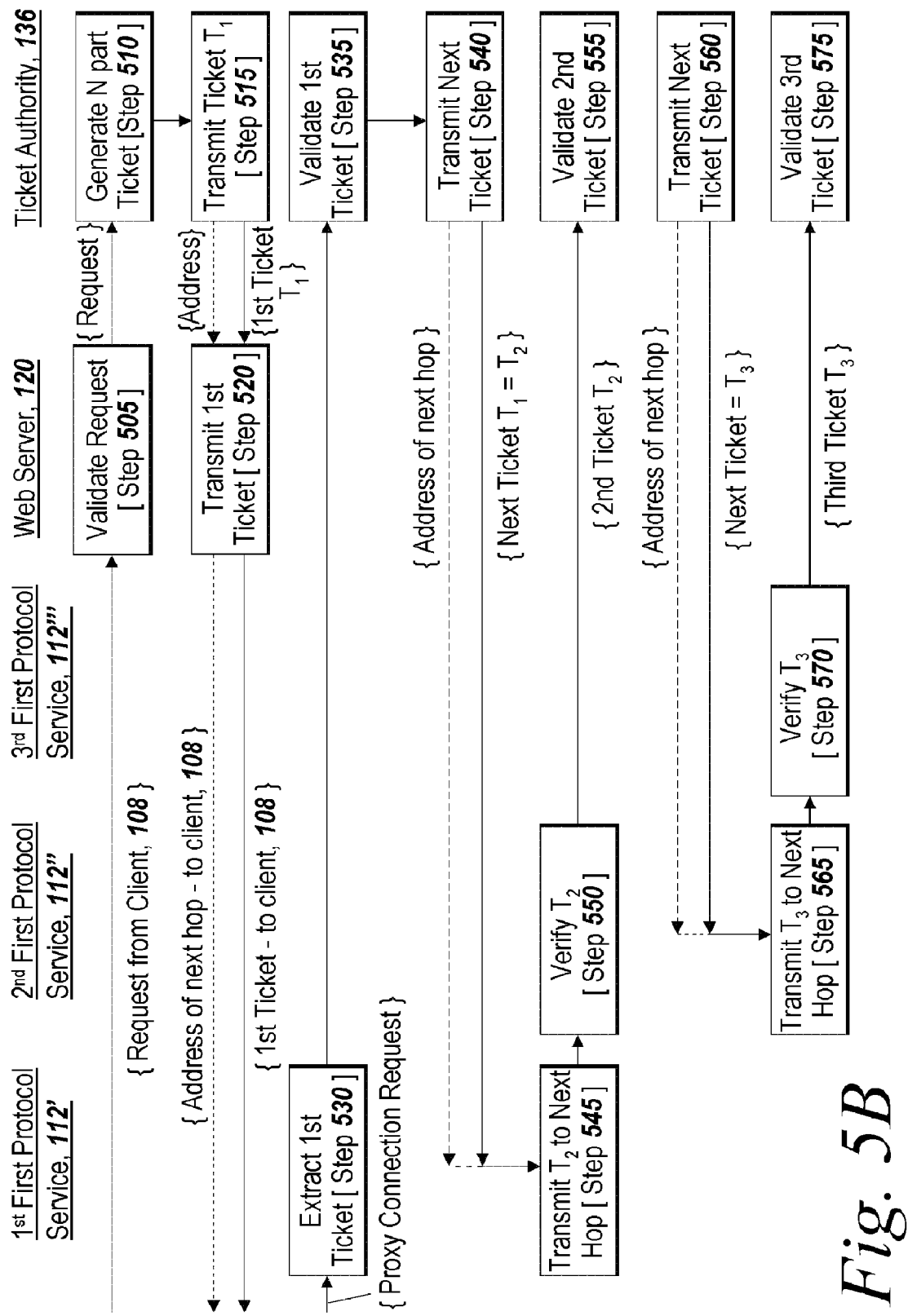
FIG. 5B is a flow diagram illustrating an embodiment of the operation of the communications system of FIG. 5A in accordance with the invention.

More explicitly and also referring to FIG. 5B, the web server 120 receives a request from the client 108 for an application and the web server 120 validates the request with the ticket authority 136 (step 405). The ticket authority 136 then generates an N part ticket (e.g., $T_1$ to $T_N$) in step 410. In one embodiment, the ticket authority 136 then transmits a portion $T_i$ of the N part ticket (e.g., the first part of the ticket, or first ticket $T_1$) to the web server 120 (step 415). The web server 120 then transmits the ticket $T_1$ to the client 108 (step 420). In one embodiment, the ticket authority 136 also transmits the address of the next "hop" (e.g., the first protocol service 112') to the web server 120, which then transmits the address to the client 108. This address is the address of the next hop (e.g., first protocol service 112) that this hop (e.g., client 108) needs to communicate with for the client 108 to eventually be authenticated to the host node 118.

The client 108 uses the address to then contact the next "hop" (e.g., first protocol service 112') and initiates a communication session with the 1st first protocol service 112' by transmitting a proxy connection request over the client-first protocol service communication channel 135. The first protocol service 112' then extracts (step 530) the first ticket $T_1$ from the proxy connection request and forwards this ticket to the ticket authority 136 for validation. The ticket authority 136 then validates (step 535) the first ticket $T_1$.

Upon proper verification of the first ticket $T_1$, the ticket authority 136 transmits the next ticket $T_i$ from the N part ticket (e.g., $T_2$) to the next first protocol service 112 (e.g., first protocol service 112') (step 540). In some embodiments, the ticket authority 136 also transmits the address of the next hop (e.g., the second first protocol service 112'") to this hop (e.g., the first protocol service 112'). The first protocol service 112' transmits this ticket to the next hop (e.g., the second first protocol service 112") (step 545). In one embodiment, the second first protocol service 112" verifies $T_2$ by transmitting the ticket to the ticket authority 136 (step 550). The ticket authority 136 validates the second ticket $T_2$ (step 555) and the process continues, as shown in steps 560 through 575. Once the last part of the N part ticket has been validated, steps 450 through 455 occur, as shown in FIG. 4, to launch the application on the client 108.

In one embodiment, each first protocol service 112 (i.e., each hop) validates $T_i$ (e.g., $T_2$) with a ticket authority 136 associated with the first protocol service 112 (i.e., hop). In this embodiment, after each first protocol service 112 validates the ticket $T_i$ (e.g., $T_2$) with a ticket authority 136, the ticket authority 136 at which the validation took place transmits the next ticket $T_{i+1}$ (e.g., $T_3$) and the address of the next first protocol service 112 (i.e., the next "hop" destination) to the first protocol service 112 that had validated the ticket $T_i$. Thus, each first protocol service 112 is associated with a ticket authority 136 that has been configured with the current and next hop tickets (i.e., validating $T_i$ and transmitting $T_{i+1}$ for the next hop). Consequently, the next first protocol service 112 acts as the client for that hop. This process is repeated until reaching the host node 118 in the communications system 505. Thus, each hop has been validated individually without revealing all of the ticket to any one hop.

In other embodiments, the ticket authority 136 may issue more than one ticket rather than issuing one ticket having many parts. For example, the ticket authority 136 generates a first hop ticket and a second hop ticket in step 510, where the first hop ticket has no association with the second hop ticket. The ticket authority 136 subsequently transmits the first hop ticket to the web server 120 and the web server 120 transmits the first hop ticket to the client 108. The client 108 transmits this first hop ticket to the first protocol service 112 (e.g., first protocol service 112') for validation by the ticket authority 136. Upon validation in step 535, the ticket authority 136 transmits in step 540 the second hop ticket to the next first protocol service 112 (e.g., second first protocol service 112") while the first hop ticket is independent from the second hop ticket.

In a further embodiment, one or more of the ticket authorities 136 provides the proxies 115, either as part of the first protocol service 112 or separated from the first protocol service 112, with any necessary information needed to connect to the next hop, such as, but without limitation, encryption keys, SSL method configuration information, and authentication information to connect to a SOCKS server (e.g., SOCKS5 server, developed by NEC Corporation of Tokyo, Japan).

In yet another embodiment, a ticket authority 136 only generates a single ticket. The ticket authority 136 transmits the single ticket to the web server 120. The web server 120 forwards the single ticket to the client 108. The first protocol service 112 subsequently receives the ticket from the client 108 and "consumes" the single ticket upon validation. As a result, the communications system 100 can use a single ticket to provide the ability to use arbitrary communication protocols over the client-proxy communication channel 135 and the client-web server communication channel 140. Additionally, because the host node 118 does not receive or verify the single ticket, the ticket is transparent to the host node 118 and, consequently, the host node 118 is not "aware" of the use of the ticket.

By exploiting the security of the secure communications between the client 108 and the web server 120 over the secure client-web server communication channel 140, the communications system 505 establishes a secure communication link over the non-secure client-proxy communication channel 135 to remotely display desktop applications securely on the client 108.

In yet another embodiment and referring again to FIG. 4, the ticket authority 136 transmits in step 415 a disabled version of the first protocol service ticket with the client ticket to the web server 120 for transmission to the client 108. The client 108 subsequently transmits (step 425) the first protocol service ticket along with the client ticket to the first protocol service 112 as part of the proxy connection request. The first protocol service 112 then forwards both tickets to the ticket authority 136. Upon receiving a disabled first protocol service ticket, the ticket authority 136 enables the first protocol service ticket after validating the client ticket. The ticket authority 136 then transmits the enabled first protocol service ticket to the first protocol service 112 for authentication to the host node 118.

Alternatively, in another embodiment the web server 120 receives a disabled first protocol service ticket and an enabled client ticket from the ticket authority 136 and only transmits the client ticket to the client 108. The client 108 transmits (step 425) the client ticket to the first protocol service 112 as part of the proxy connection request. The first protocol service 112 then forwards the client ticket to the ticket authority 136. The ticket authority 136 validates the client ticket and, upon validation, enables the first protocol service ticket previously transmitted to the web server 120. In yet another embodiment, the ticket authority 136 transmits an enabled first protocol service ticket to the web server 120 upon validation of the client ticket for authentication to the host node 118.

Thus, at any given time, the ticket authority 136 provides only one ticket that is enabled to the client 108 or first protocol service 112 that the ticket authority 136 can validate. The ticket authority 136 may provide another ticket that can't be validated (i.e., a disabled ticket) until the enabled ticket is validated. Alternatively, the ticket authority 136 may not transmit the first protocol service ticket to the first protocol service 112 until the ticket authority 136 validates the enabled ticket. As discussed in further detail below, this enforces network routing of communications using the communications system 505 because the client 108 cannot traverse the web server 120 or the first protocol service 112 without having the ticket authority 136 validate the enabled ticket and transmit the ticket needed to communicate with the host node 118.

In another embodiment, instead of transmitting the first protocol service ticket to the first protocol service 112 as in step 440, the ticket authority 136 transmits the first protocol service ticket to the web server 120 directly over the web server-authority communication channel 250. The web server 120 then automatically transmits the first protocol service ticket to the host node 118. In other words, the web server 120 "pushes" the first protocol service ticket to the host node 118. The ticket authority 136 can also push the first protocol service ticket to the host node 118 without transmission of the first protocol service ticket to the first protocol service 112 or the web server 120.

In yet another embodiment, the host node 118 retrieves the first protocol service ticket from the ticket authority 136 over the ticket-content server communication channel 157. In other words, the host node 118 "pulls" the first protocol service ticket from the ticket authority 136. The above examples are illustrations of techniques used to eliminate step 345 (while modifying the destination of the transmission in step 440).

Moreover, the invention enforces the routing of the client 108 through the first protocol service 112. As stated above, the client 108 has to possess the first protocol service ticket to establish a communication session with the host node 118. More specifically, to establish a connection with the host node 118, the web server 120 first has to validate the request of the client 108 with the ticket authority 136. Once validated, the client 108 obtains the first ticket and transmit this first ticket to the ticket authority 136 for validation. However, upon validation, the ticket authority 136 transmits the first protocol service ticket back to the first protocol service 112 rather than the client 108. The communication session between the client 108 and the host service 116 is established when the host service 116 receives the first protocol service ticket. Thus, the client 108 has to communicate with the first protocol service 112 in order to have the first protocol service ticket transmitted to the host service 116, thereby enforcing the routing of the client 108 through the first protocol service 112. Thus, the invention can ensure the proper traversal of a security device (e.g., the first protocol service 112) before granting access to the host node 118.

For example, a host node 118 executes several applications, such as MICROSOFT WORD and MICROSOFT EXCEL, both developed by Microsoft Corporation of Redmond, Wash. In one embodiment, the client 108 uses NFUSE, developed by Citrix Systems, Inc. of Fort Lauderdale, Fla., to obtain information from the server farm 169 on which applications can be accessed by the client 108. If a client user wants to access and use MICROSOFT WORD, the client 108 requests the application from the web server 120. However, only users who pay an application fee for MICROSOFT WORD can become authorized to access the application.

To ensure the payment of the application fee, the communications system 505 includes the first protocol service 112 and the ticket authority 136 to enforce the routing of the client 108 through the first protocol service 112. The routing of the client 108 through the first protocol service 112 is valuable to the application provider if the first protocol service 112 is used to collect the application fee and authorize the user for access to the application.

The ticket authority 136 subsequently generates a ticket associated with the request for the application. An enabled first ticket is then transmitted to the client 108. Because the client 108 does not have the address of the host node 118, the client 108 cannot access the application. Further, the client 108 has not been authorized by the first protocol service 112 yet (i.e., has not yet paid). Thus, the client 108 has to communicate with the first protocol service 112 to become authorized. The first protocol service 112 can then transmit the enabled first ticket to the ticket authority 136 upon payment of the application fee.

The ticket authority then validates the client ticket and subsequently transmits (or enables) a first protocol service ticket to the proxy 115. The first protocol service 112 then transmits the first protocol service ticket to the host node 118 (e.g., assuming the client user has paid the application fee), which enables the host node 118 to transmit the application to the client 108. The communications system 505 may also use Application Launching And Embedding (ALE) technology, developed by Citrix Systems, Inc., to enable the launching of the application from or the embedding of the application into an HTML page for delivery to the client 108.

Figure 6A:
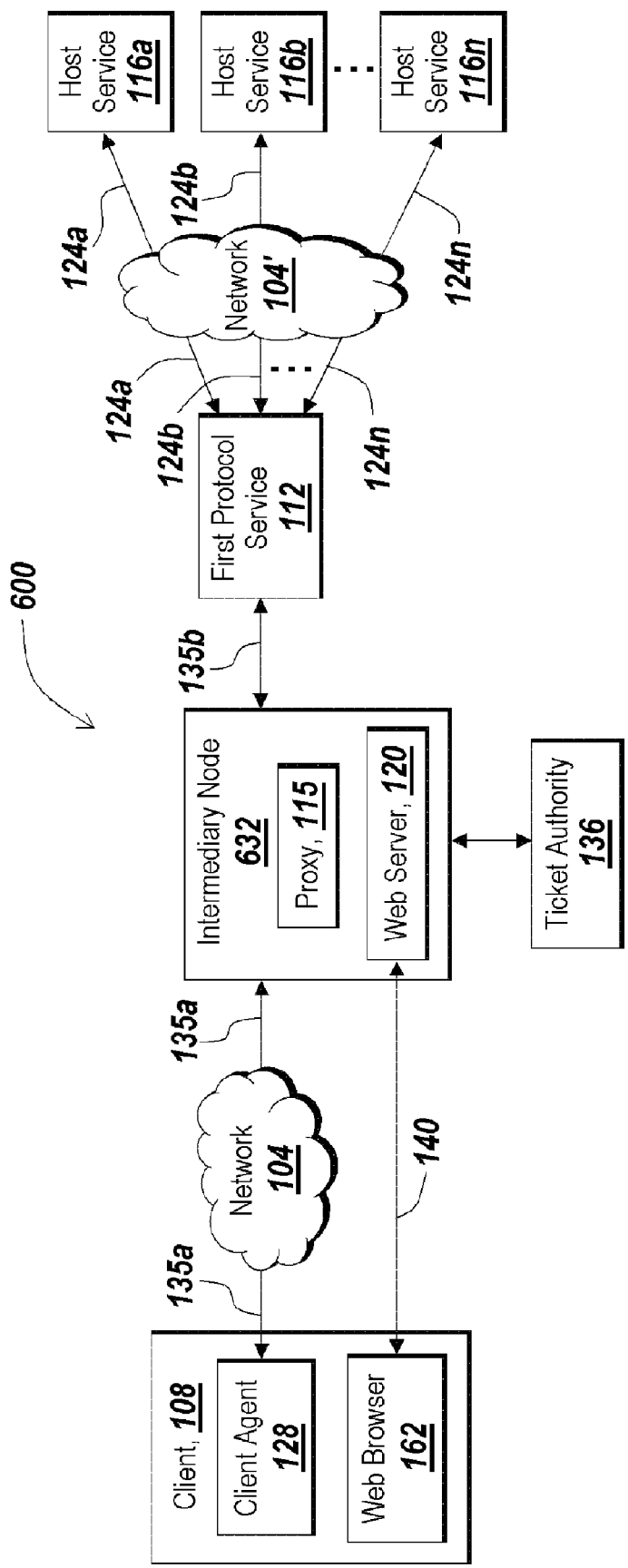
FIG. 6A is a block diagram of the illustrative system of FIG. 1A further including components for re-connecting the client to a host service according to an illustrative embodiment of the invention.

In another aspect, the present invention is directed towards reconnecting a client 108 to a host service 116 and re-authenticating the connections or "hops" between the client 108 and the host service 116. FIG. 6A depicts another illustrative embodiment of a system 600 that is capable of re-connecting the client 108 to a host service 116. In addition to the networks 104 and 104', the client 108, the first protocol service 112, and the host services 116, all of which are described above, the system 600 further includes an intermediary node 632, and a ticket authority 136. In one embodiment, the intermediary node 632 is a security gateway, such as, for example, a firewall and/or a router, through which messages between the client 108 and the first protocol service 112 must pass due to the configuration of the network 104. Additionally, the intermediary node 632 may comprise the proxy 115 of the first protocol service 112, either with or without the first protocol service 112. The ticket authority 136 can be, as illustrated, a stand-alone network component that is capable of communication and that has sufficient processor power and memory capacity to perform the operations described herein.

As shown in the illustrative embodiment of FIG. 6A, the intermediary node 632 is configured to accept a connection 135a initiated by the client 108 and to establish a second connection 135b with the first protocol service 112. Together, the connection 135a and the second connection 135b constitute the connection 135, described above, over which the client 108 and the first protocol service 112 communicate using the first protocol.

The intermediary node 632, as shown, is also configured to communicate with the ticket authority 136. In one embodiment, the ticket authority 136 is configured to receive a request for a first re-connection ticket from the intermediary node 632 and to thereafter generate the first re-connection ticket. The first re-connection ticket can include, for example, a large random number. In another embodiment, the ticket authority 136 is configured to receive a request for a first re-connection ticket for each of the "hops" between the client and host service 116. For example, the intermediary node 632 may request re-connection tickets for the connection between the client 108 and the intermediary node 632, between the intermediary node 632 and the first protocol service 112, and between the first protocol service 112 and the host service 116. These re-connection tickets may only be valid for each of the "hops". For example, a first re-connection ticket for the first protocol service 112 to host service 116 connection is valid only for authenticating the first protocol service 112 to the host service 116 on behalf of the client 108.

In another embodiment, the ticket authority 136 is configured to generate a handle. The handle can be, for example, a random number that is associated with (e.g., mapped to) the first re-connection ticket. In one embodiment, the handle is a smaller random number than the random number forming the first re-connection ticket. For example, the handle may be a 32-bit random number. In a further embodiment, the handle associated with a ticker or a re-connection ticket is an address of or pointer to the next "hop" in the multiple-hop connection between the client 108 and the host service 116. In this case, a ticket or re-connection ticket is validated for a single "hop" with a pointer to the next "hop". The next "hop" will need to obtain and validate a different ticket or re-connection ticket and so forth until the last "hop" is validated and connected to the host service 116 on behalf of the client 108.

The ticket authority 136 transmits the first re-connection ticket and the handle to the intermediary node 632, while keeping a copy of the first re-connection ticket and a copy of the handle. The copy of the first re-connection ticket can later be used by the ticket authority 136 to validate the first re-connection ticket originally transmitted to the client 108 when it is later presented to the ticket authority 136 during the process of re-connecting the client 108. In one embodiment, the ticket authority 136 also keeps an address for the first protocol service 112, which, as explained below, is associated with the first re-connection ticket and, upon validation of the first re-connection ticket, is transmitted to the intermediary node 632.

In one embodiment, the intermediary node 632 is further configured to use the handle transmitted to it by the ticket authority 136 to delete the copy of the first re-connection ticket kept at the ticket authority 136. In another embodiment, as described below, the ticket authority 136 is further configured to delete, during the process of re-connecting the client 108 to a host service 116, the first re-connection ticket and thereafter generate a replacement first re-connection ticket. Additionally, in another embodiment, the first re-connection ticket is configured for automatic deletion after a pre-determined period of time. In the embodiment of re-connection tickets for each of the "hops" between the client and the host service 116, one, some or all of the re-connection tickets may be configured for automatic deletion after a pre-determined period of time. In other embodiments, the ticket authority 136 or the intermediary node 632 is configured to delete each of the multiple-hop tickets and generate replacement tickets.

In another embodiment, the first protocol service 112 is configured to generate a second re-connection ticket, which, as in the case of the first re-connection ticket, can include, for example, a large random number. In one embodiment, the first protocol service 112 generates second re-connection tickets for each of the "hops" between the client 108 and the host service 112. The first protocol service 112 can also be configured to transmit the second re-connection ticket to the client 108, while keeping a copy of the second re-connection ticket and a session number. The copy of the second re-connection ticket can later be used by the first protocol service 112 to validate the second re-connection ticket originally transmitted to the client 108 when it is later presented to the first protocol service 112 during the process of re-connecting the client 108. In one embodiment, the first protocol service 112 transmits the second re-connection ticket to the client 108 via the intermediary node 632. In another embodiment, the first protocol service 112 transmits the second re-connection ticket to the client 108 directly. In a further embodiment, the first protocol service 112 may transmit second re-connection tickets to other first protocol services 112 or intermediary nodes 632 that may comprise the multiple-hop connection between the client 108 and the host service 116.

Moreover, as described in greater detail below, the first protocol service 112 can be further configured to delete, during the process of re-connecting the client 108 to a host service 116, the second re-connection ticket, and thereafter generate a replacement second re-connection ticket. Additionally, in another embodiment, the second re-connection ticket is configured for automatic deletion after a pre-determined period of time. In further embodiments, a first protocol service 112 of one or more first protocol services 112 in a multiple-hop connection is configured to delete the second re-connection tickets for each of the "hops", and thereafter generate replacement second re-connection tickets for one, some or all of the "hops."

In one embodiment, the intermediary node 632 serves as an intermediary for the first and second re-connection tickets. The intermediary node 632 receives, for example, the first re-connection ticket generated by the ticket authority 136 and the second re-connection ticket generated by the first protocol service 112. The intermediary node 632 can then transmit the first re-connection ticket and the second re-connection ticket to the client 108. Moreover, during the process of re-connecting the client 108 to a host service 116, the intermediary node 632 can accept the first re-connection ticket and the second re-connection ticket from the client 108 and thereafter transmit the first re-connection ticket to the ticket authority 136 and, if appropriate, the second re-connection ticket to the first protocol service 112.

In another embodiment, the intermediary node 632 serves as an intermediary for the re-connection tickets for the multiple-hops between the client 108 and the host service 116. The intermediary node 632 receives, for example, the first re-connection ticket for the client 108 to first protocol service 112 connection and the first re-connection ticket for the first protocol service 112 to the host service 116. In a further embodiment, the intermediary node 632 receives a first re-connection ticket for the connection between the intermediary node 632 and the first protocol service 112. The intermediary node 632 can then transmit the first re-connection ticket for the client to the client 108 and the first re-connection ticket for the first protocol service 112 to the first protocol service 112. Moreover, during the process of re-connecting the client 108 to a host service 116, the intermediary node 632 can accept the first re-connection ticket from the client 108 to validate the ticket to re-establish the client's connection to the intermediary node 632 or the first protocol service 112.

Figure 6B:
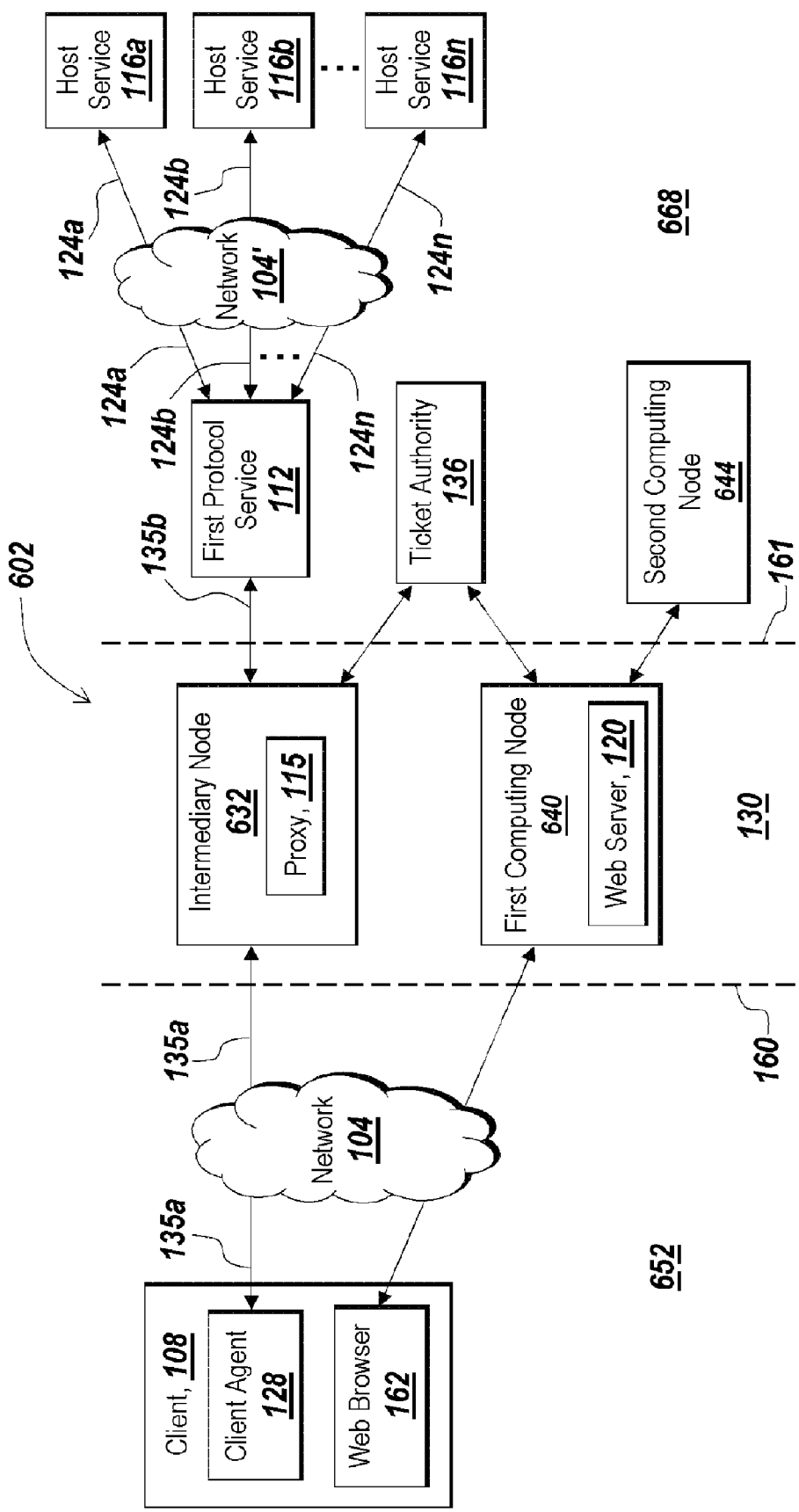
FIG. 6B is a block diagram of the illustrative system of FIG. 6A further including components for initially connecting the client to a host service according to another illustrative embodiment of the invention.

Referring to FIG. 6B, another embodiment of a system 602 for network communications includes the networks 104 and 104', the client 108, the first protocol service 112, the host services 116a-116n, the intermediary node 632, and the ticket authority 136, as described above, and further depicts a first computing node 640 and a second computing node 644, both of which are used, in one embodiment, for initially connecting the client 108 to a host service 116. Moreover, in the illustrative embodiment of FIG. 6A, the client 108 further includes a web browser 162, such as, for example, the INTERNET EXPLORER program from Microsoft Corporation of Redmond, Wash., to connect to the World Wide Web.

In one embodiment (not shown), the system 602 includes two or more intermediary nodes 632 and/or two or more first protocol services 112. The intermediary node 632, through which messages between the client 108 and the first protocol service 112 must pass, and/or the first protocol service 112 can, as explained below, each be chosen based on, for example, a load balancing equation.

Each of the first computing node 640 and the second computing node 644 can be any computing device that is capable of communication and that has sufficient processor power and memory capacity to perform the operations described herein. For example, in one embodiment, the first computing node 640 comprises a web server 120, providing one or more websites. In another embodiment, the second computing node 644 provides an XML service.

In one embodiment, the client 108 and the network 104 form an external network 652, separated from the rest of the system 602 by a first firewall 160, depicted as a dashed line. The intermediary node 632 and the first computing node 640 can be located in a DMZ 130 separated from the rest of the system 602 by the first firewall 160 and a second firewall 161, also depicted by a dashed line. Then, as shown, the network 104', the first protocol service 112, the host services 116a-116n, the ticket authority 136, and the second computing node 644 form an internal network 668, separated from the rest of the system 602 by the second firewall 161.

Figure 6C:
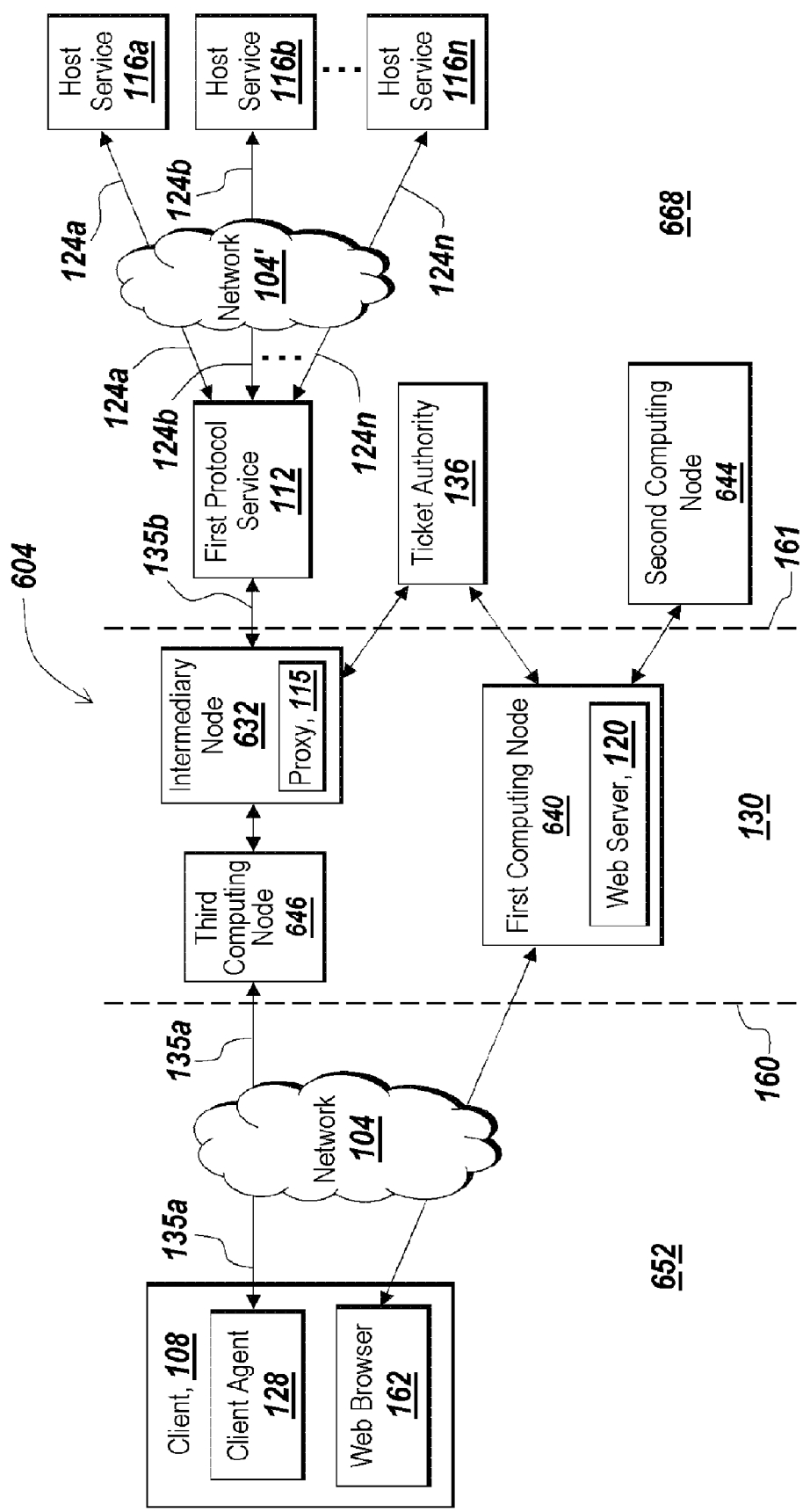
FIG. 6C is a block diagram of the illustrative system of FIG. 6B further including a component for initially connecting the client to the host service and for re-connecting the client to the host service according to another illustrative embodiment of the invention.

Alternatively, in another embodiment, and with reference to FIG. 6C, the system 604 further includes a third computing node 646 positioned in the DMZ 130, between the network 104 and the intermediary node 632. The third computing node 646 can be any computing device that is capable of networked communication and that has sufficient processor power and memory capacity to perform the operations described herein. As described below, the third computing node 646 is used, in some embodiments, during the process of initially connecting the client 108 to a host service 116 and/or during the process of re-connecting the client 108 to a host service 116. More specifically, as described below, where the system 604 includes two or more intermediary nodes 632, the third computing node 646 can, based on a load balancing equation for example, choose the intermediary node 632 through with communications between the client agent 128 of the client 108 and the first protocol service 112 must pass.

Figure 6D:
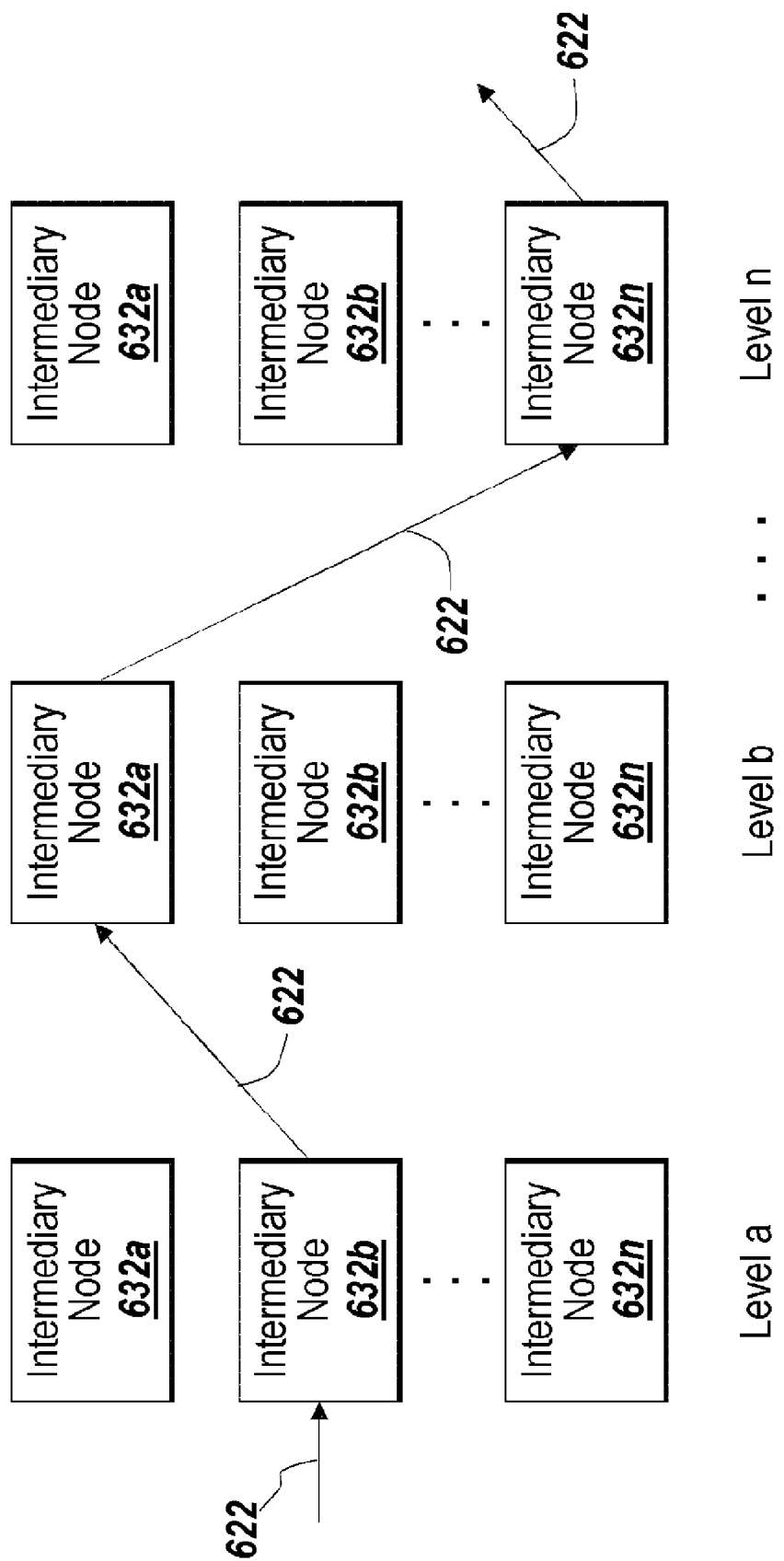
FIG. 6D is a block diagram of an alternative embodiment of the system of FIG. 6C.

Moreover, referring to FIG. 6D, the intermediary node 632 of FIG. 6C can, in an alternative embodiment, be replaced by two or more levels "a"-"n" of intermediary nodes 632. As illustrated, each level "a"-"n" can include two or more intermediary nodes 632a-632n. As described below, the client agent 128 of the client 108 can be routed through any combination of the intermediary nodes 632 based on, for example, load balancing equations. For example, as illustrated, the client agent 128 can be routed through the intermediary nodes 632 via connection 622. For additional security, each of the "hops" via connection 622 may require a ticket or re-connection ticket for validating and authenticating the multiple-hop connection between the client 108 and the host service 116. Other configurations of the systems 600, 602 and 604, as would be readily apparent to one skilled in the art, are also possible.

Referring again to FIG. 6B, in one embodiment, the web browser 162 communicates over the network 104 with the first computing node 640, which itself interfaces with the second computing node 644 and the ticket authority 136. More specifically, the first computing node 640 is configured with the address of the second computing node 644 and the ticket authority 136. In one embodiment, as explained further below, the first computing node 640 is configured to relay information between, and thereby prevent direct communication between, the web browser 162 of the client 108, the second computing node 644, and the ticket authority 136. By preventing such direct communication, the first computing node 640 adds an additional level of security to the system 602. The first computing node 640 can also be configured with the address of the intermediary node 632, or, alternatively, with the address of two or more intermediary nodes 632.

For its part, the second computing node 644 is configured to determine which of the application programs running on the host services 116 are available to a user of the client 108. In other words, the second computing node 644 is configured to determine which of the application programs the user is authorized to access. In one embodiment, after the user selects his desired application program, as described further below, the second computing node 644 is further configured to determine which of the host services 116 will be used to run the user's desired application for purposes of load balancing. The second computing node 644 returns the address of that host service 116 to the first computing node 640. The second computing node 644 also returns the address of the first protocol service 112, which can also be selected from amongst a plurality of first protocol services 112 through the use of a load balancing equation, to the first computing node 640. In turn, the first computing node 640 transmits the address of the chosen first protocol service 112 and the chosen host service 116 to the ticket authority 136.

For its part, the ticket authority 136 generates connection tickets. In one embodiment, the ticket authority 136 transmits an initial connection ticket to the first computing node 640 for transmission to the client 108. In another embodiment, the ticket authority 136 transmits initial connections tickets to the first computing node 640 for one or more of the "hops" between the client 108 and the host service 116.

Figure 7:
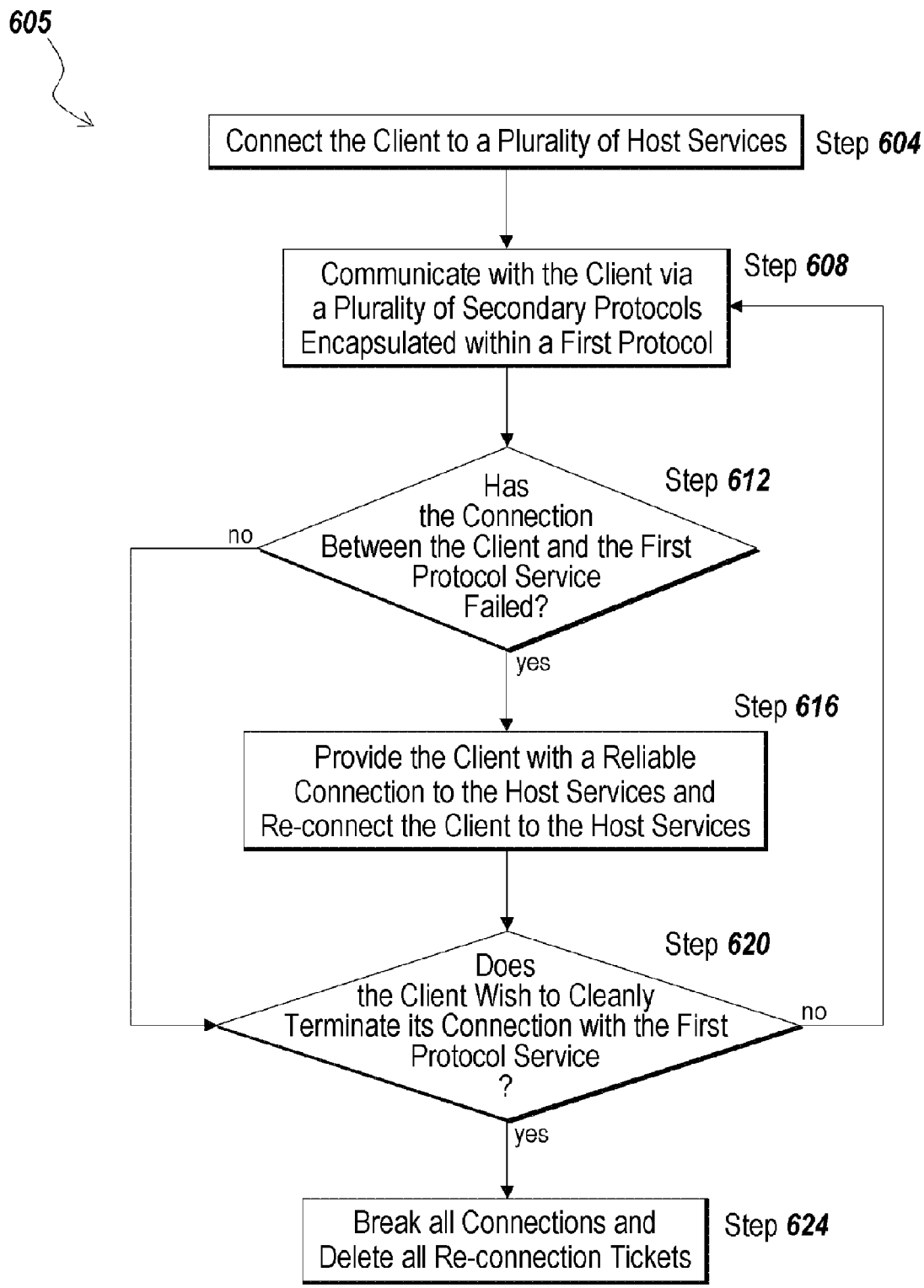
FIG. 7 is a flow diagram of a method for network communications according to an illustrative embodiment of the invention.

Referring now to FIG. 7, one embodiment of a method 600 for network communications, using the exemplary embodiment of FIGS. 6A-6D, is illustrated. At step 604, the client 108 initially connects to a plurality of host services 116 by employing, for example, the method 700 described below. After the client 108 is connected to the plurality of host services 116, the client 108 and the host services 116 communicate, through the first protocol service 112, and at step 608, via a plurality of secondary protocols encapsulated within the first protocol. In one embodiment, the first protocol service 112 encrypts, prior to the transmission of any first protocol packets, communications at the level of the first protocol 204, thereby securing the communications. In another embodiment, the first protocol service 112 compresses, prior to the transmission of any first protocol packets, the communications at the level of the first protocol, thereby improving communication efficiency.

At step 612, the client agent 128 determines whether the connection 135 between the client agent 128 and the first protocol service 112 has failed. For example, the connection 135a between the client agent 128 and the intermediary node 632 may have failed, the connection 135b between the intermediary node 632 and the first protocol service 112 may have failed, or both the connection 135a and the connection 135b may have failed. In another embodiment, the connection between the first protocol service 112 and the host service may have failed 116. If the client agent 128 determines that the connection 135 has not failed, the method 600 proceeds to step 620. If, on the other hand, the client agent 128 determines that the connection 135 has failed, the client 108 is, at step 616, provided with a reliable connection to the host services 116 and re-connected to the host services 116.

It is determined, at step 620, whether the client 108 wishes to cleanly terminate its connection 135 with the first protocol service 112 and, consequently, its connections 124a-124n with the host services 116. If not, communication between the client 108 and the first protocol service 112, via the plurality of secondary protocols encapsulated within the first protocol, continues at step 608. If so, then, at step 624, all connections 135a, 135b, and 124a-124n are broken and all re-connection tickets are deleted. In one embodiment, the intermediary node 632 uses a handle it receives from the ticket authority 136 to delete a copy of a first re-connection ticket kept at the ticket authority 136. In another embodiment, the first protocol service 112 deletes a copy of a second re-connection ticket kept at the first protocol service 112. In a further embodiment, if for some reason a secondary protocol connection 124 fails, a copy of the second re-connection ticket associated therewith and kept at the first protocol service 112 is deleted by the first protocol service 112. In yet another embodiment, a first re-connection ticket and/or a second re-connection ticket is automatically deleted after a pre-determined period of time following a failure in the connection 135, as at step 612, and/or following a clean termination of the connection 135, as at step 620. In other embodiments, either the first protocol service 112 or the ticket authority 136 delete one or more of the re-connection tickets for one or more of the "hops" between the client 108 and the host service 116.

Figure 8B:
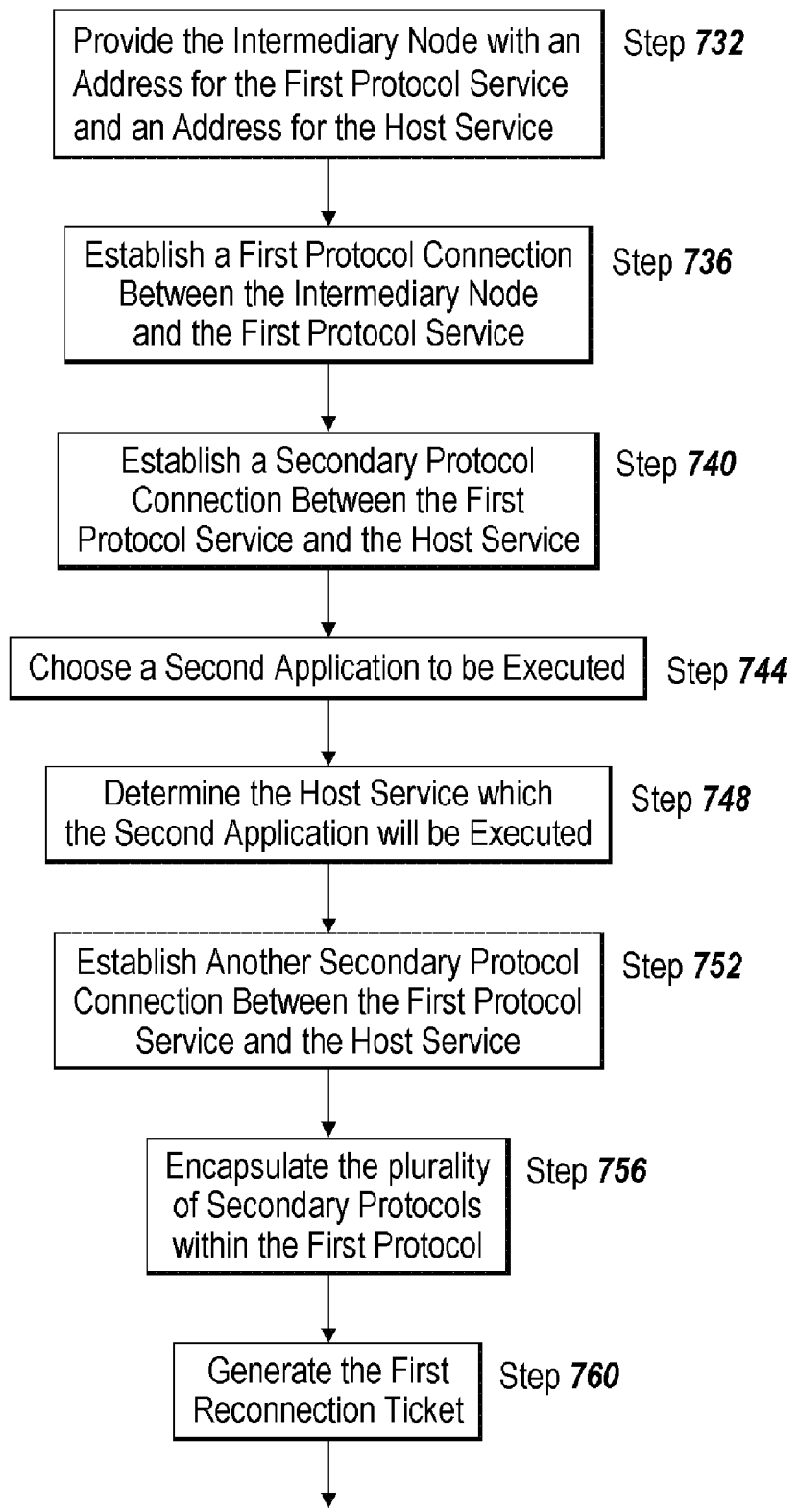
Figure 8C:
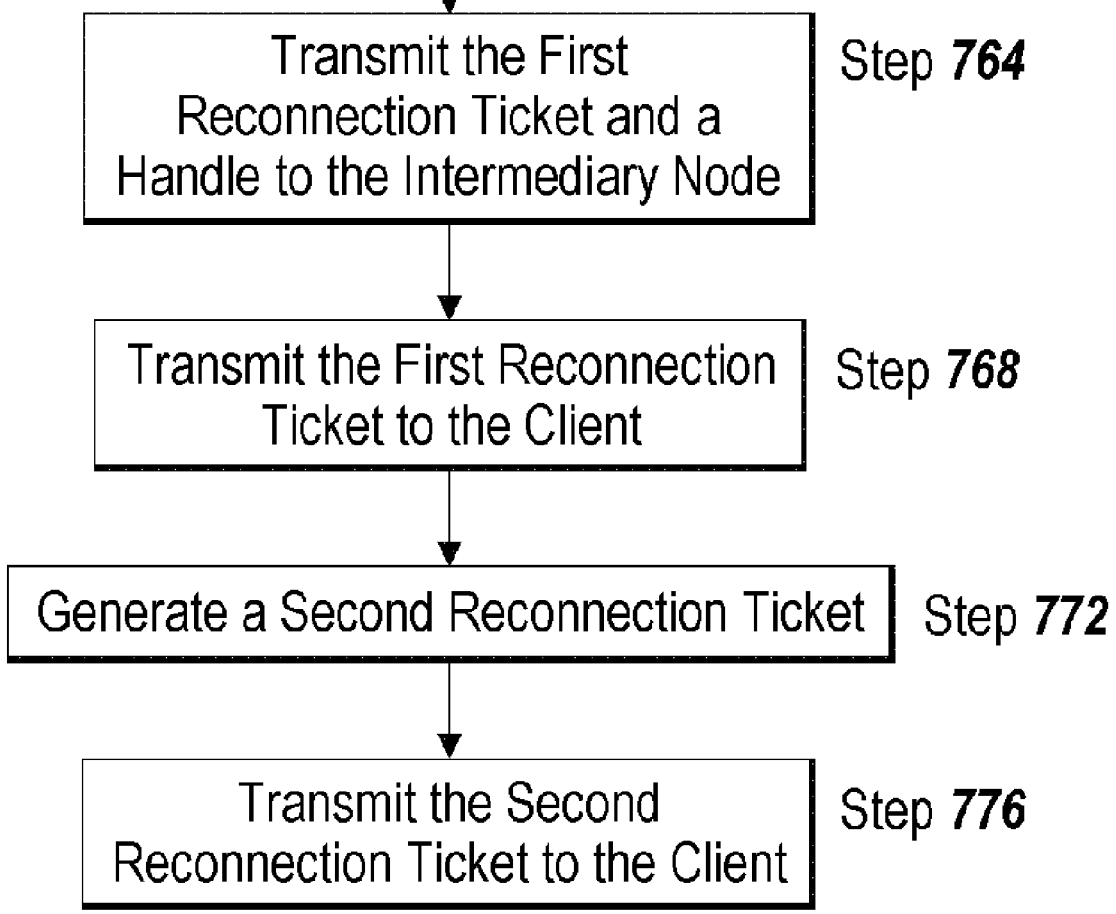

Referring to FIGS. 8A-8C, one embodiment of a method 700 for initially connecting the client 108 to the host services 116 (for example at step 604 of FIG. 7), using the exemplary embodiment of FIG. 6A-6D, is illustrated. At step 704, the client 108, using the browser 162, sends a request, such as, for example, an HTTP request, to the first computing node 640. The first computing node 640 returns a web page, such as, for example, an HTML form requesting authentication information (e.g., a username and a password). A user of the client 108 enters his credentials and transmits the completed form to the first computing node 640.

The first computing node 640, at step 708, then informs the user of the client 108 of applications available for execution. In one embodiment, the first computing node 640 extracts the user's credentials from the login page and transmits them to the second computing node 644, together with a request for the second computing node 644 to enumerate the applications available to the user. Based on the user's credentials, the second computing node 644 returns a list of specific applications available to the user to the first computing node 640, which then forwards the list, in the form of a web page for example, to the user of the client 108.

At step 712, the user selects the desired application and a request for that application is sent to the first computing node 640. For example, in one embodiment, the user clicks on a desired application listed in the web page presented to him by the first computing node 640 and an HTTP request for that application is forwarded to the first computing node 640. The request is processed by the first computing node 640 and forwarded to the second computing node 644.

At step 716, the second computing node 644 determines the host service 116 on which the desired application will be executed. The second computing node 644 can make that determination based, for example, on a load balancing equation. In one embodiment, the second computing node 644 also determines a first protocol service 112 from amongst a plurality of first protocol services 112 that will be used to communicate with the host service 116 via a connection 124. Again, the second computing node 644 can make that determination based, for example, on a load balancing equation. The second computing node 644 returns the address of the chosen host service 116 and the chosen first protocol service 112 to the first computing node 640.

The client 108, at step 720, is then provided with an initial connection ticket and an address for the intermediary node 632 (which is either its actual address or its virtual address, as described below). In one embodiment, the first computing node 640 provides the address for the chosen host service 116 and the chosen first protocol service 112 to the ticket authority 136, together with a request for the initial connection ticket. The ticket authority 136 keeps the address of the chosen host service 116 and the chosen first protocol service 112, generates the initial connection ticket, and transmits the initial connection ticket to the first computing node 640, while keeping a copy for itself. In one embodiment, the ticket authority 136, in response to the request for the initial connection ticket by the first computing node 640, generates connection tickets for each of the "hops" between the client 108 and the host service 116. In another embodiment, the first computing node 640 requests initial connection tickets for each of the "hops" either in a single request or in multiple requests. For example, the ticket authority 126 may generated a multi-part ticket as discussed above in conjunction with FIG. 5B.

The first computing node 640, configured, in one embodiment, with the actual address of the intermediary node 632, then transmits the actual address of the intermediary node 632 and the initial connection ticket to the browser 162 of the client 108. The first computing node 640 can, for example, first create a file containing both the actual address of the intermediary node 632 and the initial connection ticket and then transmitting the file to the browser 162 of the client 108. Optionally, in another embodiment, the first computing node 640 is configured with the actual address of two or more intermediary nodes 632. In such an embodiment, the first computing node 640 first determines the intermediary node 632 through which messages between the client 108 and the first protocol service 112 will have to pass. The first computing node 640 then transmits the actual address of that chosen intermediary node 132 and the initial connection ticket to the browser 162 of the client 108 using, for example, the file described above. In one embodiment, the first computing node 640 chooses the intermediary node 632 using a load balancing equation. The client agent 128 of the client 108 is then launched and uses the address of the intermediary node 632, to establish, at step 724, a first protocol connection 135a between the client agent 128 of the client 108 and the intermediary node 632. In one embodiment, the first computing node 640 may provide initial connection tickets obtained from the ticket authority 136 to one or more of the first protocol service 112 and/or intermediary nodes 632 to validate their respective connections.

Alternatively, in another embodiment, the first computing node 640 is configured with an actual address of the third computing node 646, which serves as a virtual address of an intermediary node 132. In such an embodiment, the first computing node 640 transmits, at step 720, the actual address of the third computing node 646 and the initial connection ticket to the browser 162 of the client 108 using, for example, the file described above. The client agent 128 of the client 108 is then launched and uses the actual address of the third computing node 646 to establish, at step 724, a first protocol connection between the client agent 128 of the client 108 and the third computing node 646. The third computing node 646 then determines the intermediary node 632 through which messages between the client 108 and the first protocol service 112 will have to pass. In one embodiment, the third computing node 646 chooses the intermediary node 632 using a load balancing equation. Having chosen the intermediary node 632, the third computing node 646 establishes a first protocol connection to the intermediary node 632. A first protocol connection 135a therefore exists, through the third computing node 646, between the client agent 128 of the client 108 and the intermediary node 632. The actual address of the third computing node 646 is therefore mapped to the actual address of the intermediary node 632. To the client agent 128 of the client 108, the actual address of the third computing node 646 therefore serves as a virtual address of the intermediary node 632.

In one embodiment, where more than one level of intermediary nodes 632 exist, as described above, the first computing node 640 or the third computing node 646, respectively, only choose the intermediary node 632 to which the client agent 128 will connect at level "a." In such an embodiment, at each of the levels "a"-"n−1", the intermediary node 632 through which the client agent 128 is routed at that level thereafter determines, based on a load balancing equation for example, the intermediary node 632 to which it will connect at the next level. Alternatively, in other embodiments, the first computing node 640 or the third computing node 646, respectively, determine, for more than one or all of the levels "a"-"n", the intermediary nodes 632 through which the client agent 128 will be routed.

Having established the first protocol connection 135a between the client agent 128 of the client 108 and the intermediary node 632, for example the intermediate node 132 at level "n" (hereinafter referred to in method 700 as the intermediary node 632), the client agent 128 then transmits the initial connection ticket to the intermediary node 632.

It is then determined, at step 728, whether the initial connection ticket is valid. In one embodiment, the intermediary node 632 transmits the initial connection ticket to the ticket authority 136 for validation. In one embodiment, the ticket authority 136 determines the validity of the initial connection ticket by comparing it to the copy of the initial connection ticket it kept at step 720. If the ticket authority 136 determines the initial connection ticket to be valid, the ticket authority 136 transmits, at step 732, the address of the first protocol service 112 and the address of the chosen host service 116 to the intermediary node 632. The ticket authority 136 may also transmit additional connection tickets for the first protocol service 112 and intermediary node 632 through which the client 108 will connect to the host service 116. The first protocol service 112 can also delete the initial connection ticket and the copy thereof. If, on the other hand, the ticket authority 136 determines the initial connection ticket to be invalid, the client 108 is, at step 730, refused connection to the first protocol service 112 and, consequently, connection to the host service 116.

Following step 732, the intermediary node 632 uses the address of the chosen first protocol service 112 to establish, at step 736, a first protocol connection 135b between the intermediary node 632 and the first protocol service 112. In one embodiment, the intermediary node 632 uses an initial connection ticket to establish the first protocol connection 135b between the intermediary node 632 and the first protocol service 112. In one case, the intermediary node 632 uses the same initial connection ticket received from the client 108 to validate the connection 135b. In another case, the intermediary node 632 uses an initial connection ticket generated for and valid for the first protocol connection 135b. A first protocol connection 135 therefore now exists, through the intermediary node 632, between the client agent 128 of the client 108 and the first protocol service 112. The intermediary node 632 can also pass the address of the chosen host service 116 to the first protocol service 112.

In one embodiment, at step 740, the first protocol service 112 uses the address of the chosen host service 116 to establish a secondary protocol connection 124 between the first protocol service 112 and the chosen host service 116. For example, the chosen host service 116 is in fact the host service 116a and a secondary protocol connection 124a is established between the first protocol service 112 and the host service 116a.

In one embodiment, following step 740, the user chooses, at step 744, a second application to be executed and the second computing node 644 determines, at step 748, the host service 116 on which the second application is to be executed. For example, by calculating a load balancing equation, the second computing node 644 may choose the host service 116b to execute the second application program. The second computing node 644 then transmits the address of the chosen host service 116b to the first protocol service 112. In one embodiment, the second computing node 644 is in direct communication with the first protocol service 112 and directly transmits the address thereto. In another embodiment, the address of the chosen host service 116b is indirectly transmitted to the first protocol service 112. For example, the address can be transmitted to the first protocol service 112 through any combination of the first computing node 640, the ticket authority 136, the intermediary node 632, and the first protocol service 112. Having received the address of the chosen host service 116b, the first protocol service 112 establishes, at step 752, a secondary protocol connection 124b between the first protocol service 112 and the chosen host service 116b. In establishing a secondary protocol connection 124b, the first protocol service 112 may validate an initial connection ticket to authenticate the connection to the host service 116. The initial connection ticket may be the same as the initial connection ticket for either the client 108 connection to the intermediary node 632 or the connection of the intermediary node 632 to the first protocol service 112. In another embodiment, the ticket authority 136 or any of the intermediary node 632 generated a ticket valid only for the secondary protocol connection 124b. The first protocol service 112 and/or host service 116 uses this ticket to validate the secondary protocol connection 124b.

The secondary protocols that can be used to communicate over the connections 124a and 124b include, but are not limited to, HTTP, FTP, Oscar, Telnet, ICA, and RDP. Moreover, in one embodiment, at least one of the secondary protocols, as described above, includes a plurality of virtual channels, each of which can include a plurality of protocol packets enabling functionality at the remote client 108. For example, in one embodiment, one host service 116a is a web server, communicating with the first protocol service 112 over the connection 124a using the HTTP protocol, and another host service 116b is an application server, communicating with the first protocol service 112 over the connection 124b using the ICA protocol. The host service 116b generates both protocol packets for transmitting graphical screen commands to the client 108, for causing the client 108 to display a graphical user interface, and protocol packets for transmitting printer commands to the client 108, for causing a document to be printed at the client 108.

Steps 744, 748, and 752 can be repeated any number of times. As such, any number of application programs can be executed on any number of host services 116a-116n, the outputs of which can be communicated to the first protocol service 112 over the connections 124a-124n using any number of secondary protocols.

Turning now to step 756, the first protocol service 112 can, as described above, encapsulate the plurality of secondary protocols within the first protocol. As such, the client 108 is connected to, and simultaneously communicates with, a plurality of host services 116.

In another embodiment, prior to performing steps 744, 748, and 752 to execute a new application program on a host service 116, such as, for example, the host service 116b, a user of the client 108 ends execution of another application program, such as, for example, an application program executing on host service 116a. In such a case, the first protocol service 112 disrupts the connection 124a between the first protocol service 112 and the host service 116a. The first protocol service 112 then establishes, by implementing steps 744, 748, and 752, the connection 124b between the first protocol service 112 and the host service 116b, without interrupting the connection 135 between the client 108 and the first protocol service 112.

In one embodiment, a first re-connection ticket is generated at step 760. For example, the intermediary node 632 requests a first re-connection ticket from the ticket authority 136 or requests a first re-connection ticket for each of the "hops" between the client 108 and the host service 116. Upon receiving the request, the ticket authority 136 generates the one or more first re-connection tickets. A re-connection ticket is, for example, a large random number, and can also generate a handle, which is, for example, a smaller random number. The ticket authority 136 can then transmit, at step 764, the first re-connection tickets and the handles to the intermediary node 632, while keeping a copy of the first re-connection tickets and a copy of the handles. The ticket authority 136 continues to maintain the address of the first protocol service 112 that was transmitted to it by the first computing node 640 at step 720. The intermediary node 632 then transmits, at step 768, the client's first re-connection ticket to the client 108.

At step 772, one or more second re-connection tickets are then generated. In one embodiment, the first protocol service 112 generates the second re-connection ticket for the client 108, which can be, for example, a large random number. In another embodiment, the first protocol service 112 generates second re-connection tickets for one or more of the "hops" between the client 108 and the host service 116. The first protocol service 112, at step 776, then transmits the client's second re-connection ticket, through the intermediary node 632, to the client 108. In doing so, the first protocol service 112 keeps a copy of the second re-connection ticket and a session number associated therewith for identifying the session to be re-connected following a disruption of the connection 135. In one embodiment, for example, the first protocol service 112 maintains, for a particular session number, a table listing the secondary protocol connections 124a-124n associated with that session number. In a like manner, the first protocol service 112 may maintain the first and/or second re-connection tickets for each of the "hops" being validated to reconnect the client 108 to the host service 116.

Accordingly, following re-establishment of the first protocol connection 135 and validation of the second re-connection ticket at the first protocol service 112, and/or at any subsequent first protocol services 112 and/or intermediary nodes 632, he first protocol service 112 can identify the secondary protocol connections 124 to be encapsulated within the re-established first protocol connection 135 for communication to the client 108. Alternatively, in another embodiment, and with reference again to FIG. 1A, the system 100 of the present invention does not include the intermediary node(s) 132, the ticket authority 136, nor the third computing node 646. In such an embodiment, rather than generating and transmitting, at steps 760 through 776, both the first and the second reconnection tickets, the system 100 and method 700 provide for only a single re-connection ticket for the client 108 or for one or more of the "hops" between the client 108 and the host service 116. In one such embodiment, the first protocol service 112, for example, generates the single re-connection ticket, which can be, for example, a large random number. The first protocol service 112 then transmits the client's re-connection ticket directly to the client 108 over the connection 135. In doing so, the first protocol service 112 keeps a copy of the single re-connection ticket and a session number associated therewith for identifying the session to be re-connected following a disruption of the connection 135. In another embodiment, the first protocol service 112 keeps the re-connection ticket for its connection to the host service 116 and a session number associated therewith for retrieving the re-connection ticket.

Figure 9:
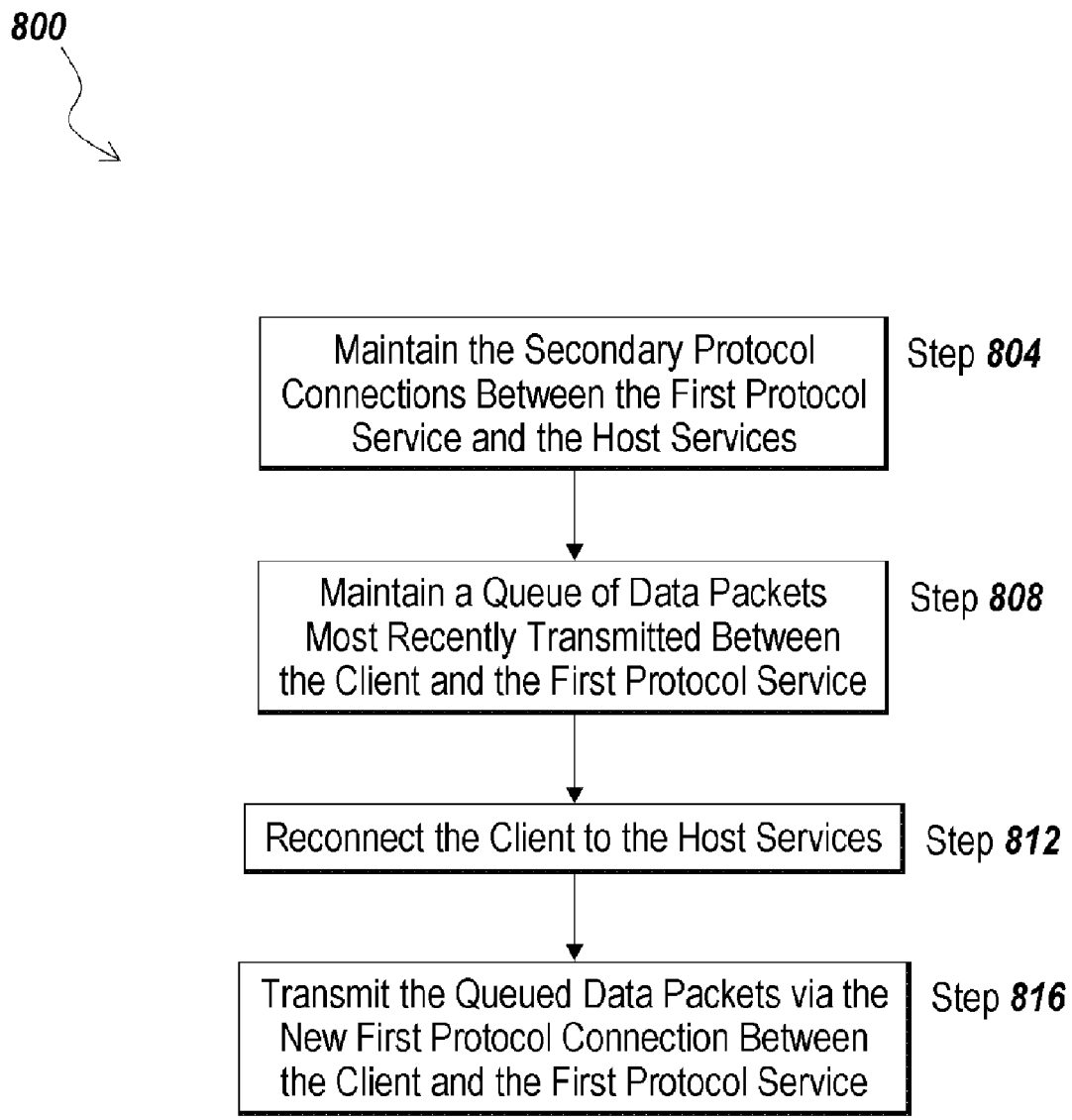
FIG. 9 is a flow diagram of a method for providing a client with a reliable connection to host services and for re-connecting the client to the host services according to an illustrative embodiment of the invention.

Referring now to FIG. 9, one embodiment of a method 800 for providing a client 108 with a reliable connection to one or more host services 116 and for re-connecting the client 108 to the host services 116 (for example at step 616 of FIG. 7), using the exemplary embodiment of FIGS. 6A-6D, is illustrated. In particular, at step 804, the secondary protocol connection 124 between the first protocol service 112 and each of the one or more host services 116 is maintained. Moreover, at step 808, a queue of data packets most recently transmitted between the client agent 128 of the client 108 and the first protocol service 112, via the connection 135 that was determined to have broken, for example, at step 616 of FIG. 7, is maintained. In one embodiment, the data packets are queued and maintained both before and upon failure of the connection 135. The queued data packets can be maintained, for example, in a buffer by the client agent 128. Alternatively, the first protocol service 112 can maintain in a buffer the queued data packets. In yet another embodiment, both the client agent 128 and the first protocol service 112 maintain the queued data packets in a buffer.

At step 812, a new first protocol connection 135 is established between the client agent 128 of the client 108 and the first protocol service 112 and linked to the maintained secondary protocol connection 124 between the first protocol service 112 and each of the one or more host services 116, thereby re-connecting the client 108 to the host services 116. After the client 108 is re-connected, the queued data packets maintained at step 808 can be transmitted, at step 816, via the newly established first protocol connection 135. As such, the communication session between the host services 116 and the client 108, through the first protocol service 112, is persistent and proceeds without any loss of data.

In an embodiment with multiple "hops" traversing multiple first protocol services 112, at step 808, a portion or all of the data packets may be maintained at one or more of the first protocol services 112. At step 812, each "hop" may be re-established. After the client 108 is re-connected and re-linked to the first of the one or more first protocol services 112 as described above, each of the remaining connections may be re-established and re-linked to the previously re-linked "hop" until the final "hop" to the host service 116 is re-established. Either after the final "hop" is re-established and re-linked, or as each "hop" is re-established and re-linked, the queued data packets maintained at step 808 can be transmitted, at step 816.

Figure 10A:
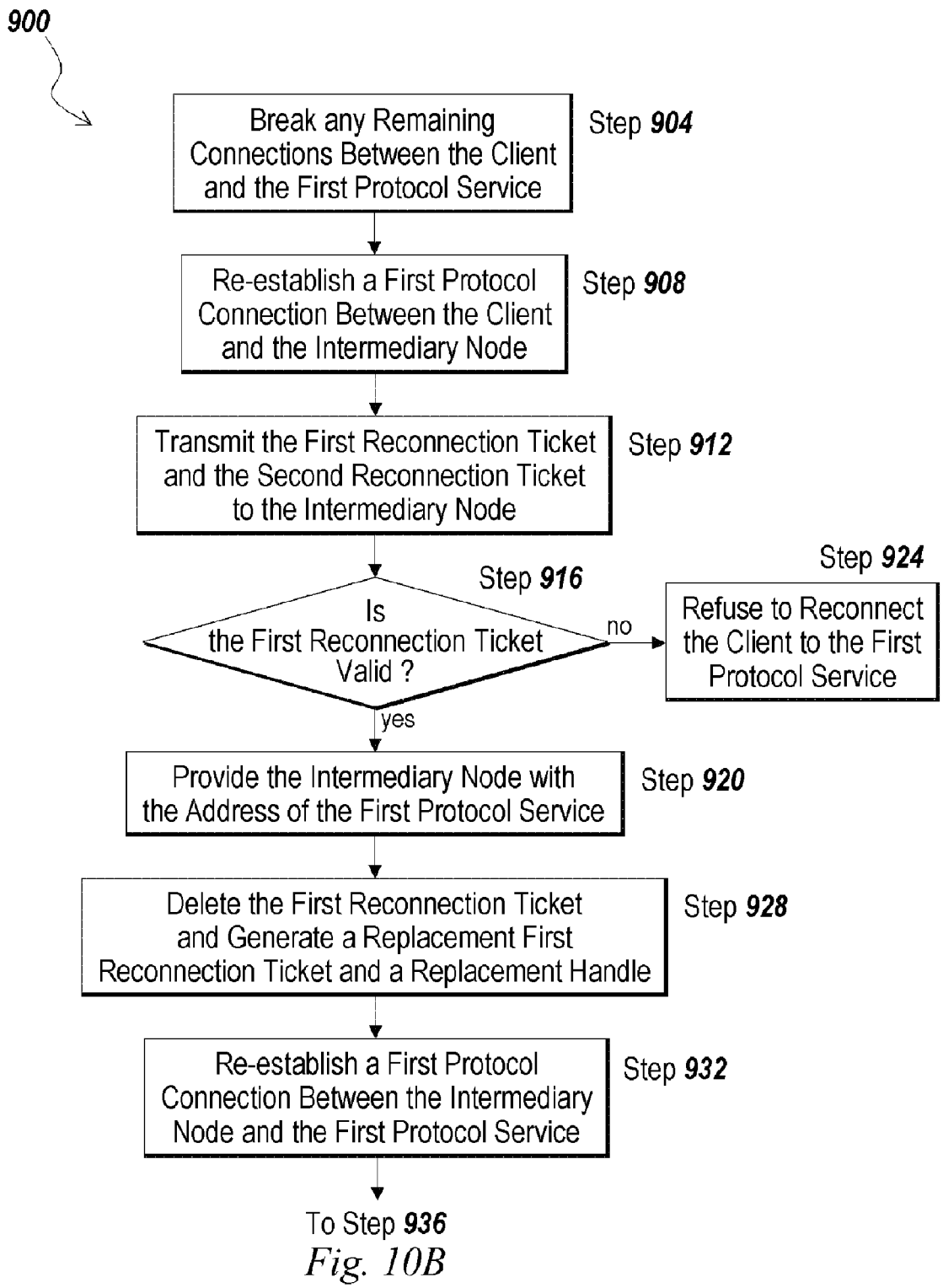
FIGS. 10A-10B are flow diagrams of a method for re-connecting a client to host services according to an illustrative embodiment of the invention.
Figure 10B:
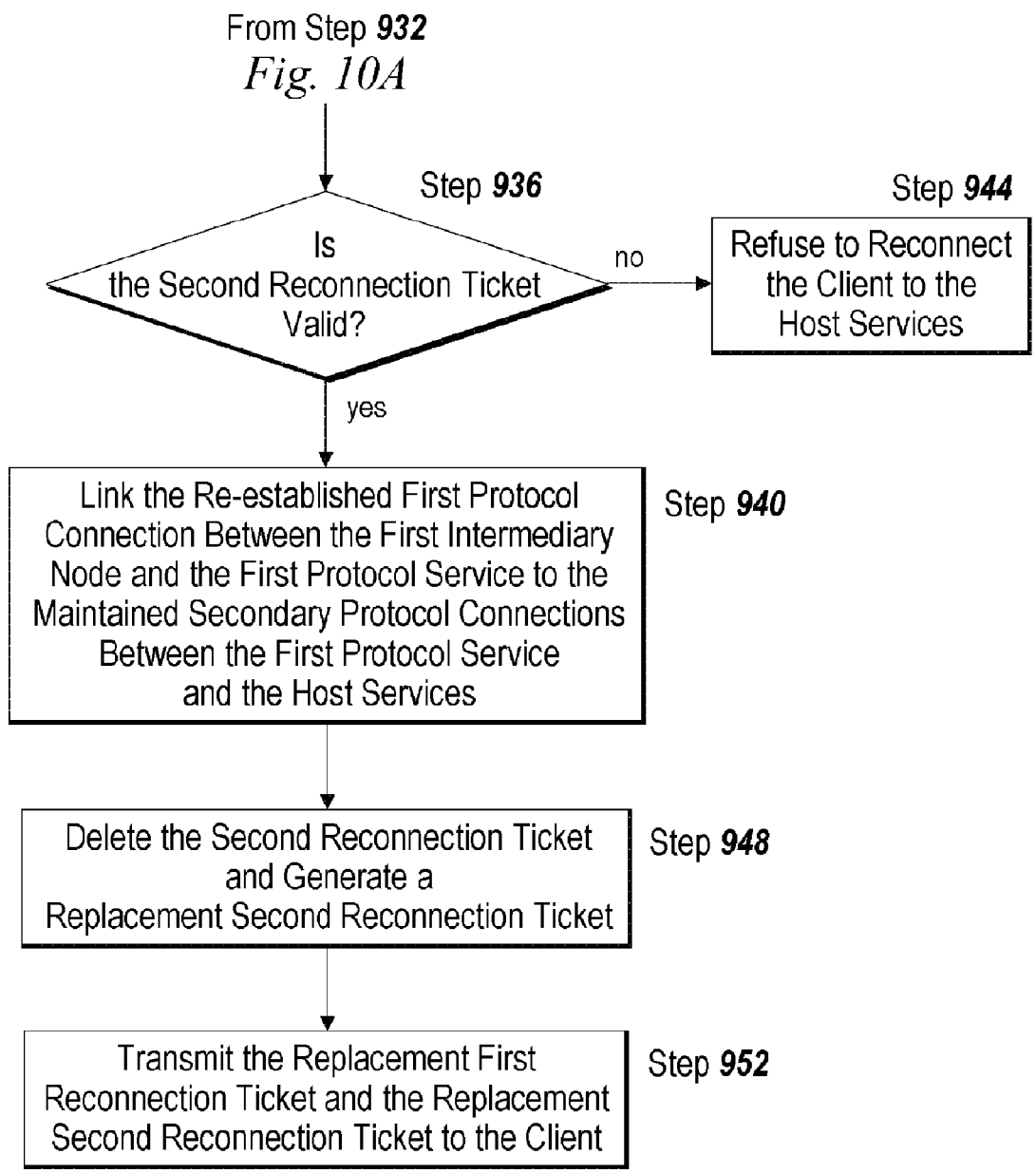

Referring now to FIGS. 10A-10B, one embodiment of a method 900 for re-connecting the client 108 to the one or more host services 116 (for example at step 812 of FIG. 9), using the exemplary embodiment of FIGS. 6A-6D, is illustrated. At step 904, any remaining connections between the client 108 and the first protocol service 112 are broken. For example, where the connection 135*a* has failed, but the connection 135*b* has not, the connection 135*b* is broken. Alternatively, where the connection 135*b* has failed, but the connection 135*a* has not, the connection 135*a* is broken.

In one embodiment, using the actual address of the intermediary node 632 provided to the client 108, for example at step 720 of FIG. 8, the client agent 128 of the client 108 then re-establishes, at step 908, the first protocol connection 135*a* between the client agent 128 and the intermediary node 632. Alternatively, in another embodiment, using the actual address of the third computing node 646 provided to the client 108, for example at step 720 of FIG. 8, the client agent 128 of the client 108 then re-establishes, at step 908, a first protocol connection between the client agent 128 and the third computing node 646. The third computing node 646 then determines the intermediary node 632 through which messages between the client 108 and the first protocol service 112 will have to pass. In one embodiment, the third computing node 646 chooses the intermediary node 632 using a load balancing equation. The intermediary node 632 chosen by the third computing node 646 in re-connecting the client 108 to the one or more host services 116 can be different from that chosen, for example at step 720 of FIG. 8, to initially connect the client 108 to the one or more host services 116. In one embodiment, an initial connection ticket for the chosen intermediary node 632 is generated when re-connecting the client 108 to a host service 116.

Having chosen the intermediary node 632, the third computing node 646 re-establishes a first protocol connection 135*a* to the intermediary node 632. A first protocol connection 135*a* is therefore re-established, through the third computing node 646, between the client agent 128 of the client 108 and the intermediary node 632. In one embodiment, when the first protocol connection 135*a* to the intermediary node 632 is re-established, the first protocol connection 135*s* is validated by validating a first or second re-connection ticket for this "hop" with the ticket authority 136.

In one embodiment, where more than one level of intermediary nodes 632 exist, the intermediary node 632 through which the client agent 128 is routed at each of the levels.

"a"-"n−1" thereafter determines, based on a load balancing equation for example, the intermediary node 632 to which it will connect at the next level. Alternatively, in another embodiment, the third computing node 646 determines, for more than one or all of the levels "a"-"n", the intermediary nodes 632 through which the client agent 128 will be routed. In other embodiments, either the intermediary node 632 or one of the computing nodes (e.g., the third computing node 646) generates first or second re-connection tickets for one or more of the connections or "hops" through which the client agent 128 is routed.

Having re-established the first protocol connection 135*a* between the client agent 128 of the client 108 and the intermediary node 632, for example the intermediate node 132 at level "n" (hereinafter referred to in method 900 as the intermediary node 632), the client agent 128 then transmits, at step 912, the first re-connection ticket and the second re-connection ticket for the client 108 to the intermediary node 632.

It is then determined, at step 916, whether the first re-connection ticket is valid. In one embodiment, the validity of the first re-connection ticket is determined by using the ticket authority 136. For example, the intermediary node 632 transmits the first re-connection ticket to the ticket authority 136. In one embodiment, the ticket authority 136 determines the validity of the first re-connection ticket by comparing it to a previously kept copy of the first re-connection ticket. If the ticket authority 136 determines the first re-connection ticket to be valid, the ticket authority 136 transmits, at step 920, the address of the first protocol service 112 to the intermediary node 632. Otherwise, if the ticket authority 136 determines the first re-connection ticket to be invalid, the client 108 is, at step 924, refused re-connection to the first protocol service 112 and, consequently, re-connection to the host services 116.

At step 928, the first re-connection ticket is deleted by, for example, the ticket authority 136 and a replacement first re-connection ticket is generated by, for example, the ticket authority 136. Moreover, a replacement handle can be generated by, for example, the ticket authority 136. In some such embodiments, the ticket authority 136 transmits the replacement first re-connection ticket and the replacement handle to the intermediary node 632. Moreover, in some such embodiments, the ticket authority 136 keeps a copy of the replacement first re-connection ticket. In some embodiments, the ticket authority 136 waits for the client 108 to acknowledge that it has received the replacement first re-connection ticket before it proceeds to delete the first re-connection ticket.

After the first re-connection ticket is validated, the intermediary node 632, using the address of the first protocol service 112, re-establishes, at step 932, the first protocol connection 135*b* between the intermediary node 632 and the first protocol service 112. Having re-established the first protocol connection 135*b* between the intermediary node 632 and the first protocol service 112, it is then determined, at step 936, whether the second re-connection ticket is valid. In one embodiment, the validity of the second re-connection ticket is determined by using the first protocol service 112. For example, the intermediary node 632 transmits the second re-connection ticket to the first protocol service 112. In one embodiment, the first protocol service 112 determines the validity of the second re-connection ticket by comparing it to a previously kept copy of the second re-connection ticket. In another embodiment of step 936, the first protocol service 112 validates a first re-connection ticket for the connection between the first protocol service 112 and the host service 116, or in another embodiment, between the first protocol service 112 and another first protocol service 112 or an intermediary node 632. In a similar manner, each "hop" thereafter between the first protocol service 112 and the host service 116 may be validated with one or more tickets, either initial or re-connection tickets, to validate the continued use of the "hop" on behalf of the client 108.

If the first protocol service 112 determines the second re-connection ticket to be valid, the re-established first protocol connection 135*b* between the first intermediary node 132 and the first protocol service 112 is linked, at step 940, to the maintained secondary protocol connection 124 between the first protocol service 112 and each of the one or more host services 116. Otherwise, if the first protocol service 112 determines the second re-connection ticket to be invalid, the re-established first protocol connection 135*b* is not linked to the one or more maintained secondary protocol connections 124 and the client 108 is, at step 944, refused re-connection to the one or more host services 116. In the case of a multiple-hop connection between the first protocol service 112 and the host service 116, each "hop" may be validated for re-connection and at step 940 be linked to the previous "hop" until the final "hop" to the host service 116 is validated, or until one of the "hops" is refused re-connection.

At step 948, the second re-connection ticket is deleted by, for example, the first protocol service 112 and a replacement second re-connection ticket is generated by, for example, the first protocol service 112 for transmission to the client 108. In such an embodiment, the first protocol service 112 keeps a copy of the replacement second re-connection ticket. In some embodiments, the first protocol service 112 waits for the client 108 to acknowledge that it has received the replacement second re-connection ticket before it proceeds to delete the second re-connection ticket. In the case of validating one or more of the "hops" for re-connecting a client 108, one or more replacement re-connection tickets, at step 948, may be generated and/or a copy saved by the ticket authority 136, intermediary nodes 632, any of the computing nodes, or one or more of the first protocol services 112.

At step 952, the replacement first re-connection ticket and the replacement second re-connection ticket are transmitted to the client. For example, the ticket authority 136 can transmit, through the intermediary node 632, the replacement first re-connection ticket to the client 108. Moreover, in one embodiment, the first protocol service 112 transmits, through the intermediary node 632, the replacement second re-connection ticket to the client 108. In other embodiments, the replacement re-connection tickets for one or more "hops" may be transmitted to one or more of the intermediary nodes 632, any of the computing nodes, or one or more of the first protocol services 112.

Alternatively, in other embodiments, as discussed above, the system 100 and methods of the invention provide for only a single re-connection ticket for the client 108 and/or a single re-connection for each of the "hops" between the client 108 and a host service 116. As such, rather than using both first and second re-connection tickets, the illustrative method 900 uses only the aforementioned single re-connection ticket. In one such embodiment, the client agent 128 of the client 108 is also provided with the address of the first protocol service 112. To re-connect to the host services 116, the client agent 128 transmits the single re-connection ticket directly to the first protocol service 112. The first protocol service 112 then determines whether the single re-connection ticket is valid. In one embodiment, the first protocol service 112 determines the validity of the single re-connection ticket by comparing it to a previously kept copy of the single re-connection ticket. If the first protocol service 112 determines the single re-connection ticket to be valid, the re-established first protocol connection 135 between the client 108 and the first protocol service 112 is linked to the maintained secondary protocol connection 124 between the first protocol service 112 and each of the one or more host services 116. Otherwise, if the first protocol service 112 determines the single re-connection ticket to be invalid, the re-established first protocol connection 135 is not linked to the one or more maintained secondary protocol connections 124 and the client 108 is refused re-connection to the one or more host services 116.

After the single re-connection ticket is validated, the single re-connection ticket is deleted by, for example, the first protocol service 112 and a replacement single re-connection ticket is generated by, for example, the first protocol service 112 for transmission to the client 108. In transmitting the replacement single re-connection ticket to the client 108, the first protocol service 112 keeps a copy of the replacement single re-connection ticket. In some embodiments, the first protocol service 112 waits for the client 108 to acknowledge that it has received the replacement single re-connection ticket before it proceeds to delete the single re-connection ticket.

In yet another embodiment, like the first and second re-connection tickets, the single re-connection ticket is configured for automatic deletion after a pre-determined period of time following a failure in the connection 135, as at step 612, and/or following a clean termination of the connection 135, as at step 620.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

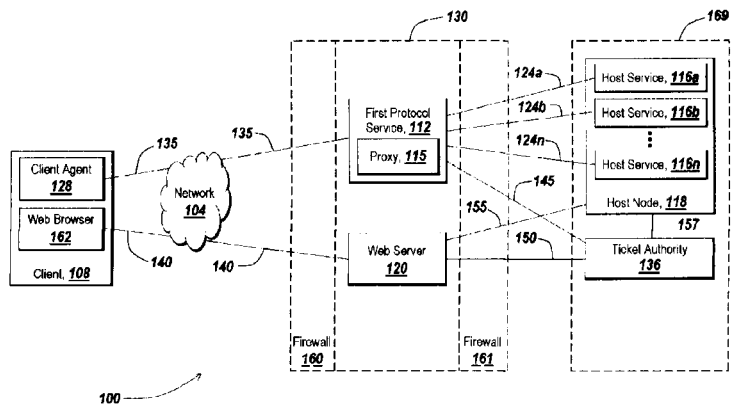

The invention claimed is:

1. A method for re-connecting a client to a host service, the method comprising:
    establishing, by a client computing device, a communication session between the client computing device and a first protocol service over a first connection;
    establishing, by the first protocol service, a second communication session between the first protocol service and a host service over a second connection;
    generating, by a ticket authority, a first reconnection ticket and a second reconnection ticket;
    transmitting, by the ticket authority, the first reconnection ticket and the second reconnection ticket to the first protocol service;
    detecting, by the first protocol service, a disruption in one of the first connection and the second connection;
    transmitting, by the first protocol service, the first reconnection ticket and the second reconnection ticket to the ticket authority;
    validating, by the ticket authority, the first reconnection ticket;
    re-establishing, by the first protocol service, the disrupted connection responsive to the validated first reconnection ticket while maintaining the other one of the first connection and the second connection;
    validating, by the ticket authority, the second reconnection ticket; and
    linking, by the first protocol service, the re-established connection to the maintained connection responsive to the validated second reconnection ticket.

2. The method of claim 1, further comprising maintaining the communication session during the disruption in the disrupted connection.

3. The method of claim 1, further comprising generating one of the first reconnection ticket and the second reconnection ticket by at least one of the first protocol service and the ticket authority.

4. The method of claim 1, further comprising validating, by the ticket authority, at least one of the first reconnection ticket and the second reconnection ticket.

5. The method of claim 1, further comprising authenticating the client computing device to a web server.

6. The method of claim 1, further comprising transmitting, by a web server, the first reconnection ticket to the client computing device.

7. The method of claim 1, further comprising transmitting, by the client computing device, the first reconnection ticket to the first protocol service.

8. The method of claim 1, further comprising authenticating, by the host service, the client computing device upon establishment of the communication session.

9. The method of claim 1, wherein the first protocol service comprises a proxy server.

10. The method of claim 1, wherein the first protocol service comprises a security gateway.

11. The method of claim 1, wherein the client and the first protocol service communicate using a first protocol encapsulating a second protocol, and the first protocol service and the host service communicate using the second protocol.

12. The method of claim 1, wherein the first reconnection ticket is valid for the first connection and the second reconnection ticket is valid for the second connection.

13. The method of claim 1, wherein the second reconnection ticket is disabled until the first ticket reconnection is validated.

14. The method of claim 1, wherein the re-established connection is linked to the maintained connection after the first reconnection ticket and the second reconnection ticket are validated.

15. The method of claim 1, wherein one of the first connection and the second connection comprises a plurality of connections connected via one of an intermediary node and one or more first protocol services.

16. The method of claim 15, wherein a third reconnection ticket is generated for at least one of the plurality of connections.

17. The method of claim 16, wherein the third reconnection ticket is valid for the least one of the plurality of connections.

18. The system of claim 17, further comprising the ticket authority generating at least one of the first reconnection ticket and the second reconnection ticket.

19. A system for re-connecting a client to a host service, the system comprising:
    a ticket authority
        generating a first reconnection ticket and a second reconnection ticket;
        transmitting the first reconnection ticket and the second reconnection ticket to a first protocol service;
        validating the first reconnection ticket received from the first protocol service; and
        validating the second reconnection ticket received from the first protocol service;
    a client computing device
        establishing a communication session with the first protocol service over a first connection;
    the first protocol service
        establishing a second communication session between the first protocol service and a host service over a second connection;
    detecting a disruption in one of the first connection and the second connection;
    re-establishing a disrupted connection in one of the first connection and the second connection while maintaining the other one of the first connection and the second connection responsive to the validated first reconnection ticket; and
    linking the re-established connection to the maintained connection responsive to the validated second reconnection ticket.

20. The system of claim 19, wherein the first protocol service maintains the communication session during a disruption in the disrupted connection.

21. The system of claim 19, wherein the first protocol service generates at least one of the first reconnection ticket and the second reconnection ticket.

22. The system of claim 19, wherein the ticket authority validates at least one of the first reconnection ticket and the second reconnection ticket.

23. The system of claim 19, further comprising a web server, the web server authenticating the client computing device.

24. The system of claim 23, wherein the web server transmits the first reconnection ticket to the client computing device.

25. The system of claim 19, wherein the client computing device transmits the first reconnection ticket to the first protocol service.

26. The system of claim 19, wherein the host service authenticates the client computing device upon establishment of the communication session.

27. The system of claim 19, wherein the first protocol service comprises a proxy server.

28. The system of claim 19, wherein the first protocol service comprises a security gateway.

29. The system of claim 19, wherein the client and the first protocol service communicate using a first protocol encapsulating a second protocol, and the first protocol service and the host service communicate using the second protocol.

30. The system of claim 19, wherein the first reconnection ticket is valid for the first connection and the second reconnection ticket is valid for the second connection.

31. The system of claim 19, wherein the second reconnection ticket is disabled until the first reconnection ticket is validated.

32. The system of claim 19, wherein the first protocol service links the re-established connection to the maintained connection after the first reconnection ticket and the second reconnection ticket are validated.

33. The system of claim 19, wherein one of the first connection and the second connection comprises a plurality of connections connected via one of an intermediary node and one or more first protocol services.

34. The system of claim 33, wherein a third reconnection ticket is generated for at least one of the plurality of connections.

35. The system of claim 34, wherein the third reconnection ticket is valid for the least one of the plurality of connections.

* * * * *

UNITED STATES PATENT AND TRADEMARK OFFICE
CERTIFICATE OF CORRECTION

PATENT NO. : 7,984,157 B2  
APPLICATION NO. : 10/711719  
DATED : July 19, 2011  
INVENTOR(S) : Anatoliy Panasyuk et al.

Page 1 of 1

It is certified that error appears in the above-identified patent and that said Letters Patent is hereby corrected as shown below:

IN THE CLAIMS:

Column 40, lines 17-19, please delete, in its entirety, claim 18.

Signed and Sealed this
Twenty-ninth Day of May, 2012

David J. Kappos
*Director of the United States Patent and Trademark Office*

UNITED STATES PATENT AND TRADEMARK OFFICE
CERTIFICATE OF CORRECTION

PATENT NO.         : 7,984,157 B2
APPLICATION NO.    : 10/711719
DATED              : July 19, 2011
INVENTOR(S)        : Anatoliy Panasyuk et al.

It is certified that error appears in the above-identified patent and that said Letters Patent is hereby corrected as shown below:

Delete the title page and substitute therefore the attached title page showing the corrected number of claims in patent.

IN THE CLAIMS:

Column 40, lines 17-19, please delete, in its entirety, claim 18.

This certificate supersedes the Certificate of Correction issued May 29, 2012.

Signed and Sealed this
Nineteenth Day of June, 2012

David J. Kappos
*Director of the United States Patent and Trademark Office*

(12) United States Patent
Panasyuk et al.

(10) Patent No.: US 7,984,157 B2
(45) Date of Patent: Jul. 19, 2011

(54) PERSISTENT AND RELIABLE SESSION SECURELY TRAVERSING NETWORK COMPONENTS USING AN ENCAPSULATING PROTOCOL

(75) Inventors: Anatoliy Panasyuk, Bellevue, WA (US); Andre Kramer, Cambridge (GB); Bradley Jay Pedersen, Parkland, FL (US); David Sean Stone, Lauderdale-By-The-Sea, FL (US); Terry Treder, Highland Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1393 days.

(21) Appl. No.: 10/711,719

(22) Filed: Sep. 30, 2004

(65) Prior Publication Data

US 2005/0198380 A1    Sep. 8, 2005

Related U.S. Application Data

(63) Continuation-in-part of application No. 10/083,324, filed on Feb. 26, 2002, now Pat. No. 7,661,129, and a continuation-in-part of application No. 10/683,881, filed on Oct. 10, 2003, now Pat. No. 7,562,146.

(51) Int. Cl.
*G06F 15/16* (2006.01)

(52) U.S. Cl. .......................... 709/227; 726/10

(58) Field of Classification Search .......... 709/227, 709/238, 203, 230, 236; 455/439; 713/160, 713/201; 726/22, 10; 714/752, 4; 370/395.53, 370/352, 225
See application file for complete search history.

(56) References Cited

U.S. PATENT DOCUMENTS

| | | |
|---|---|---|
| 4,438,511 A | 3/1984 | Baran |
| 4,649,510 A | 3/1987 | Schmidt |
| 4,736,369 A | 4/1988 | Barzilai et al. |
| 4,750,171 A | 6/1988 | Kedar et al. |
| 4,768,190 A | 8/1988 | Giancarlo |
| 4,837,800 A | 6/1989 | Freeburg et al. |

(Continued)

FOREIGN PATENT DOCUMENTS

EP    0 384 339 A2    8/1990

(Continued)

OTHER PUBLICATIONS

Alanko, T. et al. "Measured performance of data transmission over cellular telephone networks." Publication C-1994-53, pp. 1-20, University of Helsinki, Department of Computer Science, Helsinki, 1994.

(Continued)

*Primary Examiner* — Jungwon Chang
(74) *Attorney, Agent, or Firm* — Foley and Lardner LLP; John D. Lanza

(57) ABSTRACT

The invention relates to systems and methods for reestablishing client communications by securely traversing network components using an encapsulating communication protocol to provide session persistence and reliability. A first protocol that encapsulates a plurality of secondary protocols is used to communicate over a network to provide session persistence and a reliable connection between a client and a host service via a first protocol service. A ticket authority generates a first ticket and a second ticket associated with the client. The first ticket is provided to the client and the client uses the first ticket to establish a communication session with the first protocol service. The second ticket is provided to the first protocol service and the first protocol service uses the second ticket to establish a communication session with the host service.

34 Claims, 18 Drawing Sheets